(12) United States Patent
Saavedra et al.

(10) Patent No.: US 10,785,190 B2
(45) Date of Patent: Sep. 22, 2020

(54) SYSTEM, APPARATUS AND METHOD FOR PROVIDING A UNIFIED FIREWALL MANAGER

(71) Applicant: ADAPTIV NETWORKS INC., Gatineau (CA)

(72) Inventors: Patricio Humberto Saavedra, Toronto (CA); Jie Xiao, Mississauga (CA); Yan Wang, Mississauga (CA); Arun Pereira, Mississauga (CA)

(73) Assignee: Adaptiv Networks Inc., Gatineau (CA)

( * ) Notice: Subject to any disclaimer, the term of this patent is extended or adjusted under 35 U.S.C. 154(b) by 289 days.

(21) Appl. No.: 15/841,013

(22) Filed: Dec. 13, 2017

(65) Prior Publication Data

US 2019/0182213 A1 Jun. 13, 2019

(51) Int. Cl.

| H04L 29/06 | (2006.01) |
| H04L 12/707 | (2013.01) |
| H04L 12/741 | (2013.01) |
| H04L 12/713 | (2013.01) |

(52) U.S. Cl.
CPC ...... *H04L 63/0218* (2013.01); *H04L 63/0236* (2013.01); *H04L 45/24* (2013.01); *H04L 45/586* (2013.01); *H04L 45/745* (2013.01); *H04L 67/42* (2013.01)

(58) Field of Classification Search
None
See application file for complete search history.

(56) References Cited

U.S. PATENT DOCUMENTS

| 7,346,922 | B2 * | 3/2008 | Miliefsky | ........... H04L 63/0272 726/11 |
| 7,603,696 | B2 * | 10/2009 | Trumper | ................. H04L 63/20 726/1 |
| 8,612,744 | B2 * | 12/2013 | Shieh | .................. H04L 63/0218 713/153 |
| 2005/0102534 | A1 * | 5/2005 | Wong | .................... G06F 21/577 726/4 |
| 2006/0282887 | A1 * | 12/2006 | Trumper | ............. H04L 63/0218 726/11 |
| 2015/0020186 | A1 * | 1/2015 | Deutsch | ............ H04L 29/12367 726/11 |
| 2016/0156661 | A1 * | 6/2016 | Nagaratnam | ........... G06F 21/57 726/1 |
| 2016/0315808 | A1 * | 10/2016 | Saavedra | ................ H04L 47/24 |

(Continued)

*Primary Examiner* — Maung T Lwin
(74) *Attorney, Agent, or Firm* — Stratford Managers Corporation

(57) ABSTRACT

A network system is provided between at least a first client site and a second client site, the first and the second client site are at a distance from one another. A client site network component is implemented at least at the first client site, the client site network component bonding or aggregating one or more diverse network connections so as to configure a bonded/aggregated connection that has increased throughput. At least one network server component may be configured to connect to the client site network component using the bonded/aggregated connection. A cloud network controller may be configured to manage the data traffic and a virtual edge providing transparent lower-link encryption for the bonded/aggregated connection between the client site network component and the network server component.

20 Claims, 29 Drawing Sheets

(56) References Cited

U.S. PATENT DOCUMENTS

| | | | |
|---|---|---|---|
| 2017/0244674 A1* | 8/2017 | Han | H04L 63/0263 |
| 2017/0317976 A1* | 11/2017 | Chalvadi | H04L 47/32 |
| 2017/0317979 A1* | 11/2017 | Bansal | H04L 63/0236 |
| 2018/0041470 A1* | 2/2018 | Schultz | H04L 63/029 |
| 2018/0176182 A1* | 6/2018 | Raney | H04L 63/0263 |

* cited by examiner

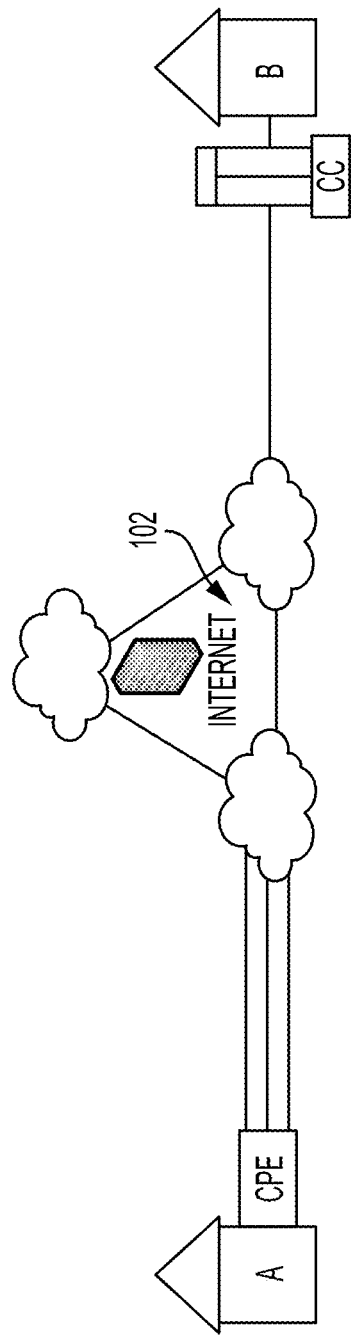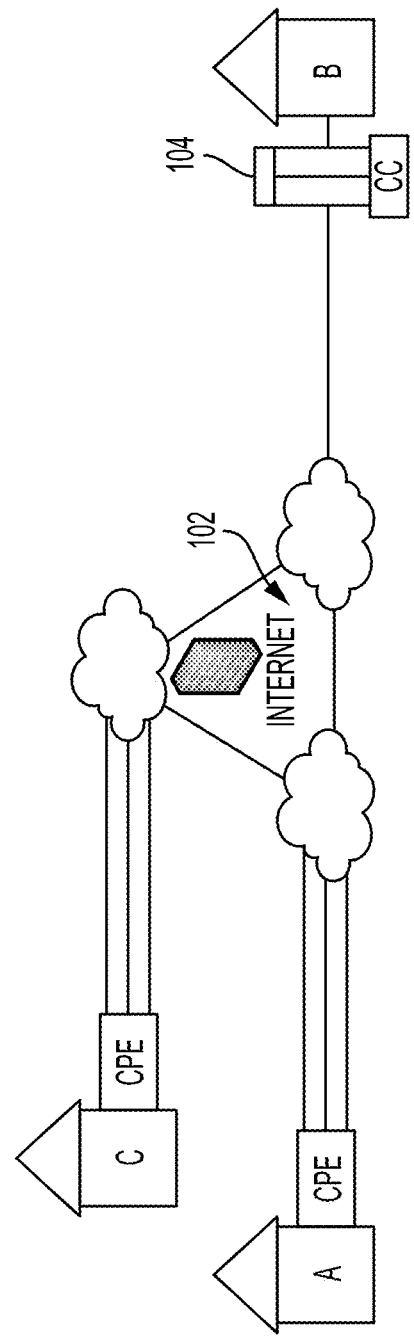

SYSTEM, APPARATUS AND METHOD FOR PROVIDING A UNIFIED FIREWALL MANAGER

FIELD

Embodiments described herein relate generally to network communications and, in particular, to aggregating or bonding communications links for a variety of different networks including wired and wireless networks, and including Wide Area Networks ("WAN"). Embodiments described herein relate generally to a network security system to monitor and control the incoming and outgoing network traffic of aggregated or bonded communication links.

INTRODUCTION

While the capacity of network connections has increased since the introduction of dial up, high speed connectivity is not ubiquitous in all regions. Also, bandwidth is not an unlimited resource.

Various solutions exist for improving network performance such as load balancing, bonding of links to increase throughput, as well as aggregation of links. In regards to bonding/aggregation various different technologies exist that associated two or more diverse links (which in this disclosure refers to links associated with different types of networks and/or different network carriers) with one another for carrying network traffic (such as a set of packets) across such associated links to improve network performance in relation for such packets. Examples of such technologies include load balancing, WAN optimization, or ANA™ technology of TELoIP as well as WAN aggregation technologies.

Many of such technologies for improving network performance are used to increase network performance between two or more locations (for example Location A, Location B, Location N; hereinafter referred to collectively as "Locations"), where bonding/aggregation of links is provided at one or more of such locations. While the bonded/aggregated links provide significant network performance improvement over the connections available to carry network traffic for example from Location A to an access point to the backbone of a network (whether an Internet access point, or access point to another data network such as a private data network, an MPLS network, or high performance wireless network) ("network backbone"), the bonded/aggregated links are generally slower than the network backbone.

Bonding/aggregation can result in what is often referred to as "long haul" bonding/aggregation, which means that the bonded/aggregated links are maintained for example from Location A and Location B, including across the network backbone, which in many cases results in network impedance. As a result, while bonding/aggregation provides improved network performance for example from Location A to the network backbone, network performance across the entire network path for example from Location A to Location B, may be less than optimal because the technology in this case does not take full advantage of the network performance of the network backbone.

A firewall system can manage as well as monitor the firewall or firewalls at a centralized site. Performing traffic monitoring at a centralized site may create inefficiencies and greater latency, such as that caused by "trombone" network effects, for example. This may occur when the traffic arriving at a plurality of devices must be forwarded to a remote central monitoring site before firewall rules are applied.

There is a need for a system that may provide a distributed and independently managed firewall system that can reduce the latency, inefficiencies, trombone effects, and/or long haul effects associated with monitoring the firewall or firewalls at a centralized site.

SUMMARY

In an aspect, there is provided a network system for distributed firewall management for client sites. The system has a plurality of firewalls corresponding to a plurality of client site network components, each firewall integrated with a client site network component to provide rules, security controls, or policy controls for the respective client site network component, each client site network component implemented at a respective client site. The system has a centralized firewall network controller configured to manage the rules, security controls, or policy controls for the plurality of firewalls as a single control pane so as to provide a managed firewall network that incorporates connections of the plurality of client site network components, the single control pane implementing a template based firewall policy and rule management with asset alias capacity to manage a plurality of assets across the plurality of client site network components.

In some embodiments, the system has the plurality of client site network components, each client site network component bonding or aggregating one or more diverse network connections so as to configure a bonded/aggregated connection that has increased throughput; at least one network server component configured to connect to at least one of the plurality of client site network components using the bonded/aggregated connection, the network server component including at least one concentrator element implemented at a network access point to at least one network, the network server component automatically terminating the bonded/aggregated connection and passing data traffic to the network access point to the at least one network, the at least one network server component configured to connect to the at least one of the plurality of client site network components at a distance that would usually require long haul network communication.

In some embodiments, the centralized firewall network controller is configured to provide a software defined perimeter defense system.

In some embodiments, the centralized firewall network controller is configured to provide five layers of security comprising administrator, network, trusted, public and untrusted.

In some embodiments, the asset alias capacity assigns a unit alias to each of the plurality of assets across the plurality of client site network components.

In some embodiments, the plurality of firewalls use processing resources of the plurality of client site network components to distributed processing required by the plurality of firewalls across the plurality of client site network components.

In some embodiments, the system has a virtual edge connection providing at least one of transparent lower-link encryption and lower-link encapsulation using a common access protocol for the bonded/aggregated connection between the client site network component and the network server component.

In some embodiments, the network server component comprises: a first concentrator element implemented at the network access point to the at least one network; a second concentrator element implemented at another network access point to at least one other network; wherein the first concentrator element and the second concentrator element are configured to interoperate to provide a virtual core connection between the network access point and the other network access point, the virtual core connection providing another bonded/aggregated connection; and wherein a cloud network controller is configured to integrate with the centralized firewall network controller to manage the data traffic so as to provide the managed network overlay that incorporates the virtual edge connection, the virtual core connection and the at least one long haul network path carried over the at least one network and the at least one other network.

In some embodiments, the virtual core connection provides at least one of the transparent lower-link encryption and the lower-link encapsulation using the common access protocol for the other bonded/aggregated connection.

In some embodiments, the network server component comprises at least one other concentrator element, the at least one other concentrator element bonding or aggregating one or more other diverse network connections so as to configure another bonded/aggregated connection that has increased throughput, the other bonded/aggregated connection connecting the at least one concentrator element and the at least one other concentrator element.

In some embodiments, the cloud network controller is configured to manage the data traffic so as to provide the managed network overlay that incorporates the bonded/aggregated connection and the other bonded/aggregated connection.

In some embodiments, the client site network component is configured to separate lower-link data traffic and encapsulate data packets of the lower-link data traffic using the common access protocol for the bonded/aggregated connection.

In some embodiments, the client site network component is configured with a route to the at least one network server component to separate the lower-link traffic to prepare the data traffic for the bonded/aggregated connection or the managed network overlay.

In some embodiments, the route is a static route, a dynamic route or a route from a separate or independent virtual routing forwarding table.

In some embodiments, the network server component is configured to connect with an intelligent packet distribution engine that manages data packets transmission over the at least one long haul network path by obtaining data traffic parameters and, based on the data traffic parameters and performance criteria, selectively applies one or more techniques to alter the traffic over the at least one long haul network path to conform to the data traffic parameters.

In some embodiments, the network server component is configured to provide Multi-Directional Pathway Selection (MDPS) for pre-emptive failover using echo packets received from the client site network component.

In some embodiments, the network server component is configured to provide an intelligent packet distribution engine (IPDE) for packet distribution with differing speed links using weighted packet distribution and for bi-directional (inbound and outbound) Quality of Service (QoS).

In some embodiments, each of the least one network server component is accessible to a plurality of client site network components, each client site network component being associated with a client site location.

In some embodiments, the system has a network aggregation device that: (A) configures a plurality of dissimilar network connections or network connections provided by a plurality of diverse network carriers ("diverse network connections") as one or more aggregated groups, at least one aggregated group creating the bonded/aggregated connection that is a logical connection of the plurality of diverse connections; and (B) routes and handles bi-directional transmissions over the aggregated network connection; wherein two or more of the diverse network connections have dissimilar network characteristics including variable path bidirectional transfer rates and latencies; wherein the logical connection is utilizable for a transfer of communication traffic bidirectionally on any of the diverse network connections without any configuration for the dissimilar network connections or by the diverse network carriers; and wherein the network aggregation engine includes or is linked to a network aggregation policy database that includes one or more network aggregation policies for configuring the aggregated groups within accepted tolerances so as to configure and maintain the aggregated network connection so that the logical connection has a total communication traffic throughput that is a sum of available communication traffic throughputs of the aggregated group of diverse network connections.

In another aspect, there is provided a client site network component implemented at least at least a first client site in network communication with a second client site, wherein the first client site and the second client site are at a distance from one another that is such that would usually require long haul network communication, the client site network component configured to connect to at least one network server component implemented at an access point to at least one wide area network, the network server component passing the data traffic to an access point to at least one wide area network, a firewall integrated with the client site network component to provide rules, security controls, or policy controls for the respective client site network component, the firewall in communication with a centralized firewall network controller configured to manage the rules, security controls, or policy controls for the firewall as a single control pane so as to provide a managed firewall network that incorporates the bonded/aggregated connection of the client site network component, the single control pane implementing a template based firewall policy and rule management with asset alias capacity to manage a plurality of assets of the client site network component.

In an aspect, embodiments described herein provide a unified firewall manager system that integrates with a virtual network overlay to manage distributed firewalls across an enterprise, groups of sites, single sites, and a combination thereof.

In an aspect, embodiments described herein may provide a network system for improving network communication performance between at least a first client site and a second client site, wherein the first client site and the second client site are at a distance from one another that is such that would usually require long haul network communication. The system may include at least one client site network component implemented at least at the first client site, the client site network component bonding or aggregating one or more diverse network connections so as to configure a bonded/aggregated connection that has increased throughput. The system may include at least one network server component configured to connect to the client site network component using the bonded/aggregated connection, the network server component including at least one concentrator element implemented at a network access point to at least one network, the network server component automatically terminating the bonded/aggregated connection and passing data traffic to the network access point to the at least one network. The system may include a virtual edge connection providing at least one of transparent lower-link encryption and lower-link encapsulation using a common access protocol for the bonded/aggregated connection between the client site network component and the network server component. The system may include a cloud network controller configured to manage the data traffic so as to provide a managed network overlay that incorporates the virtual edge connection and at least one long haul network path carried over the at least one network.

In accordance with some embodiments, the network server component may include a first concentrator element implemented at the network access point to the at least one network and a second concentrator element implemented at another network access point to at least one other network. The first concentrator element and the second concentrator element may be configured to interoperate to provide a virtual core connection between the network access point and the other network access point, the virtual core connection providing another bonded/aggregated connection. The cloud network controller may be configured to manage the data traffic so as to provide the managed network overlay that incorporates the virtual edge connection, the virtual core connection and the at least one long haul network path carried over the at least one network and the at least one other network.

In accordance with some embodiments, the virtual core connection may provide at least one of the transparent lower-link encryption and the lower-link encapsulation using the common access protocol for the other bonded/aggregated connection.

In accordance with some embodiments, the network server component may have at least one other concentrator element, the at least one other concentrator element bonding or aggregating one or more other diverse network connections so as to configure another bonded/aggregated connection that has increased throughput, the other bonded/aggregated connection connecting the at least one concentrator element and the at least one other concentrator element.

In accordance with some embodiments, the cloud network controller may be configured to manage the data traffic so as to provide the managed network overlay that incorporates the bonded/aggregated connection and the other bonded/aggregated connection.

In accordance with some embodiments, the client site network component may be configured to separate lower-link data traffic and encapsulate data packets of the lower-link data traffic using the common access protocol for the bonded/aggregated connection.

In accordance with some embodiments, the client site network component may be configured with a route to the at least one network server component to separate the lower-link traffic to prepare the data traffic for the bonded/aggregated connection or the managed network overlay.

In accordance with some embodiments, the route is a static route, a dynamic route or a route from a separate or independent virtual routing forwarding table.

In accordance with some embodiments, the network server component is configured to connect with an intelligent packet distribution engine that manages data packets transmission over the at least one long haul network path by obtaining data traffic parameters and, based on the data traffic parameters and performance criteria, selectively applies one or more techniques to alter the traffic over the at least one long haul network path to conform to the data traffic parameters.

In accordance with some embodiments, the network server component is configured to provide Multi-Directional Pathway Selection (MDPS) for pre-emptive failover using echo packets received from the client site network component.

In accordance with some embodiments, the network server component is configured to provide an intelligent packet distribution engine (IPDE) for packet distribution with differing speed links using weighted packet distribution and for bi-directional (inbound and outbound) QoS.

In accordance with some embodiments, the first client site and the second client site are at a distance from one another such that data traffic transmission between the first client site and the second client site is subject to long haul effects.

In accordance with some embodiments, each of the least one network server components is accessible to a plurality of client site network components, each client site network component being associated with a client site location.

In accordance with some embodiments, the system may have a network aggregation device that: (A) configures a plurality of dissimilar network connections or network connections provided by a plurality of diverse network carriers ("diverse network connections") as one or more aggregated groups, at least one aggregated group creating the bonded/aggregated connection that is a logical connection of the plurality of diverse connections; and (B) routes and handles bi-directional transmissions over the aggregated network connection; wherein two or more of the diverse network connections have dissimilar network characteristics including variable path bidirectional transfer rates and latencies; wherein the logical connection is utilizable for a transfer of communication traffic bidirectionally on any of the diverse network connections without any configuration for the dissimilar network connections or by the diverse network carriers; and wherein the network aggregation engine includes or is linked to a network aggregation policy database that includes one or more network aggregation policies for configuring the aggregated groups within accepted tolerances so as to configure and maintain the aggregated network connection so that the logical connection has a total communication traffic throughput that is a sum of available communication traffic throughputs of the aggregated group of diverse network connections.

In another aspect, embodiments described herein may provide a client site network component implemented at least at least a first client site in network communication with a second client site, wherein the first client site and the second client site are at a distance from one another that is such that would usually require long haul network communication, the client site network component bonding or aggregating one or more diverse network connections so as to configure a bonded/aggregated connection that has increased throughput, the client site network component configured to connect to at least one network server component implemented at an access point to at least one wide area network, the network server component automatically terminating the bonded/aggregated connection and passing the data traffic to an access point to at least one wide area network, the client site network component configuring a virtual edge providing at least one of transparent lower-link encryption and lower-link encapsulation using a common access protocol for the bonded/aggregated connection.

In accordance with some embodiments, the client site network component may be configured to separate lower-link data traffic and use the common access lower-link protocol for encapsulation of data packets of the lower-link data traffic for the bonded/aggregated connection.

In accordance with some embodiments, the client site network component may configure a route to the at least one network server component to separate the lower-link traffic to prepare the data traffic for the bonded/aggregated connection or the managed network overlay.

In accordance with some embodiments, the route may be a static route, a dynamic route or a route from a separate or independent virtual routing forwarding table.

In accordance with some embodiments, the client site network component may be configured to transmit echo packets to the network server component to provide Multi-Directional Pathway Selection for pre-emptive failover using the echo packets.

In accordance with some embodiments, the client site network component may be further configured to provide IPDE for packet distribution with differing speed links using weighted packet distribution and for bi-directional (inbound and outbound) QoS.

In another aspect, there is provided a network server component configured to interoperate with a client site network component at a first client site to bond or aggregate one or more diverse network connections so as to configure a bonded/aggregated connection that has increased throughput, the network server component including at least one concentrator element implemented at a network access point to at least one network, the network server component automatically terminating the bonded/aggregated connection and passing data traffic to the network access point to the at least one network for data transmission to a second client site, the first client site and the second client site at a distance from one another that is such that would usually require long haul network communication, the network server component configuring a virtual edge connection providing at least one of transparent lower-link encryption and lower-link encapsulation using a common access protocol for the bonded/aggregated connection, the network server component in communication with a cloud network controller configured to manage the data traffic so as to provide a managed network overlay that incorporates the virtual edge connection and at least one long haul network path carried over the at least one network.

In accordance with some embodiments, the network server component may have a first concentrator element implemented at the network access point to the at least one network and a second concentrator element implemented at another network access point to at least one other network. The first concentrator element and the second concentrator element are configured to interoperate to provide a virtual core connection between the network access point and the other network access point, the virtual core connection providing another bonded/aggregated connection. The cloud network controller is configured to manage the data traffic so as to provide the managed network overlay that incorporates the virtual edge connection, the virtual core connection and the at least one long haul network path carried over the at least one network and the at least one other network.

In accordance with some embodiments, the network server component may be configured to use the common access lower-link protocol for encapsulation of data packets of the lower-link data traffic for the bonded/aggregated connection.

In accordance with some embodiments, the network server component may be configured to receive echo packets from the client site network component to provide Multi-Directional Pathway Selection (MDPS) for pre-emptive failover using the echo packets.

In accordance with some embodiments, the network server component may be configured to provide IPDE for packet distribution with differing speed links using weighted packet distribution and for bi-directional (inbound and outbound) QoS.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

Examples of embodiments of the invention will now be described in greater detail with reference to the accompanying drawings, in which:

FIG. 1a illustrates a prior art network configuration that includes a bonded/aggregated network connection. FIG. 1a illustrates an example problem of long haul aggregation/bonding with a non-distributed firewall.

FIG. 1b also illustrates a prior art network configuration that includes central management of bonded/aggregated network connections, which also shows the problem of long-haul aggregation/bonding with multiple customer sites and a non-distributed firewall.

DETAILED DESCRIPTION

Figure 1C:
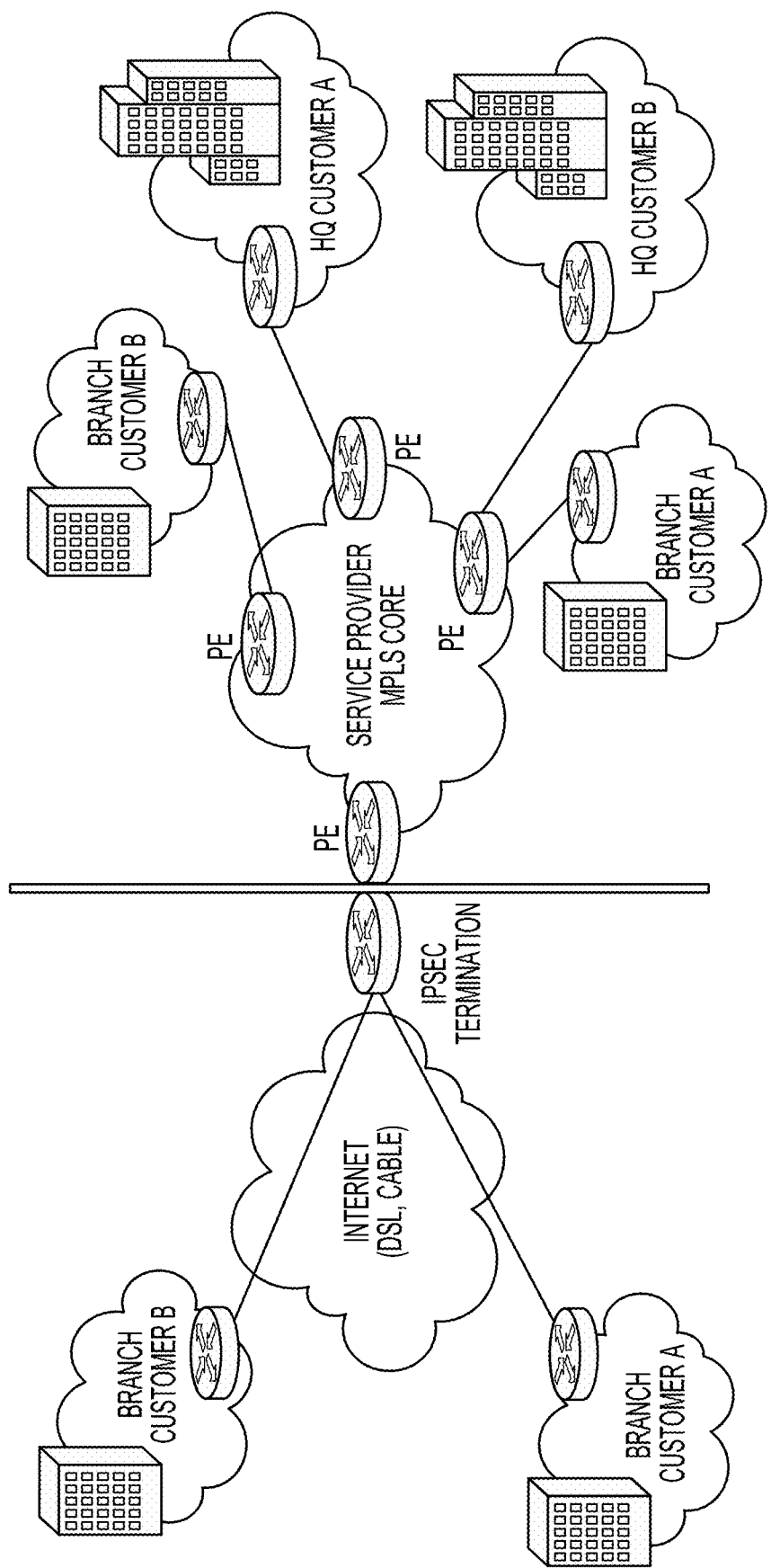
FIG. 1c illustrates a prior art MPLS network configuration with IPSEC embedded.

Embodiments may provide network infrastructure with utilization of diverse carriers and diverse connections via high-quality link aggregation in combination with a secured and trusted virtual network overlay. The virtual network overlay may provide a managed and encrypted connection of virtual links to provide a virtual WAN, for example. These embodiments may provide a firewall system that centralizes and unifies the management of a plurality of distributed firewalls where the firewall system is interoperable with the virtual network overlay.

Asset Alias

Embodiments may provide firewall management using a template based system for firewall policy and rule management with asset alias capability. For example, a retailer may have 1000 sites and with different assets or devices at the sites. At every site location the retailer system refers to an asset or device as Point of Sale 1 (POS1). Accordingly, there may be multiple assets or devices referred to as POS1 across all sites. The system may need to know the address of the asset to protect it using one or more firewalls and this may be difficult to do across all sites given the duplicate or ambiguous name references. Embodiments may provide firewall 5 management by system cataloging all devices or assets and assigns site based aliases to each identifier or reference for a device or asset (e.g. POS1$1 for site 1). The asset aliases are used to manage assets across sites by providing a unique reference for the device or asset across all sites. The distributed firewalls function on a template based firewall policy across all sites (e.g. the same policy for all sites). Embodiments may provide a visualization of firewall management 10 in the cloud using the asset aliases to manage and create firewalls for all sites using the template based firewall policy.

Embodiments described herein may provide firewall integration for Internet of Things (IoT) devices to provide IoT device security and firewall management. Accordingly, IoT devices are also example assets that can be assigned asset aliases for management by system.

Distributed Firewalls

As noted, there may be trombone network traffic effect for a central site. Known systems install a firewall at central site and this creates inefficiencies due to the trombone effect. Distributed firewalls at individual sites can be independently managed in a distributed manner. Embodiments may centrally manage the distributed firewalls. Embodiments may leverages individual processing resources of Customer Premise Equipment (CPE) devices at the individual sites, in the Controllers (CC's), and centrally manage the distributed firewalls for efficient management. In an aspect of embodiments described herein, a system and network architecture is provided for aggregating multiple network access connections from similar or diverse carriers to create a new aggregated connection that accommodates greater speed and high availability characteristics, and that connects to an MPLS network via customer premises equipment (CPE-CE) or cloud concentrator/ provider equipment (CCPE). In another aspect of these embodiments, a perimeter and distributed firewall VNF is provided that abstracts the entire firewall from the perspective of the branch while still using an on-premise or customer premise equipment (CPE) at each site. Specifically, a firewall system may provide distributed and centrally managed firewalls. This may reduce the latency and inefficiencies associated with monitoring the firewall or firewalls associated with one or more client site network components or CPEs at a centralized site. A firewall may be integrated with a client site network component or CPE that also provides for bonding or aggregation of one or more diverse network connections.

Embodiments described herein can provide central management of distributed firewalls. In some embodiments, there may be some central firewalls while at the same time also performing distributed security perimeter packets checking to leverage the distributed system. For example: a third party virus scanner for file transfers on SD-WAN traffic may require all file sharing traffic to pass through it at a head office CPE device. The system can also support this configuration in some embodiments.

Wide Area Networks ("WAN")

A Wide Area Network ("WAN") is a network that covers a wide or broad geographic area that may span cities, regions, countries, or the world. The Internet may be viewed as a WAN, for example. A WAN may be used to transmit data over long distances and connect different networks, including Personal Area Networks ("PAN"), Local Area Networks ("LAN"), or other local or regional network. A WAN may connect physically disparate networks and different types of networks that may be local or remote. An Enterprise WAN may refer to a private WAN built for a specific enterprise often using leased or private lines or circuit-switching or packet-switching methods.

Multi-Protocol Label Switch (MPLS)

Multi-Protocol Label Switch (MPLS) is a technology framework developed by the Internet Engineering Task Force. MPLS can be a WAN virtualization using virtual routing and forwarding. The technology may be used to build carrier and enterprise networks, implemented with routers and switches. Notably, MPLS is protocol independent and can map IP addresses to MPLS labels. MPLS improves network performance by forwarding packets (e.g. IP packets) from one network node to the next based on short path labels, avoiding complex lookups in a routing table. MPLS utilizes the concept of labels to direct data traffic, as a label associated with a packet generally contains the information required to direct the packet within an MPLS network. Generally speaking, a packet can enter an MPLS network through an MPLS ingress router or a provider edge/point-of-entry (PE) router, which encapsulates the packet with the appropriate labels. As the packet is transmitted along the MPLS network paths, various nodes in the network forward the packet based on the content of the labels. Sometimes a label switch router (LSR) switches or swaps the label(s) on a packet as it forwards the packet to the next node. When the packet leaves the MPLS network, an MPLS egress router or a provider edge (PE) router removes the label(s) from the packet and sends it on its way to the final destination. Typically, provider edge (PE) routers or their equivalent network elements sit on the edge of an MPLS network and act as an interface between the customer-side network and the MPLS core network. PE routers, as described above, can add or remove label(s) to incoming and exiting packets or data traffic. A single PE router may be connected to one or more customer networks. Within the MPLS core network, label switch routers (LSRs) receive incoming packets and route or forward the packets in accordance with their respective label information. LSRs can also swap or add label(s) to each packet.

A customer who wishes to connect to an MPLS network may employ the use of customer edge (CE) routers or their equivalent network elements, which can be located on the customer premises. The CE routers can connect to one or more PE routers, which in turn connects to the MPLS core network.

MPLS can deliver a range of benefits to customers, including: convergence of voice and data networking, high performance for mission-critical and cloud applications, easy-to-manage or fully managed environments reducing operating cost, Service Level Agreement SLA based assurances, and so on. MPLS can be delivered with a variety of access technologies such as layer2, layer3, on the edge over the internet via IPSEC, and so on. In addition, MPLS itself is trending as a core 10 networking technology with options to establish access edge points.

Routers may be any device including, without limitation, a router, switch, server, computer or any network equipment that provides routing or package forwarding capacity. Routers may or may not have routing tables. Routers may be implemented in hardware, software, or a combination of both. Routers may also be implemented as a cloud service and remotely configurable.

IPVPN/IPSEC

To improve security and confidentiality of data communicated over an MPLS network, Internet Protocol Security (IPSEC), a protocol suite for securing IP communication, may be adapted in addition to an MPLS network. With IPSEC VPN, the MPLS network is considered secured and trusted. IPSEC gateways can be any network equipment such as computers, servers, routers, or special IPSEC devices. IPSEC VPN is typically provisioned using a CE router connected to a broadband internet circuit. Alternatively, IPSEC may be implemented at the PE routers or device. AN MPLS network with IPSEC features is also sometimes also referred to as an IPSEC VPN or IPVPN network.

For example, IPSEC VPN can access MPLS networks on the edge, which may be a low cost approach for branch connectivity. However, while typical IPSEC VPN can offer low price tag and reach, it lacks traffic prioritization/CoS capabilities and may be hindered by poor provider Service Level Agreement (SLA) and/or Mean Time to Repair (MTTR). IPSEC VPN for MPLS Edge has not been innovated.

Generally speaking, the MPLS market in North America is growing quickly, however, price of MPLS is suffering from commoditization of private networks and from customer demand for lower prices. Despite such constraints, purchasing MPLS network can be as much as 30% more expensive compared to getting typical broadband network. Many customers are seeking an IPVPN solution with a lower price tag and increased bandwidth. For example, many MPLS customers seek an IPVPN backup solution on top of their primary network. These customers may also desire alternative network providers, technologies and implementations (e.g. 4G, other broadband solutions). Today IPVPN is typically purchased for cost and reach. However, IPVPN has numerous drawbacks such as the lack of traffic prioritization and CoS capabilities. IPVPN can also be hindered by poor provider service-level agreement (SLA)

and mean time to repair (MTTR) on a given service or provider. There is thus a need for an innovative network solution that provides better network performance and quality of service.

Link Aggregation with MPLS

For customers who want to have an end-to-end VPN or MPLS network, at least one issue with MPLS networks is that they do not typically extend to the actual customer or client sites as the PE or ingress routers defining the "edge" of the MPLS network core are typically situated at network providers' premises. In order to maintain the high level of performance provided by an MPLS (with or without IPSEC) network, a solution is required to connect the client site to the MPLS network at the PE routers. To date, some form of link aggregation technology has been occasionally adapted to fill the gap between the MPLS PE routers and the actual client site(s). However, in the current state of the art, most link aggregation technologies cannot connect to dissimilar or diverse carriers or connections.

An MPLS network or Enterprise WAN is typically sold as a private product or service and thus cannot offer diverse carriers or network providers, but rather require physical local loop to the end customer using the same carrier or network provider.

In a market research, drivers for corporations to choose a network architecture solution may include:
  Demand for low-cost IP network services to converge business applications
  Support for multiple access technologies
  Cost competitiveness against MPLS and IPVPN
  Support for traffic prioritization
  Reasons for deploying a network architecture solution may include:
  Improved operational efficiency/lower Operating Expenses OPEX
  Improved service scalability (quick & simplified service deployment)
  Link major company sites/facilities
  Consolidate converged applications (voice, data, Internet, video)
  Focus on core business while provider manages the routing
  Reduce IT/Telecom staff
  Criteria for selecting WAN (Wide Area Network) network architecture solution and services may
  Security
  Price and pricing structure complexity
  Service reliability/QoS
  Adequate guaranteed bandwidth
  Service availability at key sites (geographic reach)
  Performance/SLA guarantees
  Operation/OPEX costs
  Interoperability with existing network and access services
  Self-service portals and customer support/customer care
  Flexibility/scalability (quick service provisioning/bandwidth changes)
  Equipment costs (including ability to leverage existing CPE)

Examples are described herein in relation to MPLS as an illustrative example transport mechanism where data packets are assigned labels. This is an example only and other transport mechanisms may be used with different labeling or encapsulation techniques.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the various programmable computers may be a server, network appliance, set-top box, embedded device, computer expansion module, personal computer, laptop, personal data assistant, cellular telephone, smartphone device, UMPC tablets and wireless hypermedia device or any other computing device capable of being configured to carry out the methods described herein.

Program code is applied to input data to perform the functions described herein and to generate output information. The output information is applied to one or more output devices, in known fashion. In some embodiments, the communication interface may be a network communication interface. In embodiments in which elements of the invention are combined, the communication interface may be a software communication interface, such as those for inter-process communication (IPC). In still other embodiments, there may be a combination of communication interfaces implemented as hardware, software, and combination thereof.

Each program may be implemented in a high level procedural or object oriented programming or scripting language, or both, to communicate with a computer system. However, alternatively the programs may be implemented in assembly or machine language, if desired. The language may be a compiled or interpreted language. Each such computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer useable instructions may also be in various forms, including compiled and non-compiled code.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

MPLS Edge

Some embodiments may involve an MPLS network as an example network. MPLS Edge is an improved alternative to IPSEC VPN on the MPLS network. In one aspect, Autonomous Network Aggregation (ANA) or a network bonding/aggregation technology can be used as part of a hybrid solution to extend an MPLS network, allowing partners to use lower-cost broadband connectivity while maintaining the quality and reliability of an MPLS service. In another aspect, MPLS Edge virtualizes MPLS over network bonding/aggregation on the edge of carrier infrastructures, delivering MPLS labels to the customer premises equipment or device coupled with network bonding/aggregation. For example, cloud concentrators in ANA or a link aggregation system may act as an MPLS PE (Provider Edge) router on the edge of the network.

Most existing prior art link aggregation technologies cannot connect to dissimilar or diverse network carriers or connections. In addition, MPLS network is typically sold as a private product or service and thus cannot offer diverse carriers or network providers, but rather require physical local loop to the end customer using the same carrier or network provider. Using the network bonding/aggregation technology with MPLS network as described herein allows for the utilization of diverse carriers and diverse connections via high-quality link aggregation in combination with a secured and trusted MPLS network.

MPLS Edge technology can extend an MPLS network to the customer's LAN as a private service offering that can deliver consolidated WAN, VoIP, and Internet access.

Software Defined Networking

In Software Defined Networking (SDN), a firewall is a network function. The act of implementing these network functions into the cloud may be referred to as Network Functions Virtualization (NFV). When implemented network-wide for a customer network or as a service, this may be referred to as a Virtual Network Function (VNF). NFV and VNF may be interchangeably in some examples. In an aspect of embodiments described herein, a system and network architecture is provided for aggregating multiple network access connections from similar or diverse carriers to create a new aggregated connection that accommodates greater speed and high availability characteristics, and that connects to an MPLS network via customer premises equipment (CPE-CE) or cloud concentrator/provider equipment (COPE). In another aspect of these embodiments, a perimeter and distributed firewall VNF is provided that abstracts the entire firewall from the perspective of the branch while still using an on-premise or customer premise equipment (CPE) at each site. Specifically, a firewall system may provide distributed and centrally managed firewalls. This may reduce the latency and inefficiencies associated with monitoring the firewall or firewalls associated with one or more client site network components or CPEs at a centralized site. A firewall may be integrated with a client site network component or CPE that also provides for bonding or aggregation of one or more diverse network connections.

One or more firewalls may together support a software defined perimeter (SDP). Enterprise users, IoT devices, and Cloud Computing services require more than traditional firewalling. An SDP leverages additional authentication and data analytics to help protect corporate assets. The concept of dark clouds similar to SD-WAN private cloud can be expanded as part of the overall security strategy for SDP.

Figure 10:
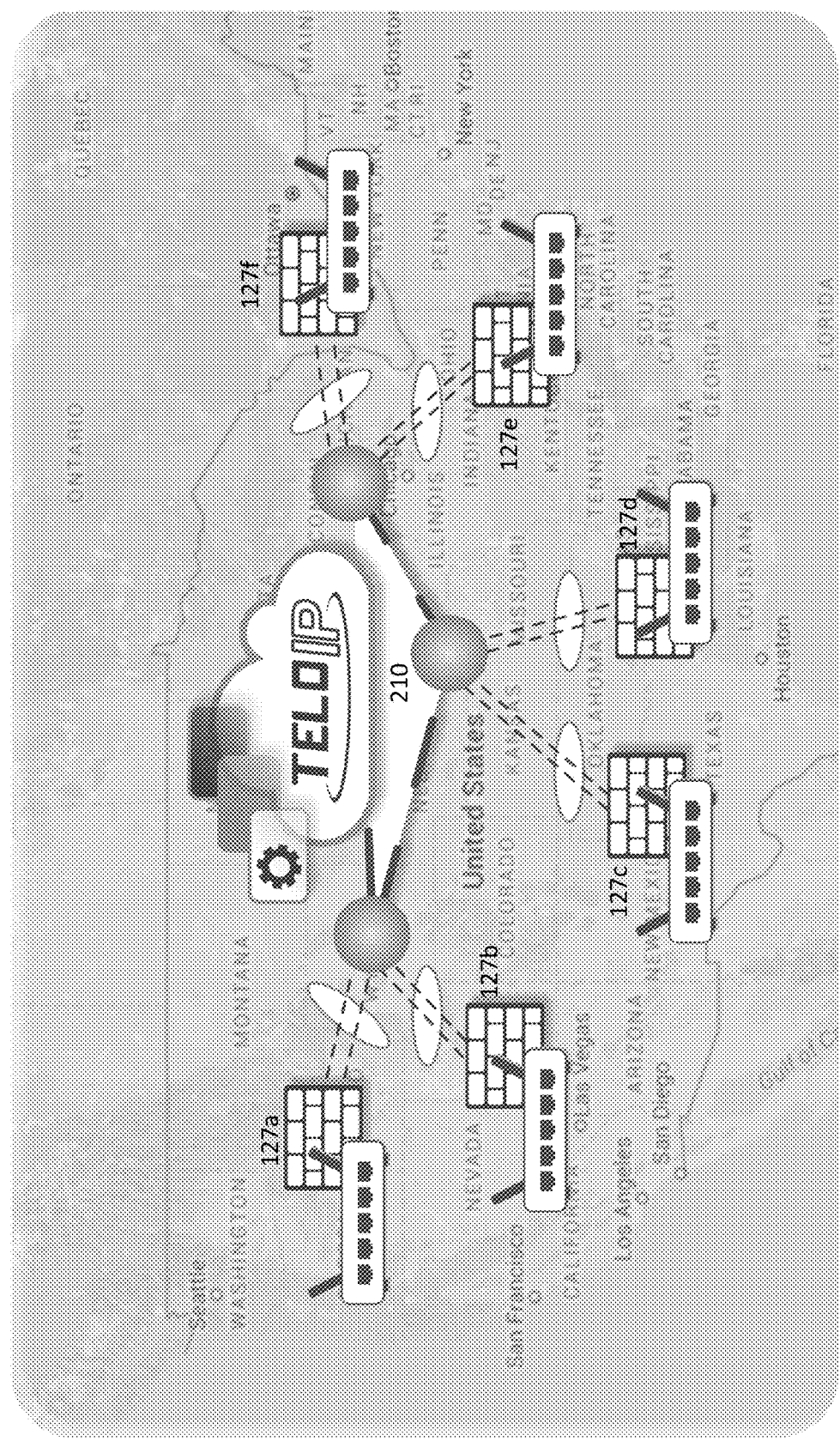
FIG. 10a illustrates a distributed firewall virtual network function solution with unified firewall management, in accordance with one embodiment.

FIG. 10a is a diagram of an example distributed firewall virtual network function solution with unified firewall management 200 with distributed firewalls 127a, 127b, 127c, 127d, 127f across CPEs. FIG. 10b is a diagram of another example distributed firewall virtual network function solution.

The firewall system 200 may provide a distributed firewall device-based system with distributed processing; linear scaling capabilities in a scale out model; and processing, implementation, and/or functionality at customer premises (e.g. CPEs) with close proximity to client site network components, assets, devices, branches, and/or CPE-CEs that are protected by the firewall system 200.

A centralized firewall network controller 210 may be provided for unifying or centralizing the management of multiple and distributed firewalls 127a, 127b, 127c, 127d, 127f and the associated security and policy controls. The centralized firewall network controller 210 may be implemented as a virtual overlay or single pane-of-glass for SD-WAN and SD-Internet implementations. The centralized firewall network controller 210 may facilitate, assist with, or support centralized policy updates, distributed multi-site protection, virtualized firewall functions, and defense of one or more or all branches at one or more client site network components or CPE. The firewall system 200 may enable dynamic firewall configuration, reduce latency and provide efficiency over prior art firewall implementations that do not support distributed firewalls 127, and be scalable. The firewall 202 may enable the use of policy templates and asset aliases, as described herein.

For example, a firewall system 200 interoperable with a virtual overlay or single pane-of-glass for SD-WAN and SD-Internet implementations may enable zero touch branch firewall provisioning, dynamic security policy updates, centralized orchestration, security policy templates, role-based access and logging, actionable threat intelligence, and enterprise-wide policy updates. In some embodiments, the firewall system 200 can implement actionable threat intelligence using network data science collected from centralized firewall logs, NetFlow Data, and other network and traffic raw data that can be scanned for anomalies. For example, firewall system 200 can observe that one CPE device or site caught a certain low amount of repetitive deny rules or syn-flood type packets that may be considered normal. However, if this happened at more than one branch around the same time, then it could be an attack. The ability to sense this and act upon it by dynamically or permissively spawning a block of this traffic is the action based on the data collected in this example. Firewall system 200 may use big data methods for network and application control in a decision tree to augment existing control and data plane functionality for improving the user quality of experience. For example, this may support centralized log data, anomaly detection, and actionable intelligence.

Firewall system 200 may provide unified firewall management, a cloud-managed branch firewalls 127a, 127b, 127c, 127d, 127f, asset inventory and management, a dynamic security perimeter, and/or early warning detection functionality. Unified firewall management may provide a distributed network defense system.

A cloud-managed branch firewall may provide for multi-tenant management, role-based access control, template-based firewall provisioning, centralized security policy updates, dynamic rules and asset definitions, visualization of all sites in a single view, and an ability to back-up, restore, and/or rollback modifications to one or more firewalls.

An asset inventory and management feature may implement auto-asset discovery at the branch, maintain an inventory of all sites with devices or assets and open ports, identify unauthorized or new devices at the branch, asset aliases, and/or enable management reporting and changing.

A dynamic security perimeter may comprise a distributed virtual branch of firewalls 127a, 127b, 127c, 127d, 127f with stateful packet inspection and/or provide for firewall processing power that scales with the number of client site network components or CPEs and/or the protection of local assets and improvement of customer quality of experience, for example, by avoiding WAN or internet traffic "tromboning" to a central firewall.

An early warning detection feature may provide for actionable threat intelligence, data that may provide bandwidth and traffic analytics, rules and policy reports by site and global views (packets and bytes), detection of trending attacks from all sites, identification of top attackers, and/or identification of top attacked sites.

The firewall system 200, may provide the following example benefits over SD-WAN firewall alternatives: integrated stateful firewall, cloud management branch firewall, cloud firewall (centralized), distributed firewalls (branch/perimeter), centralized and extensible firewall templates, single pane-of-glass, firewall templates, automatic network asset discovery and user identification, address objects and groups (such as alias/assets, for example), policies and rules, dynamic firewall policy updates (dynamic object groups), centralized logging, role based administrator with change logs and alerts, and reports (actionable threat intelligence).

Figure 11:
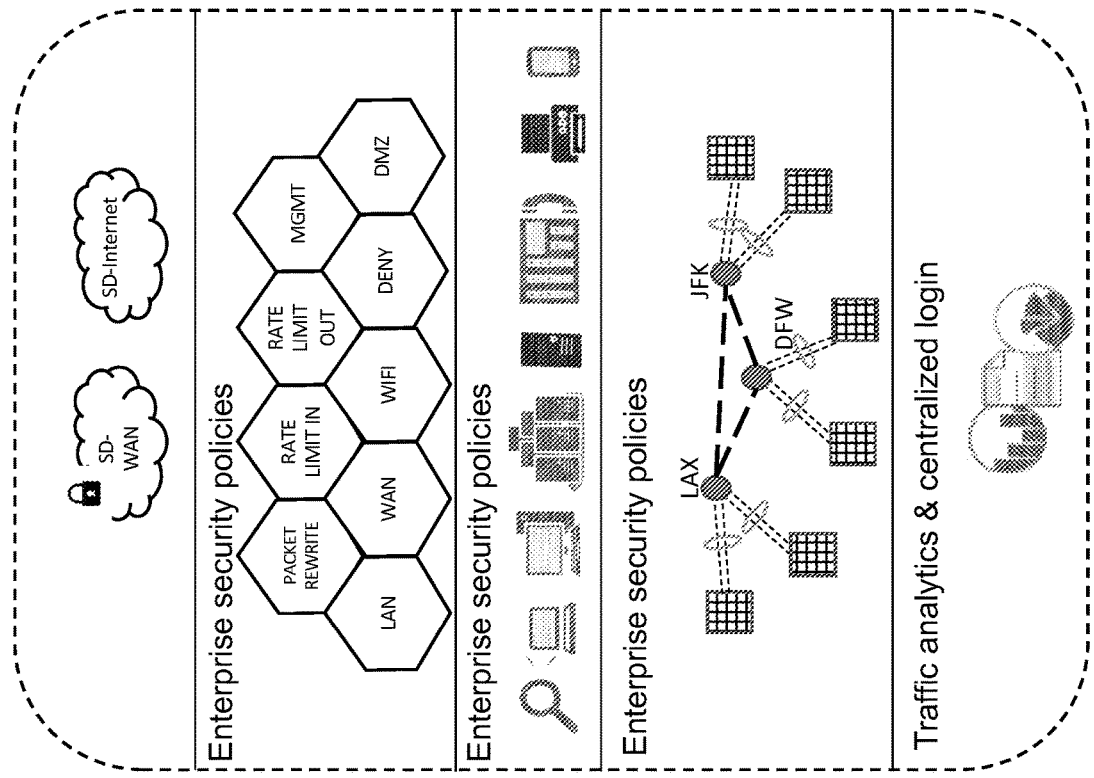
FIG. 11 illustrates features of a distributed firewall virtual network function solution with unified firewall management, in accordance with one embodiment.
Figure 11:
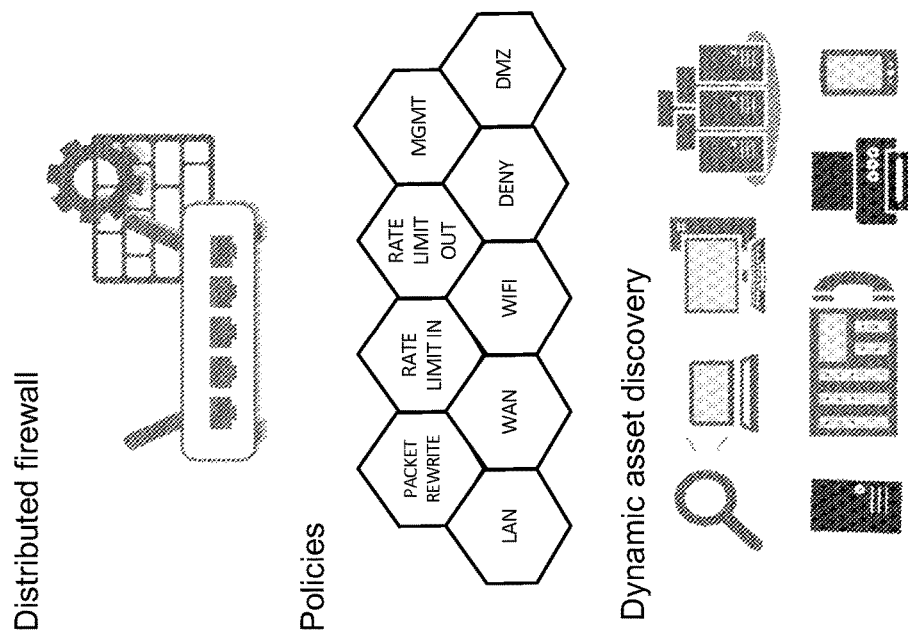

FIG. 11 is a diagram of further exemplary features for dynamic asset discovery. Firewall system 100 can have the ability to execute a remote scan on mass across the enterprise at multipole sites either simultaneous or on a scheduled procedure. The firewall system 200 can look for and catalogue into inventory all local assets at the branch and find any newly connected devices. The firewall system 200 implements scanning at layer2 for hardware addressing and can also attempt to fingerprint the OS/Vendor/Device type for future actions and to be added into alias lists.

In some embodiments, a firewall system 200 may embed one or more firewalls where branch assets are located. This may enable or facilitate dynamic security protection at the branch. For example, a firewall may be integrated with a client site network component or device/asset to provide security and policy controls for the client site network component or device/asset. This may enable or facilitate security and performance characteristics. For example, rules, security, and/or policy controls may be applied to data or traffic transmitted to the client site network component, CPE, or device/asset, without transmitting data associated with the security and policy controls or data associated with the data or traffic to a centralized site. Security and policy controls may be applied by a client side network component to incoming data or traffic transmitted to that client site network component.

In some embodiments, one or more rules and/or security and policy controls may configure one or more firewalls 127a, 127b, 127c, 127d, 127f associated with a client side network component or device 124 in a firewall system 200.

In some embodiments, dynamic security protection may include auto discovery for branch asset inventory; stateful packet inspection from a client site network component or CPE (124); ability to control WAN and internet traffic policies; no added latency or trombone effects, for example, associated with maintaining one or more firewalls for one or more client site network components, CPEs, or branches at a single or centralized site; and support for scaling of processing power with the number of client site network components or CPEs associated with firewall system 200.

In some embodiments, firewall system 200 uses template-based firewall policies to define strict policy definitions for rules, security, and/or policy controls that may govern the protection or security of assets in an enterprise or in one or more networks. A single site asset or a single global asset may adhere to a predefined policy and template structure that may be created, controlled, and/or implemented by firewall system 200 or, more specifically, centralized firewall network controller 210. The asset may be referred to using an asset alias. The firewall system 200 is operable to generate asset aliases. The firewall system 200 may generate an ALIAS/ASSET list, that is, a list of IPs or subnets that a rule may use. For example, a rule may specify "allow ip from any to $ASSETLIST via=GE0 dir=in", where "$ASSETLIST" is a list of IPs, "GE0" is the interface of the LAN, and "dir" is inbound from the LAN.

Figure 12:
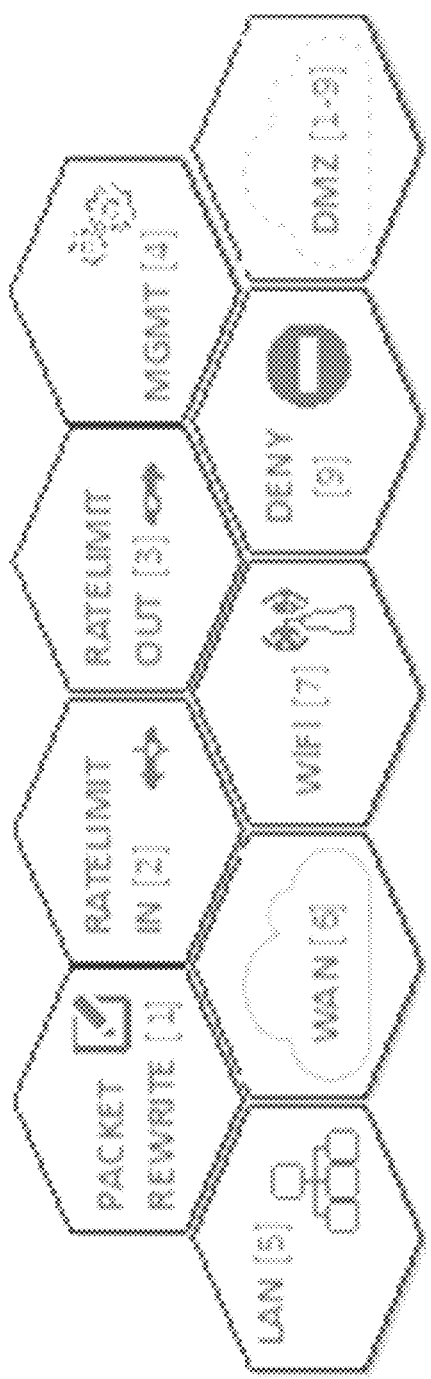
FIG. 12 illustrates firewall policies of a distributed firewall virtual network function solution with unified firewall management, in accordance with one embodiment.
Figure 13:
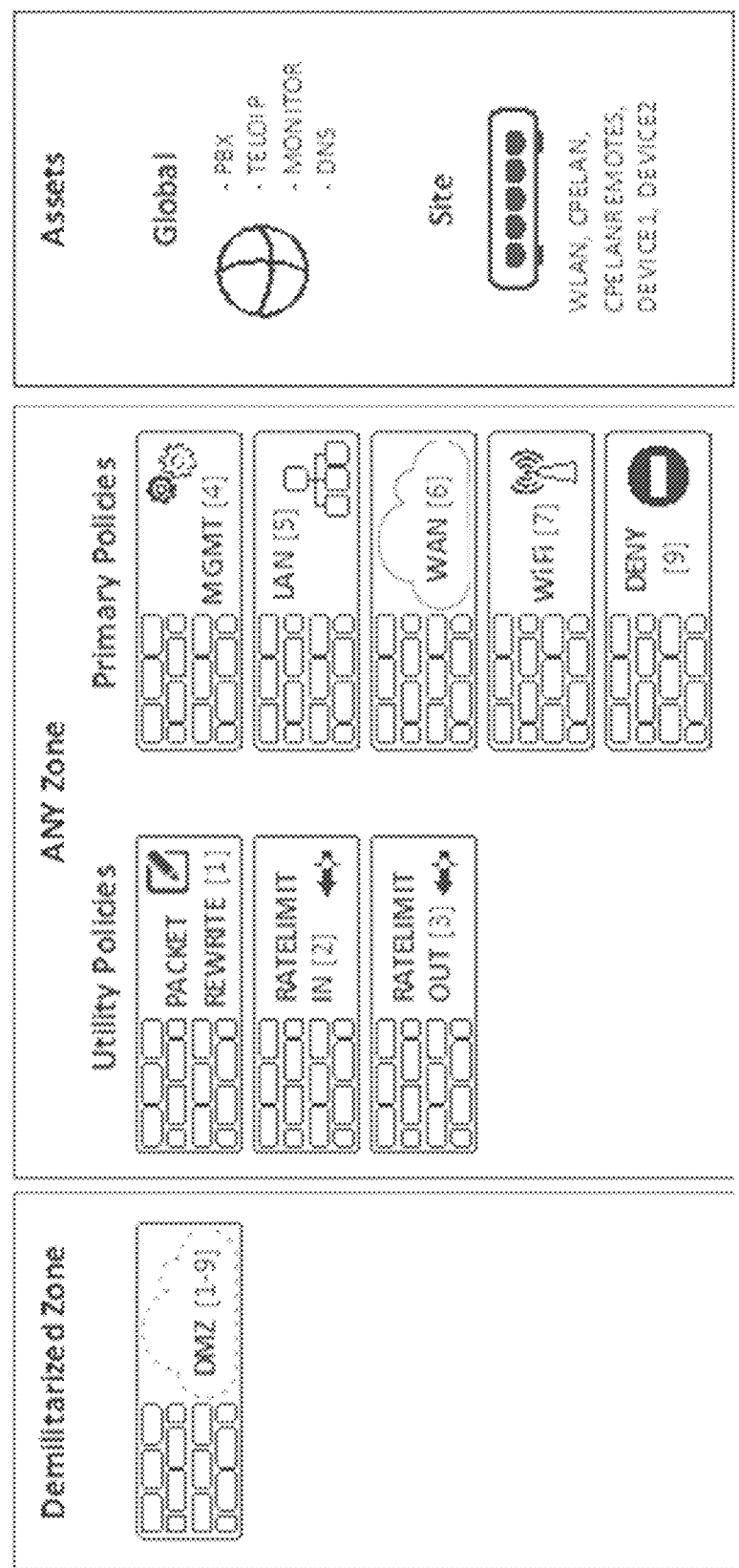
FIG. 13 illustrates zones, attached policies, and asset types for a distributed firewall virtual network function solution with unified firewall management, in accordance with one embodiment.

Rules that may govern the protection or security of one or more assets associated with firewall system 200 may be grouped into a profile or policy that may act as a container of rules. A profile may be viewed as a policy group and the rules inside them as an individual policy. FIG. 12 illustrates 9 policies or profiles. As shown in FIG. 13 the policies may attach to or may be associated with traffic, zones, interfaces, or zone "ANY". In some embodiments, a demilitarized zone (DMZ) may be supported by firewall system 200 and may support attachment of up to 9 custom policies or profiles that may bypass the "ANY" zone. For example, a security zone, "ANY" zone, and "DMZ" zone may exist for each interface and may support attachment of profiles. This may be more advanced than conventional firewall zones.

For example, a zone can flatten the site and allows for top level policy control in a ubiquitous manner not tied to specific interfaces or devices. This approach can make it easier to template the firewall. In some embodiments, profiles may be attached only on the "ANY" and "DMZ" zones, while firewall system 200 or more specifically, centralized firewall network controller 210, may manage additional zones, for example, using an alias-asset mapping index or list.

FIG. 12 is a diagram of nine example policies. The policies or profiles may include PACKET REWRITE, RATELIMIT IN, RATELIMIT OUT, MGMT, LAN, WAN, WiFi, DENY, and DMZ, and the policies or profiles may be ordered in an index managed by firewall system 200. In some embodiments, the index may order example policies as follows: PACKETREWRITE [1], MGMT [4], RATELIMIT IN [2], RATELIMIT OUT [3], WAN [6], LAN [5], WIRELESS [7], OTHER [8] (reserved/spare), DENY [9]. A RESERVED policy may also be provided in some embodiments. Each policy or profile may support a number of rules from 1 to 200. Firewall system 200 may therefore not be limited by zones, and the "ANY" zone may support 1800 rules or policy entries and the "DMZ" zone may support 3600 rules or policy entries. In some embodiments, the total number of rules supported by firewall system 200 may be 65535. A rule may contain information that may be used to govern, handle, direct, act on, or exclude traffic. A RESERVED policy can be a rule space reserved for a carrier. A PACKET REWRITE policy can be a rule space used for rules that modify packets. RATELIMIT IN can be a special profile reserved for rate limiting policies on input traffic to a device, client site network component, or CPE and may allow one or more definitions for clauses or rules to define matched (traffic rules) and excluded traffic (bypass rules).

RATELIMIT OUT can be a special profile reserved for rate limiting policies on output traffic from a device, client site network component, device/asset or CPE and may allow one or more definitions for clauses or rules to define matched (traffic rules) and excluded traffic (bypass rules). MANAGEMENT can be a rule space used for rules related to device management, monitoring, and instrumentation and may include permit rules for applications such as Simple Network Management Protocol SNMP or applications for logging or remote access (SSH/Telnet). LAN is a rule space that may be used for rules related to LAN-based applications or devices. WIRELESS is a rule space used for rules related to wireless devices and interfaces. WAN is a rule space used for WAN based applications or devices. DENY can be a rule space used for rules used to deny unwanted traffic from entering or leaving one or more networks.

In some embodiments, firewall system 200 may be compatible with the AgniOS CPE operating system. In some embodiments, AgniOS CPE operating system and firewall 200 architecture may support 6 zones, each of which support up to 9 profiles. Each profile may be governed by an attach A standard rule is a rule that performs one or more actions on traffic. Standard rules may be added to various profiles based on the context of the rule. Contexts in this description can refer to zones and por policies contained in the following example profiles: RESERVED, PACKET REWRITE, MANAGEMENT, LAN, WIRELESS, WAN, and DENY. The following contexts may be available for the addition of standard rules: RESERVED, PACKET REWRITE, MANAGEMENT, LAN, WIRELESS, WAN, and DENY. A standard rule may have the following elements defined: index, which is the order of execution for the rule within one or more profiles (index orders are cumulative and calculated based on inheritance by tier as defined in the tier section); name, which is a short description between 3 and 30 characters in length that describes the rule; action, which is an action the rule performs or causes to be performed and its value, if any. The following is an example action table from the firewall of the CPE gathered from its CLI:

| Firewall Action Table: | |
|---|---|
| Action | Description |
| allow | Allow matching packets. The search terminates. |
| deny | Discard matching packets. The search terminates. |
| count | Update counters for matching packets. |
| reset | Discard packets and send a TCP RST notice. |
| reset6 | Discard IPv6 packets and send a TCP RST notice. |
| reass | Queue and reassemble ip fragments. |
| check-state | Checks the packet against dynamic ruleset. |
| fwd=ipaddr[,port] | Change next-hop on matching packets to ipaddr. If ipaddr is local address, forwarded packet to port. |
| unreach=code | Discard matching packets, send an ICMP unreachable notice with code(0-255). |
| unreach6=code | Discard matching packets, send an ICMPv6 unreachable notice with code(0-255). |
| setdf=0\|1 | set DF flag 0 or 1. DF is Don't Fragment flag on a IP header. |
| setmss=mss_value | set maximum segment size on a TCP SYN control packet. |
| setwscale=shift_count | set window scale on a TCP SYN control packet. range: 0-14. |
| setfib=fibnum | set packet to use the FIB (routing table). fibnum: 0-15. |
| iptos-mark=tos-value | set TOS field with types of service on match IPv4 packet. tos-values are lowdelay, throughput, reliability, mincost, congestion and ecntransport. |
| ipprecedence-mark=IPP | set TOS field with IP precedence. IPP (precedence) value: 000-111. |
| dscp-mark=dscp-code | set TOS field with DSCP-code. include: CS0, CS1, CS2, CS3, CS4, CS5, CS6, CS7, AF11, AF12, AF13, AF21, AF22, AF23, AF31, AF32, AF33, AF41, AF42, AF43, EF. |
| tosbyte-mark=hex-value | set TOS field with one hexadecimal. range: 0x00-0xFF (prefixed by 0x). | index 1-9. The index may contain an order that indicates the sequence in which one or more firewalls 127 or firewall system 200 processes a policy and rules within or associated with the policy. For example, a profile may be attached to a zone, and zones may include bonded connection profile (attach profile on a bonded connection profile), bonded connection server (attach profile on bonded connection server profile), ANY (attach profile on any), dhcp-client (attach profile on dhcp-client profile), DMZ (attach profile on DMZ), and interface (attach profile on interface). When a profile is attached to DMZ, traffic may bypass firewall and network address translation (NAT) rulesets.

A firewall 127a, 127b, 127c, 127d, 127f may be an electronic physical medium that defines a set of policies attached to a zone or interface, for example, ANY and/or DMZ. An index may be used to represent a pre-defined scheme or priority for processing one or more policies. A policy is a logical grouping of firewall rules based on purpose.

One or more rules may be used, for example, by firewall 127a, 127b, 127c, 127d, 127f to manage traffic flowing through a client site network component or device. By way of example, firewall system 200 may use two types of rules: 1) standard and 2) rate-limiting rules.

| QoS Map Table: | | | | | |
|---|---|---|---|---|---|
| Pri | IPP | IPTOS | DSCP | Class | Description |
| 7 | 111 | 0xE0 | 56-64 | CS7 | Network Control |
| 6 | 110 | 0xC0 | 48-55 | CS6 | InterNetwork Control |
| 5 | | | Critical | | |
| | 101 | 0xB8 | 46 | EF | Voice Data (RTP) |
| | 101 | 0xA0 | 40 | CS5 | |
| 4 | | | Flash Override | | |
| | 100 | 0x88 | 34 | AF41 | Video Data (RTP) |
| | 100 | 0x90 | 36 | AF42 | |
| | 100 | 0x98 | 38 | AF43 | |
| | 100 | 0x80 | 32 | CS4 | |
| 3 | | | Flash | | |
| | 011 | 0x68 | 26 | AF31 | Voice Control |
| | 011 | 0x70 | 28 | AF32 | |
| | 011 | 0x78 | 30 | AF33 | |
| | 011 | 0x60 | 24 | CS3 | |
| 2 | | | Immediate | | |
| | 010 | 0x48 | 18 | AF21 | Deterministic (SNA) |
| | 010 | 0x50 | 20 | AF22 | |
| | 010 | 0x58 | 22 | AF23 | |
| | 010 | 0x40 | 16 | CS2 | |
| 1 | | | Priority | | |
| | 001 | 0x28 | 10 | AF11 | Controlled Load |
| | 001 | 0x30 | 12 | AF12 | |

QoS Map Table:

| Pri | IPP | IPTOS | DSCP | Class | Description |
|---|---|---|---|---|---|
| 0 | 001 | 0x38 | 14 | AF13 | |
| | 001 | 0x20 | 8 | CS1 Routine | |
| | 000 | 0x00 | 0 | CS0 | Best Effort |
| | 000 | 0x08 | 2 | | Penalty Box |

Ai-400_v5.0.0-RC1-firewall#

Firewall system 200 can also use protocols in some embodiments, which can be the protocol to be matched; and from, which is the source of the traffic to be matched. "From" may also include a host definition that specifies the alias or asset to be matched, the list of ports for the alias, and a flag indicating whether the matched definition is to be inverted. A standard rule may further have a "to" element defined, which is the destination of the traffic to be matched. "To" may also include a host definition that specifies the alias or asset to be matched, the list of ports for the alias, and a flag indicating whether the matched definition is to be inverted. A standard rule may further have the following elements defined: LogMatches, which indicates whether rule matches will be logged; via, which indicates the name of the interface through which traffic must be transacted to be matched by the rule; state, which is the state of traffic to be matched State meaning in this description can be the same as it is in the actual firewall code. Firewall system 200 can also use direction, which is a direction in which traffic must traverse the name interface (via) in order to be matched; options, which is a collection of RuleOptions and a flag indicating whether the specified options are to be negated. A RuleOption specifies the name of the option and the values for that option. Values for an option may be represented by a range of values, multiple values, and/or a combination of same.

Each rule may be a dynamic object that may be evaluated based on a rule context. The context is determined based on the recipient of the rule, i.e., the end CPE 124 to which the firewall which contains the rule will be bound. Asset values may be calculated based on the tier bindings for the rules. In some embodiments, the indices of the rules associated with a firewall 127 prior to this step are not calculated. Any index calculations are performed during rule CUD (Create, Update, Delete) operations to ensure that the maximum number of rules allowed per resulting profile is not violated. During this step, the indices for each resulting firewall 127 for each CPE 124 is calculated and validated. Additionally, validation may be applied to ensure that any firewalls that could be invalid due to non-existence of an expected (i.e. no override or exclusion "null" value is added for the site) asset (e.g. site based assets) are marked as such.

If validation for a specific firewall/CPE pair is found, an error may be generated and presented, for example, via a user interface, indicating that the specific publish operation for that CPE will not proceed and a user engaged with the firewall/CPE pair may be requested to approve the operation or remedy the issue.

In some embodiments, rate limit profiles, such as RATELIMIT IN and/or RATELIMIT OUT may contain a single rule per profile. These are initial examples. Other embodiments can use rate-limit by application, interface, network, or protocol. Each profile may define a single rate limit with rule definitions that match (in the case of traffic rules) or exclude (in the case of bypass rules) traffic or data packets.

Rate-limiting rules may have the following elements defined: MaximumBandwidth, TrafficRules, BypassRules, and SimpleRule. "MaximumBandwidth" is the maximum amount of bandwidth or units of measurement for a specified rate limit. Traffic matched by the TrafficRules may not exceed the specified maximum. "TrafficRules" is a list of SimpleRule elements that define the parameters to be matched for traffic to be governed by the profile. "BypassRules" is a list of SimpleRule elements that define the parameters to be matched for traffic to be excluded by the profile. Traffic rules and bypass rules, may be similar in structure to standard rules and differ in their lack of an action element. "SimpleRule" defines the following elements: protocol, from, to, via, options, direction, and state. "Protocol" is the protocol to be matched by the rule. "From" is the source of the traffic to be matched. "From" may also include a host definition that specifies the alias or asset to be matched, the list of ports for the alias, and a flag indicating whether the matched definition is to be inverted. "To" is the destination of the traffic to be matched. "To" may also include a host definition that specifies the alias or asset to be matched, the list of ports for the alias, and a flag indicating whether the matched definition is to be inverted. "Via" indicates the name of the interface through which traffic must be transacted to be matched by the rule. "Options" is a collection of RuleOptions and a flag indicating whether the specified options are to be negated. A RuleOption specifies the name of the option and the values for that option. Values for an option may be represented by a range of values, multiple values, and/or a combination of same. "State" is the state of traffic to be matched. "Direction" is the direction in which traffic must traverse the name interface (via) for it to be matched.

FIG. 13 is a diagram of example zones, possible policies that may be attached to the zones, and assets that may be secured and/or managed by firewall system 200. DMZ may support the attachment of DMZ profile, and ANY zone may support the attachment of utility policies, such as PACKET REWRITE, RATELIMIT IN, RATELIMIT OUT, and primary policies, such as MGMT, LAN, WAN, WiFi, and DENY.

A client site network component or CPE device may secure both local assets and network-wide assets. An asset may be a device, network, or group of assets or networks. An asset may be referenced by firewall system 200 or any components as alias objects.

In some embodiments, firewall system 200 may use asset aliasing mechanisms. Asset aliases reference assets at each branch or client site. Firewall system 200 is operable to generate asset aliases, record the asset aliases with a link to the underlying asset, and use a lookup table against an asset, alias, and/or object name to determine an asset alias or asset. Each asset associated with or managed by firewall system 200 may be associated with an alias or alias object and the link there between may be created by and/or stored by centralized firewall network controller 210. This may provide an abstraction of each asset so that each asset may be governed by or easily used by a firewall management system. The alias may also provide a unique identifier for the asset across multiple client sites. For example, a firewall system 200 may use a template-based system and template publishing system (220) to create and/or maintain firewalls 127a, 127b, 127c, 127d, 127f at one or more client site network components or CPEs 124. Template publishing system 220 may reference and/or identify assets using its associated alias or alias object. Firewall system 200 or centralized firewall network controller 210 may store, transmit, or receive information identifying assets associated with firewall system 200, for example, an asset inventory.

An asset may be a collection of IP networks, that is, IP addresses and subnets which represent customer devices. An asset may contain one or more networks, for example, represented by 128 tables each with 128 entries, as an illustrative example. Assets may be used to provide context to networks used in rules. Firewall system 200 may support three types of assets: 1) reserved assets, 2) global assets, and 3) site assets.

A reserved asset may be represented by a reserved alias. A reserved alias or a reserved asset is a pre-defined alias or asset that may be statically defined by the firewall system 200, for example, by centralized firewall network controller 210, and has a specific meaning at the operating system level. A reserved alias may not be redefined. Reserved aliases or reserved assets are the only aliases or assets that do not have a network associated with them.

Examples of pre-defined or reserved aliases or assets may include "ANY", which defines a catch-all for all traffic from a source or destination when creating a rule and may be used as a source (from) or destination (to) host in a rule; "me", which defines a catch-all for the local device when creating a rule and may be used as a source (from) or destination (to) host in a rule; and "dmz", which defines a catch-all for the DMZ IP space used at the branch and may be used to bypass NAT in the firewall so that a site can have NAT on non-dmz IP space and not apply NAT (skip) for the DMZ IP space.

A further example of an alias or asset may include a "global" alias or asset which is defined with a single value for all inheriting tiers and may be used to define a common set of values for all inheriting tiers. For example, a carrier or partner may define a monitoring network using a global alias from which all sub-tiers such as customers and their sites devices may be monitored.

A further example of an alias or asset may include a "site" alias or asset, which is defined with a value per site and may only be specified at a customer level for all sites for that customer. For example, a customer may want to define a specific set of devices for each site with different values at each site. A key differentiator between a site alias or asset and a global alias or asset is that a site alias or asset allows customization at the individual site whereas a global alias or asset is inherited by all sites with the same value.

In some embodiments of firewall system 200, an asset may be inherited but not over-ridden, as over-riding an asset may represent a security risk to the system. Site assets can provide flexibility such that asset-over-riding is not required in some embodiments.

In some embodiments, firewall system 200 or centralized firewall network controller 210 may support, implement, maintain and/or include a template publishing system (220) that may manage the configuration to the client site network components or branch CPE devices (124) and maintain a published state for each client site network component or device (124) in a portal associated with firewall system 200. For example, a template publishing system (220) may create, support, and/or maintain one or more templates containing information relating to rules, policies, policy definitions, policy controls, security controls, profiles, and/or implementing a firewall at one or more client site network components (124), CPEs (124), branches, sites, or nodes.

A template publishing system 220 may create, support, and/or maintain one or more master template. Each client site network component 124, CPE 124, or device may receive and follow a master template and policies defined from a master in the portal. A master template as compared to a normal template can be a matter of hierarchy. A carrier template can be a master template because it can be uneditable by any other tier below it. This may also apply to templates for Partners down to Customers, Customers to their sites and so on. Master template can be used to define an order indicating that downstream templates are bound by the parents. Each client site network component (124), CPE (124), or device may belong to a site type group to facilitate template management and use of templates to define a firewall at one or more client site network components (124), CPEs (124), or devices at one or more branches. Sites and their associated CPEs (124) may also be grouped or aggregated into collections that may be referred to as Site Groups. Rules can then be bound to these groups allowing easy templating of rules across sites.

Figure 14:
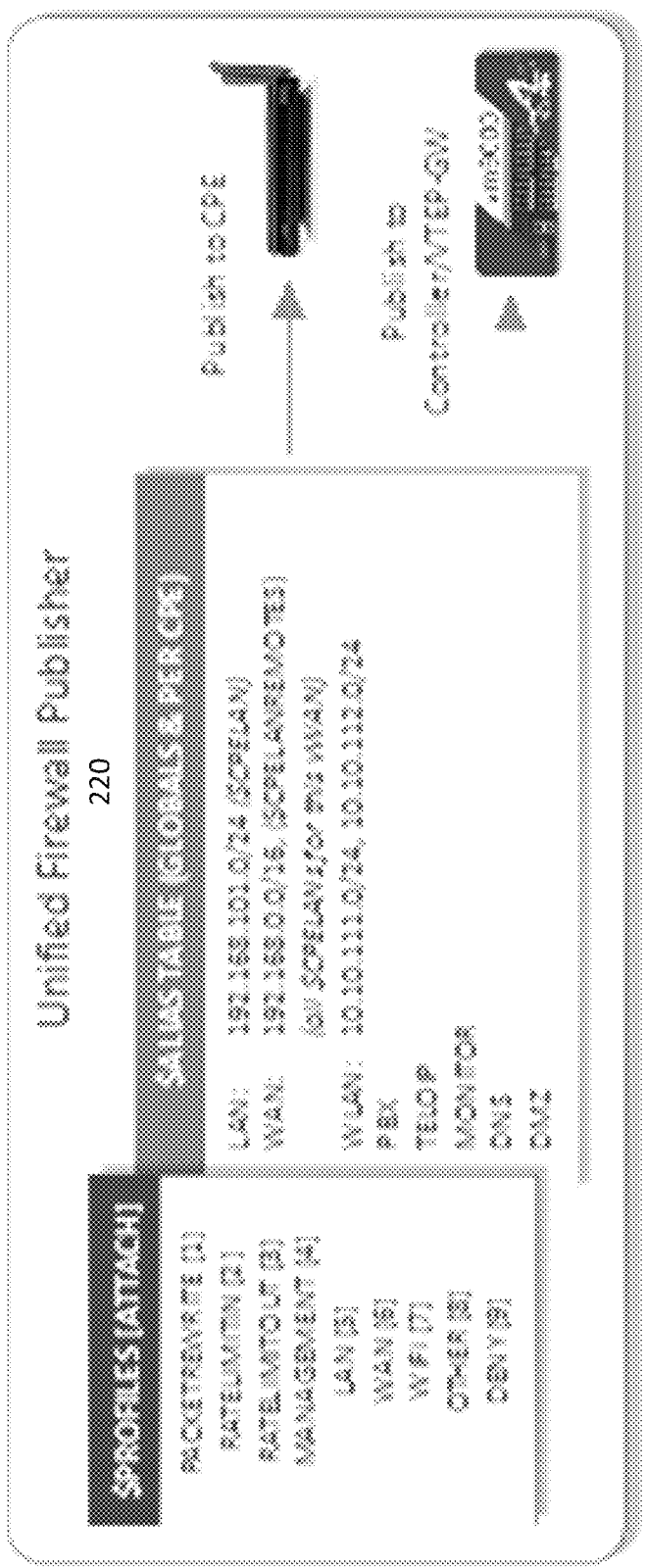
FIG. 14 illustrates an example template publishing system for a distributed firewall virtual network function solution with unified firewall management, in accordance with one embodiment.

FIG. 14 is a diagram of an example unified firewall publisher (220) that may attach, associate, or cause to be attached a profile to one or more client site network components (124), CPEs (124), devices, and/or routers, for example, Virtual Tunnel End Point Gateway VTEP-GW, Unified firewall publisher 220 may publish one or more profiles to one or more client site network components (124), CPEs (124), devices, assets, and/or routers. One or more client site network components (124), CPEs (124), devices, assets, and/or routers may receive published profiles, rules, and/or an index specifying an order for processing one or more policies and rules within one or more policies. Incoming traffic to the client site network components (124), CPEs (124), devices, and/or routers may be governed by, handled, directed, acted on, or excluded according to the received profiles, rules, and/or index. Publishing can refer to a background hangfire batch generated per CPE (124) with a job per phase. The first phase can involve a connection to the CPE (124), switch to firewall node and running each command to add the new rules to the firewall for the CPE (124). Firewall publisher (220) can then verify that the rules are received as expected by performing a show command. Once the entered rules are verified, the firewall publisher (220) can perform an enable firewall that moves the rules into running state. Firewall publisher (220) can then perform a show status that displays the details of the rules running in the firewall. Firewall publisher (220) can use the results of this command to cross check against the rules added to the firewall. If this matches what was entered then this can save the configuration to disk to persist it between reboots.

In some embodiments, template publishing system 220 may perform, enable, and/or support a publishing process where one or more rules are combined with assets and written to one or more client site network components or CPEs (124) based on or according to tier access levels. The publishing may be processed as a batched job through the use of an asynchronous job execution engine.

In an example publishing process, first, a firewall may be generated, that is, all rules for a specified template or publish may be calculated using an alias associated with each site. Next, a single batch job may be generated with a step per client site network component or CPE per phase. Example phases include: Phase 1—Firewall calculation; Phase 2—Firewall rule entry to CPE; Phase 3—Rule verification; Phase 4—Enable firewall and check Rules; and Phase 5—commit or rollback rules. This may ensure that a template may be tracked for status and progress and may guarantee autonomy of each publication for each client site network component or CPE and as an aggregate across all client site network components or CPEs. Failure during any step may result in re-execution of the step. Retry mechanisms may be provided to ensure that a failed step is retried until a maximum number of retries occurs at which point the step within the batch may be marked as failed. Failure states may be propagated upwards to the batch and may ensure that operational status reflects the actual result or status of an executed step.

In some embodiments, generated jobs may be independent of the assemblies that contain processing code. The benefit may be that if a bug or problem is identified in a previous version of an assembly that performs any of the steps in the pipeline, the assembly may be updated and the same job re-run to resolve the issue. This in-place update mechanism can greatly decrease the Mean Time to Resolution for a given defect in the pipeline. The same mechanism can be leveraged to upgrade and add additional functionality to the pipeline.

Each generated job may have its own unique identifier, for example, an ID. The ID and a retry number may be used when logging the result of a session.

In some embodiments, firewall system 200 may provide stream logging. Stream logging occurs as data is received asynchronously over a channel from the CPE as the commands execute on the CPE. This allows near real-time logging of job execution and its results. The benefit of this approach is also that any catastrophic failure that occurs during an execution that may cause the failure of session logging will likely be caught in a stream logged message.

In some embodiments, firewall system 200 may provide session logging. A single log containing the entire contents of the session may also be logged at the end of job execution. This may provide a secondary log of results from the job execution which can be used to verify the final result of a job. Session logging may provide an accurate history of all commands executed as part of each phase and corresponding output. This may facilitate troubleshooting or understanding of any issues or problems. Session logging may also occur in different ways. Session logging can be performed in different ways. An example of session logging includes streaming as the data is received back from the SSH or API session, or as a single logged message which is a conglomeration of all data received from initiation of SSH or API to the CPE to end of session. This can include everything that was done during the session which includes node (e.g. firewall) or mode changes (admin, diag, etc).

Next, worker processes may select a single client site network component or

CPE job and begin execution by phase. The following phases may be executed per client site network component or CPE: 1) rule publishing, 2) rule validation, 3) enable profile, 4) firewall validation, 5) save configuration, and 6) publish rule indices. These six phases may together manage automation of rule application and asset calculation.

In a rule publishing phase, the generated commands are executed against the client site network component or CPE. Each command's output may be verified to ensure that no error was returned during the execution of the command. If any commands fail, the step is marked as failed and retried until a maximum number of retries occurs. If all retries result in failure, the step as well as the parent batch are marked as failed.

In a rule validation phase, the published commands are verified by using a command that returns the current state of the rules as found on the client site network component or CPE. These values are then processed and validated against the previously calculated firewall to ensure that no errors occurred during the publish process. The firewall can be calculated at the beginning of the publish process, for example.

In an enable profile phase, published rules are moved to running state by enabling the firewall.

In a firewall validation phase, the enabled firewall state is verified by using a command that returns the current state of the firewall as found on the client site network component or CPE. These values are then processed and validated against the previously calculated firewall to ensure that no errors occurred during the enable process.

In a save configuration phase, the firewall and/or configuration for the client site network component or CPE is saved to disk to ensure that the published firewall will be available if the device is rebooted. Rules and aliases required for the new firewall can be saved.

In a publish rule indices phase, the translated values for rule indices are published to a reporting database to ensure that the values are available for resolution of profile names from log entries. This enables logging, as log entries may contain the translated index for a rule as opposed to the profile name. Each rule can have an index in the profile. The rule index can indicate the precedence or order in which the rule applies to traffic. The reporting database is a cloud based storage solution such as Google Cloud Datastore or BigTable instead. Rules in the firewalls have indices between 1 and 200 in each profile. When they are entered into the running state, their index has a different value. Recording the state of the firewall at the time helps to retrieve the values of those runtime indices. When a message related to a rule is logged it has the runtime index in the message. Hence, storing the runtime index can help with correlation and accurate reporting in the UI for logged messages.

In some embodiments, a publication may be cancelled, for example, prior to a publish rule indices phase. A cancel may reset a firewall associated with the CPE 124. The service may provide an ability to cancel the current running job and reset the firewall to its original state or a state prior to a specified publication. To do this, the previous batch for the CPE 124 is cancelled and a new job is created that runs commands to reset the firewall to its original or a prior state. For example, the firewall may be reloaded, for example, from disk or local storage, to achieve this.

In some embodiments, a dynamically defined asset rule dynamically defines assets when one or more templates, profiles, and/or rules are published by publisher 220 and applied to one or more client site network component or CPE at one or more branches. In some embodiments, one or more assets may also be defined during a CPE SD-Internet or SD-WAN installation process, for example, and enable zero touch provisioning.

Figure 15:
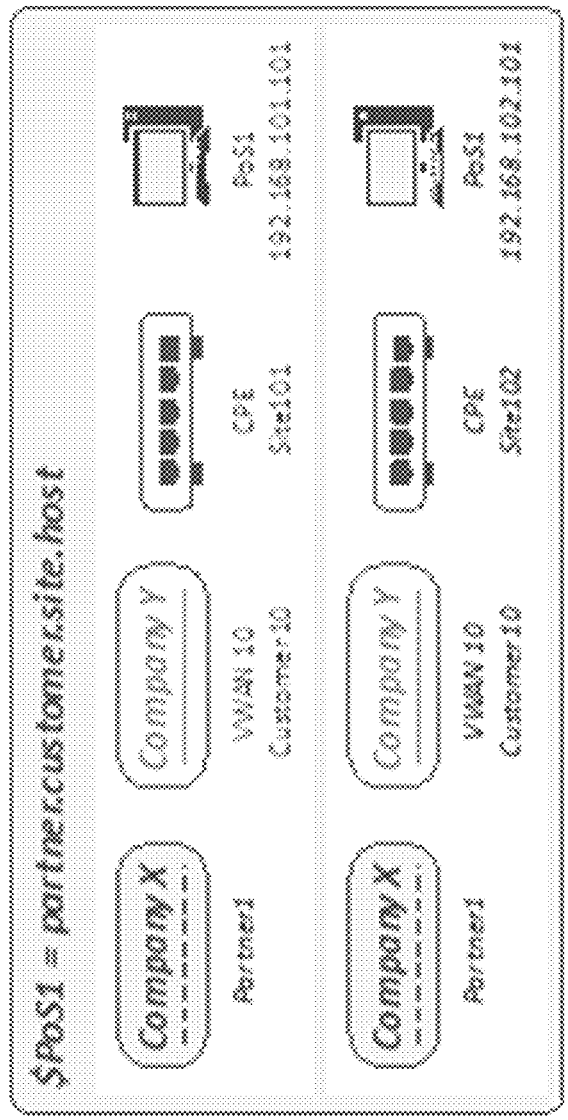
FIG. 15 illustrates rule calculation for site assets in a distributed firewall virtual network function solution with unified firewall management, in accordance with one embodiment.

FIG. 15 is a diagram of an example rule calculation for site assets. For example, template publishing system 220 may publish a template containing one or more rules to "allow ip from any to $PoS1". A calculated rule for a CPE Site101 may be "allow ip from any to 192.168.101.101". This may define a rule for all devices or assets at a branch beginning with Site101. A calculated rule for a CPE Site 102 may be "allow ip from any to 192.168.102.101". This may define a rule for all devices or assets at a branch beginning with Site102. For example, this may enable a rule for all devices or assets connected to the client site network components or CPEs to be defined dynamically, for example, as one or more client site network components' (124), CPEs' (124), assets', and/or nodes' addresses change and/or one or more client site network components (124), CPEs (124), assets, and/or nodes are removed or added. FIG. 15 indicates a reference to automatic addition of values for Site based assets to the database. A great example of this is the CPELAN value. CPELAN must be defined per site.

Figure 16:
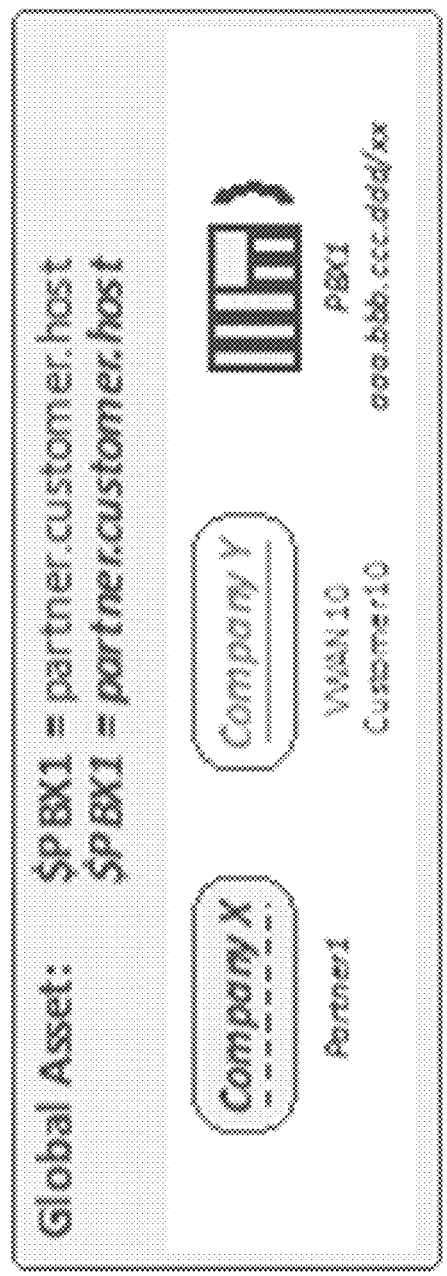
FIG. 16 illustrates rule calculation for global assets in a distributed firewall virtual network function solution with unified firewall management, in accordance with one embodiment.

FIG. 16 is a diagram of an example rule calculation for global assets. For example, template publishing system 220 may publish a template to a VWAN that contains one or more rules to "allow ip from any to $PoS1". A calculated rule for an asset connected to the VWAN may be "allow ip from any to aaa.bbb.ccc.ddd/xx". This may enable a rule for all client site network components or CPEs (124) connected to the VWAN or assets connected to the client site network components or CPEs (124) to be defined dynamically, for example, as one or more client site network components' (124), CPEs' (124), assets', and/or nodes' addresses change and/or one or more client site network components (124), CPEs (124), assets, and/or nodes are removed or added. A site asset is an asset that is customized per site i.e. has site specific values. A global asset is an asset that has a single value globally, regardless of the site. Rules that reference site assets will, at evaluation time, have the site-specific value bound to the rule, whereas global assets can only have the single value for all occurrences. Asset groups can be a function that allows the grouping of a definition of an asset to a set of sites. A site can be a tier.

In some embodiments, firewall system 200 may use a dynamic and/or automated asset discovery and mapping system. For example, a client site network device or CPE (124) associated with firewall system 200 or integrated with a firewall 127 may be integrated with a multi-part utility that enables or implements dynamic asset discovery. An example process may be as follows: 1) utility receives local interface list from CPE, 2) utility uses arp scanning (arp-scan) to generate a list of hosts by IP and MAC address at each site on the LANs that are directly connected to the CPE device, 3) utility probes all found assets (xprobe2) for an operating system fingerprint, 4) utility scans each asset for open ports (hping2), 5) portal retrieves information from or associated with steps 1) to 4), and 6) the information is inserted into a centralized device inventory database for a customer. Finally, auto discovered assets can have names associated with them. These names automatically created mapped assets. For example, firewall system 200 may store an association between a name and an associated asset in an ALIAS/ASSET list. A named asset results in the creation of a reciprocal alias. These assets can then be used within rule definitions, for example, by referencing an asset using its name or alias.

For example, the information from a found asset may be as follows:

| IP | MAC | MFR | OS | Service & Port List (service1:port,service2:port) |
|---|---|---|---|---|
| aaa.bbb.ccc.ddd | FF:FF:FF:FF:FF:FF | Intel | Microsoft | Local-srv:1357, netbios-ssn:13977, microsoft-ds:4457, |

In some embodiments, firewall system 200 may be organized by tier access levels, for example, a carrier tier, partner tier, customer tier, and site tier. A carrier is the highest tier level and the root of all other tiers. All other tiers, for example, partner, customer, and site tiers, inherit objects, for example, assets, asset aliases, firewall rules, policies, and/or templates, from the carrier, for example, carrier TELoIP. One or more carriers may be associated with firewall system 200 and may each have one or more dependent tiers. One or more users with carrier-level access may edit any objects created by users with more granular access levels, such as users with access at a dependent tier level like partner, customer, or site.

A partner tier level may be used to group ownership of customers. A customer tier level and a site tier level inherit objects, for example, assets and firewall rules, from a partner tier level and the partner tier's parent carrier. Objects that may be inherited from a carrier may not be modified by users with lower tier access levels, such as partner, customer, or site tier access levels.

A customer tier level may be used to group ownership of sites. A site may inherit objects, for example, assets, asset aliases, firewall rules, policies, and/or templates, from a customer tier.

A site tier level may be the lowest, most granular tier access level and may represent an installed service location. One or more client site network components or CPEs (124) may be grouped within a single site. A site may inherit objects, for example, assets, asset aliases, firewall rules, policies, and/or templates, from all preceding or higher level tier access levels.

In some embodiments, a firewall system 200 may include a centralized logging system, which may include a syslog server, message queue, message processing pipeline, and log storage.

A syslog server may receive log entries that are shipped or transmitted from one or more client site network components or CPEs (124). A syslog server may accept entries for various log facilities at specific ports. This may ensure that messages for various log facilities are processed per their individual velocity requirements. Example velocity requirements might include: security logs being processed immediately, authentication logs being processed periodically (e.g. every 10 minutes), firewall logs being processed immediately, and so on. The syslog server may be responsible for buffering and pushing the message into a message queue for processing.

A message queue may provide ordered storage and retrieval of one or more messages with at-least-once semantics for message consumption. At-least-once consumption semantics may ensure that each log message is processed at least once by the message processing pipeline. Deduplication may be enabled in part by an assignment of a unique message identifier for each message during queuing in the message queue. The message processing pipeline may be responsible for ensuring that duplication of stored messages does not occur.

A message processing pipeline may generate and/or associate a token ("tokenise") for each message in a message queue and store same, for example, in a data structure that facilitates easy and/or fast searches on the messages. Tokenization is the process by which a single log message is split into constituent parts such that they may be stored into individual columns in a database for later reporting. Examples of token parts are time, date, host, message index, profile, rule. Additionally, the message processing pipeline may also check for any threshold violations Threshold violations can be violations based on a mathematical function (Count, Max, etc) over a time period. Examples include the number of matches for a specific rule over a given time or total matches on a firewall over a given time. and may perform remediation actions as defined for the message type and other tokens. Remediation actions could be the addition of a null route to stop the traffic from hitting the CPE, an email alert being sent to the OPS staff, a deny rule being sent to all CPE devices, and so on. Examples of token parts are time, date, host, message index, profile, rule.

Log storage may provide an ability to perform queries on tokenised messages to produce reporting for both portal-based reporting and operational alerting. A user may access, request, manipulate, or view the reporting. Examples of reporting include the number of matches over time by profile, number of matches over time by rule, number of remediation actions performed over time, and number of matches over time for all rules. These can then be filtered by tier, asset, asset group, and so on.

A firewall system 200 may be implemented on the following architecture.

The Firewall hierarchy is split up into sections that are used by the attach command and index to help structure the flow of security. There are also some reserved sections used by the system.

Sections take precedence over index
    Index governs profiles within a section
        DMZ Rules Section—[index 1-9]
            Pre-NAT—Reserved by Firewall—[re-injected]—

| Top To Bottom | Supports Rate-Limit |
|---|---|
| | Any - [index 1-9] |
| Rules Ordered By | Ethernet Interfaces - [index 1-9] |
| Sections For | Dynamic Profiles (ana2-client) - [index 1-9] |
| Attachment | NAT Rules Section - Reserved - [no index] |
| Profiles Indexed By | Interface or Dynamic Profile Rules Section - |
| Section | Supports Rate-Limit |
| | Any - [index 1-9] |
| | Ethernet Interfaces - [index 1-9] |
| | Dynamic Profiles (ana2-client) - [index 1-9] |

Layer7 traffic policing
    P2P Traffic Identification
    Flood and attack Detection
    Traffic Classification
    Original code does not pass traffic into IP the processing level and therefore firewall features related to IP doesn't work. Only basic ALLOW/DENY rules will do work.

Figure 17:
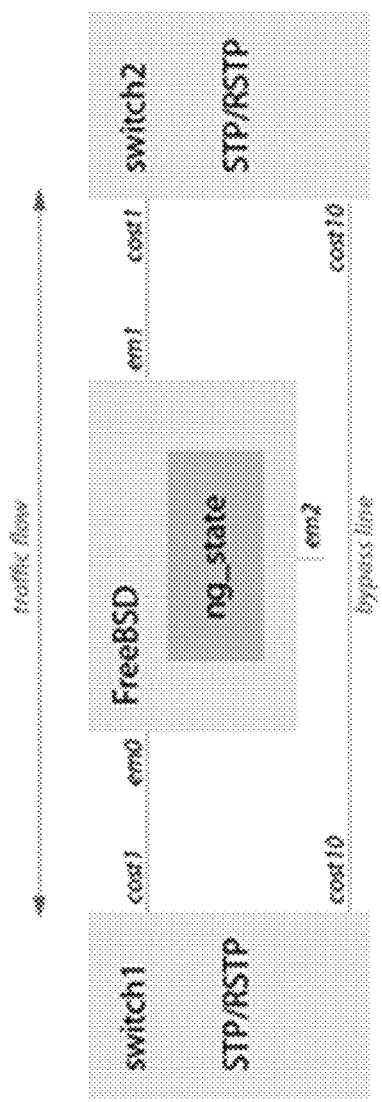
FIG. 17 illustrates back-end architecture for a distributed firewall virtual network function solution with unified firewall management, in accordance with one embodiment.

FIG. 17 is a diagram of an example state diagram for an embodiment of a Layer-7 DPI engine.

Figure 18:
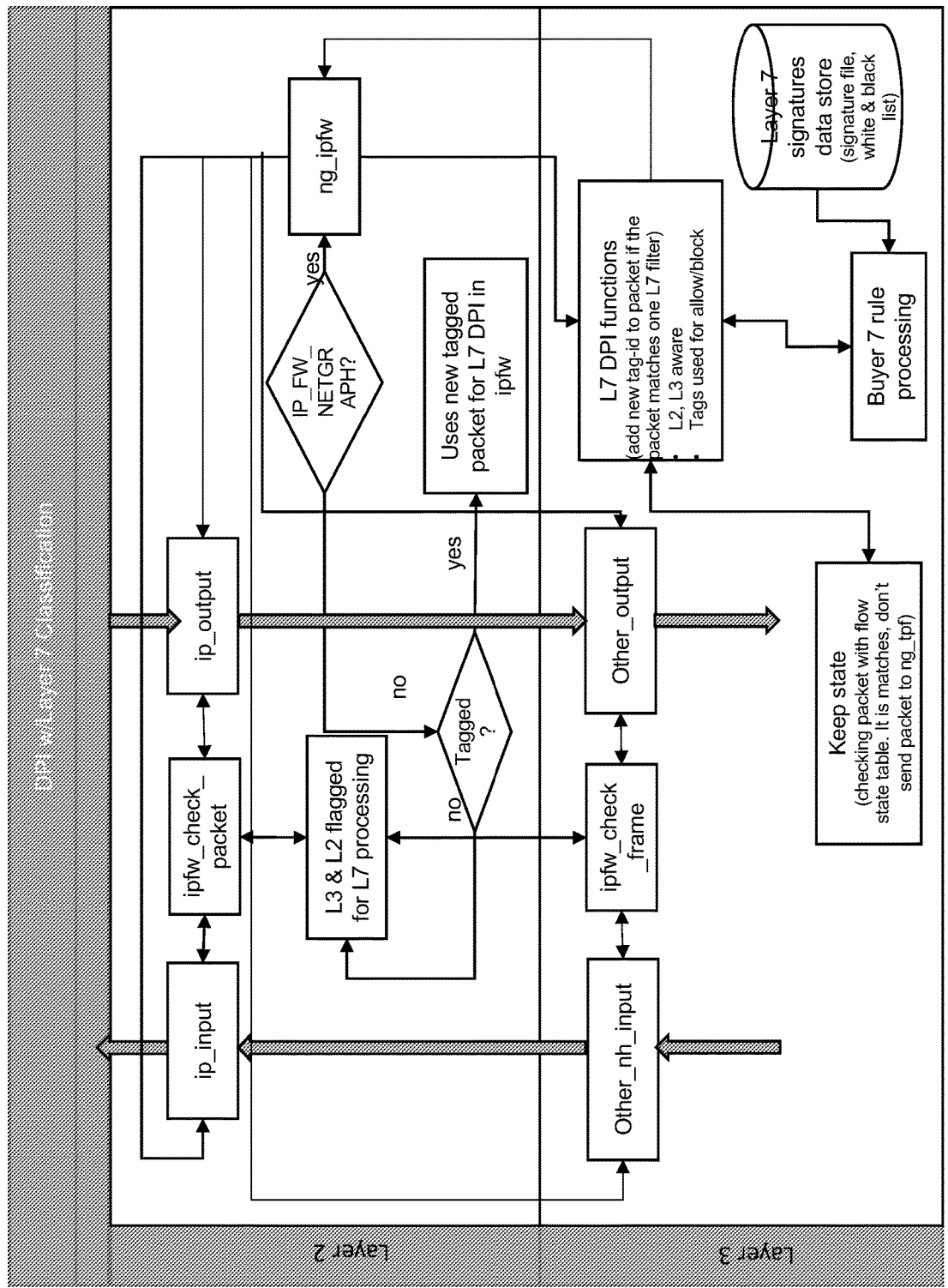
FIG. 18 illustrates another example back-end architecture for a distributed firewall virtual network function solution with unified firewall management and deep packet inspection, in accordance with one embodiment.

FIG. 18 is a diagram of an example embodiment of a Layer-7 DPI engine.

Deep Packet Inspection (DPI) Engine.

Firewall system 200 is configured to create a Deep Packet Inspection (DPI) engine. The DPI engine can be stateful with a flow-state-table for Layer7 using flags to track sessions and flows, and packet tags to integrate with the existing stateful firewall of the system. The DPI engine can use state tables for layer 3 and layer 2. For example, the ng_dpi dpi operation can be moved from Layer2 dependency into the IP Layer parts of the kernel. This uses flags, tags, and mbuf manipulation to achieve L2 for Layer7 DPI. Layer 7 DPI may be implemented. Firewall system 200 is configured to with layer 2 functionality with flags, tags, and the like. New state flow tables can use tags to track sessions and integrate with firewall. Policies can be tied to specific packets via tags/flags.

Firewall system 200 is configured implement classification. The first matching packet triggers the flag action on the stream flagging the remainder of the session packets to skip L7 processing. This gains great efficiency on the remaining packets of the stream or flow. Classification is used to classify the packet. When the first packet triggers the remaining packets continue for efficiencies (with monitoring) and the DPI engine can check packets on the fly.

Firewall system 200 is configured to extend the depth of the inspection from one packet to multiple packets in a stream and can be modified to match even more packet depth within a stream if needed.

Figure 19:
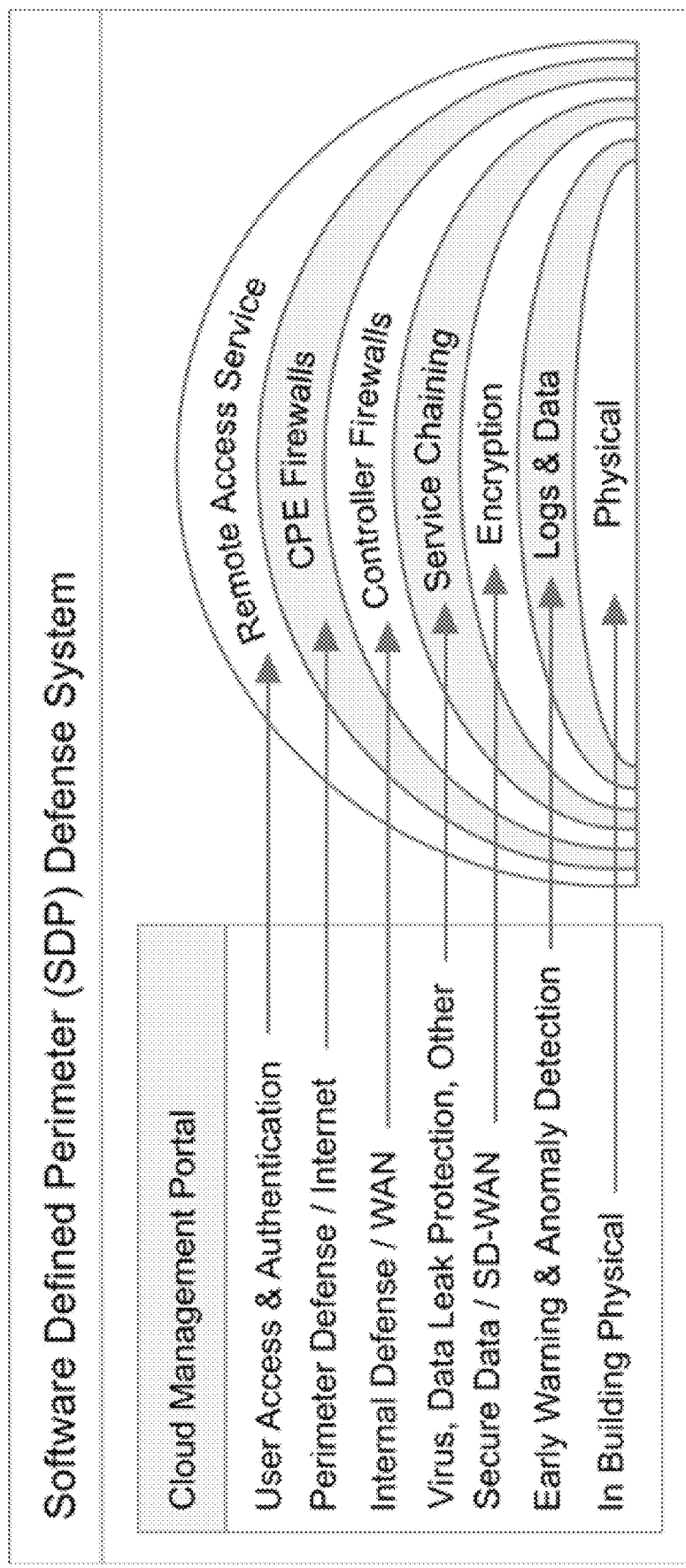
FIG. 19 illustrates a further example back-end architecture for a distributed firewall virtual network function solution with a software defined perimeter defense system, in accordance with one embodiment.

FIG. 19 is a diagram of an example embodiment of the firewall system 200 with software defined perimeter defense system. The firewall system 200 has a cloud management portal that implements various functions such as user access and authentication, perimeter defense and internet, internal defense and WAN, virus, data leak protection and other secure data (SD-WAN), early warning and anomaly detection, and in building physical. That is, firewall system 200 can include different layers such as remote access service, CPE firewalls, controller firewalls, service chaining, encryption, logs and data, physical, and so on.

The firewall system 200 can implement the following 5 Levels of Security and each of these can be a category onto themselves expanded for users, applications, and assets that we will be protecting Admin (5—Highest)
    Network (4)
    Trusted (3)
    Public (2)
    Untrusted (1)

In some embodiments, firewall system 200 may support or include peer-to-peer (P2P) and Denial-of-Service (DoS) flood detection based on number of connections combined with traffic intensity. There may be provided a service to monitor one or more source addresses. For example, if the traffic passing from these source addresses is >P2PBW (10 MB) and the connection established is >P2PFLOWS (15) in 5 seconds, ng_dpi identifies these source addresses as sending P2P traffic.

P2P detection may be alternatively implemented by use of signature files. For example, ng_dpi may check p2p pattern strings ("BitTorrent", "BTWebClient") at any position of packet data payload and if If the signature pattern matches, ng_dpi identifies these traffic flows as sending P2P traffic.

In some embodiments, firewall system 200 may support or include flood or attack detection. Flood detection may be according to the number of flows. There may be provided a service to monitor one or more source addresses or destination addresses. For example, when traffic passing through these addresses in the defined service is >MAX_FLOWS_PER_SERVICE (4000), ng_dpi identifies the traffic as a flood attack.

In some embodiments, firewall system 200 may support or include traffic classification. ng_dpi traffic classification may be done with ng_bpf pattern matching and flow detecting in its state-table. For example, classified traffic may be tagged with tag-id=classification value and all classified traffic may be then sent to a main firewall and IPQoS process.

In some embodiments, firewall system 200 may support or include an intrusion prevention system capable of real-time traffic analysis and packet logging, for example, a system using Snort community rules and syntax as well as the BPF rules syntax, by implementation in kernel rule translation. Implementation by firewall system 200 in kernel rule translation may increase speed and efficiency as compared to conventional userland implementation offered by the Snort community. Snort rules may be categorized within the following Subscriber Rule Sets: app-detect.rules, blacklist.rules, browser-chrome.rules, browser-firefox. rules, browser-ie.rules, browser-webkit, browser-other, browser-plugins, content-replace, deleted, exploit, exploit-kit, file-executable, file-flash, file-image, file-identify, file-java, file-multimedia, file-office, file-pdf, file-other, indicator-compromise, indicator-obfuscation, indicator-shellcode, indicator-scan, malware-backdoor, malwarecnc, malware-tools, malware-other, os-linux, os-solaris, os-windows, os-mobile, osother, policy-multimedia, policy-social, policy-spam, policy-other, protocol-dns, protocol-finger, protocol-ftp, protocol-icmp, protocol-imap, protocol-nntp, protocolpop, protocol-rpc, protocol-scada, protocol-services, protocol-snmp, protocol-telnet, protocol-tftp, protocol-voip, protocol-other, pua-adware, pua-p2p, pua-toolbars, puaother, server-apache, server-iis, server-mssql, server-mysql, server-oracle, serversamba, server-webapp, server-mail, server-other, sql, x11. In some embodiments, firewall system 200 may support or include a module for creating, sharing, and implementing application and service detection, for example, a module using Snort community Open App ID application detection rules, by implementation in kernel rule translation. Implementation by firewall system 200 in kernel rule translation may increase speed and efficiency as compared to conventional userland implementation offered by the Snort community. Open App ID is an open, application-focused detection language and processing module for Snort that enables users to create, share, and implement application and service detection.

Firewall system 200 may include the following design for pattern string setting and process in L7/DPI for openappid signatures. The filter setting uses packet-matching code. for example, the filter expression "tcp[32:4]=0x47455420", may be first converted to packet-matching-code. Then, the packet-matching-code may be sent to ng_bpf with setprogram command. The packet-matching-code may be as follows: # tcpdump -ddd "tcp[32:4]=0x47455420" 11 40 0 0 12 21 0 8 2048 48 0 0 23 21 0 6 6 400 0 20 69 4 0 8191 177 0 0 14 64 0 0 46 21 0 1 1195725856 6 0 0 65535 6 0 0 0

The packet-matching-code may compare the ethernet type=IP (HEX: 0x0800, DEC: 2048, line3), IP type=TCP (6, line5), etc. then, load a 4 bytes word, and compare it to 0x47455420 (DEC:1195725856, line10). Packet-matching-code may only support 1, 2, and 4 bytes. For support openappid signature setting, firewall system 200 may implement comparing string with any length at any position in one range. For example, the new bpf expression may be "tcp[32:8]=facebook" or "tcp[32:256]=facebook". "tcp[32:8]=facebook" means new packet-matching-code supports comparing a string "facebook" at a fixed position(tcp[32]). "tcp[32:256]=facebook" means new packet-matching-code supports comparing a string "facebook" in the range tcp[32] ~tcp[32+256].

For implementing this function, the following may be required:

```
1. in tcpdump yacc files, add new expression support.
2. create new packet-matching-code in tcpdump
3. implement new packet-matching-code setting and process
current packet-matching-code defined in bpf code,
struct bpf_insn {
u_short code; u_char jt; u_char jf; bpf_u_int32 k;
};
code: operator command ( jump, compare, load, etc)
jt: jump to one line when it's true.
jf: jump to one line when it's false.
k: the matching value.
we need to add one field as matching string.
new struct bpf_insn {
u_short code;
u_char jt;
u_char jf; bpf_u_int32 k;
char* ks;};
```

In some embodiments, firewall system 200 may use Layer 7 DPI engine (ng_dpi) for extending Netflow fields with additional traffic metadata. This may involve a two part process: 1) Application Classification for Netflow Data and 2) Cloud NetFlow Data Processing. Application classification for Netflow Data can involve one or more of the following operations. Netflow data may be marked up with data that provides details such as application id identified by the ng_dpi engine. This can enable a report on bandwidth usage on the portal by application. Cloud Netflow data processing can involve one or more of the following operations. In the cloud, netflow data can be aggregated by key fields (source address, destination address, source tos, source asn, destination asn, tcp flags, protocol, flowseqnum, sender (netflow speaker/exporter)) and then written to the data store (google bigquery). In the cloud, processing is performed to mark the flow with the id of the source and/or destination CPE, a calculated key (hash based on the xxhash algorithm) based on the previously mentioned key fields to allow for extensibility in reporting in the future. Additionally, in the cloud, IANA port assignment information can be used to identify the service from which the flow was originated or to which it was destined. When writing netflow data in to the database, there can be a vertical partition of data by the sender pair (e.g. all senders are deployed in pairs).

In an application classification stage, firewall system 200 may intercept existing netflow packets in the Netflow process and send them to the Layer 7 DPI engine for further processing, for example, adding fields for Application Signature Classification, adding fields for per user metadata, and/or adding fields for other useful metadata.

In a cloud NetFlow data processing stage, firewall system 200 may use a NetFlow Cloud Data Store and parse the NetFlow Data with the new metadata logic. New features and applications may be built around this additional intelligence matching network flows. This may enable NetFlow Reports to understand and show Application ID as well as NetFlow Reports to understand and show extended metadata fields.

In some embodiments, firewall system 200 may support custom filters and signatures. This may be facilitated by the following code:

```
(bpf & snort compatible syntax)
In ng_bpf, we setup custom filter as following,
ngctl msg bpf up: setprogram { thisHook=\"${PROG_in}\" \
ifMatch=\"${PROG_match}\" \
ifNotMatch=\"${PROG_nomatch}\" \
${BPFPROG} }
${BPFPROG} is one part of packet-matching-code.
${PROG_in} is input hook.
${PROG_match}: If packet matchs ${BPFPROG}, send it to hook: ${PROG_match}.
${PROG_nomatch}: If packet doesn't match ${BPFPROG}, send it to this hook:
${PROG_nomatch}.
```

The ${BPFPROG} is the packet matching code from tcpdump expression. For example,

```
$BPFPROG=" bpf_prog_len=11 bpf prog=[
    { code=40 jt=0 jf=0 k=12 }
    { code=21 jt=0 jf=8 k=2048 }
    { code=48 jt=0 jf=0 k=23 }
    { code=21 jt=0 jf=6 k=6 }
    { code=40 jt=0 jf=0 k=20 }
    { code=69 jt=4 jf=0 k=8191 }
    { code=177 jt=0 jf=0 k=14 }
    { code=64 jt=0 jf=0 k=34 }
    { code=21 jt=0 jf=1 k=1347375956 }
    { code=6 jt=0 jf=0 k=8192 }
    { code=6 jt=0 jf=0 k=0 } ]"
```

Pattern string comparison in signatures may be implemented by adding new codes in packet matching code, for example:

```
{ code=85 jt=0 jf=8 s="facebook" }
{ code=86 jt=4 jf=0 k=256 s=" BitTorrent" }
```

Code=85, compare string at the fixed position in data payload.
Code=86, compare string at any position in data payload (length=256).
Packet matching code structure may be extended from

```
struct bpf insn {
    u_short code;
    u_char jt;
    u_char jf;
    bpf_u_int32 k;
};
```

To

```
struct bpf_insn {
    u_short code;
    u_char jt;
    u_char jf;
    bpf_u_int32 k;
    u_char * s;
};
```

In some embodiments, firewall system 200 may support or include URL filtering, for example, Signature Database/File Capability and/or White & Black List Capability.

In some embodiments, firewall system 200 may support or include DNS intercept functionality, for example, using custom filters, or White & Black Lists, redirecting a user browser to a new page displaying "Unauthorized Use Attempt", and/or logging an event.

In some embodiments, firewall system 200 may support or include DDOS/IDS (Flood) protection, for example, detecting floods and/or blocking and logging detected flood events.

In some embodiments, firewall system 200 may support or include basic data leak protection (DLP), for example, for non-encrypted traffic, by getting filename and types in the signature for unauthorized file uploads of sensitive subject matter. For example, a module supporting this functionality may look for "*classified*" in the *.doc* filename string.

In some embodiments, firewall system 200 may support or include an HTTPS decryption with assigned certificate. For example, each customer engaged with a firewall system 200 or VWAN may receive a certificate and the certificate may be applied to a component of firewall system 200 for https decrypt and L7 DPI processing.

In some embodiments, firewall system 200 may support or include auto signature intelligence and update. For example, Layer 7 DPI may log all malicious and unknown signatures to the cloud, for example, centralized firewall network controller 210. A portal application may selectively or automatically update and publish these signatures to the enterprise Layer 7 DPI implementation at all sites.

In another aspect of embodiments described herein, a network solution is provided for improving network communication performance between at least two sites, where the two sites are at a distance from one another that is such that would usually require long haul network communication. The network solutions includes at least one network bonding/aggregation system that includes (A) at least one first network component that is implemented at a first service site, the first network component being configured to bond or aggregate one or more diverse network connections so as to configure a bonded/aggregated connection that has increased throughput; and (B) a second network component, configured to interoperate with the first network component, the second network component including a server/concentrator (also referred to as network server component) that is implemented at an access or point-of-entry point to a multiple protocol label switching network. Multiprotocol label switching (MPLS) is a network mechanism that directs data between network using path labels rather than network addresses, avoiding complex routing table lookups. The labels identify virtual links or paths between nodes rather than endpoints. MPLS can encapsulate packets of various network protocols and supports a range of access technologies. As will be described herein, embodiments described herein may provide a virtual edge provide encryption over the bonded/aggregated network connection.

In an aspect, the first network component may be implemented using what is called in this disclosure a "CPE-CE"

or customer premises equipment (also referred to as customer edge (CE) router or client site network component). The CPE-CE and a server/concentrator (also known as a Cloud Concentrator Provider Equipment CCPE) component (more fully described below) interoperate to configure the bonded/aggregated connections in order to provide improved network connections at a site associated with the CPE-CE. The CPE-CE may involve a third party router that may be particularly configured in accordance with embodiments to provide the bonded/aggregated network connection. This configuration may involve separating lower-link data traffic on third party routers by removing default routing information and adding routes on each respective lower-link for the corresponding concentrator lower-link IP address. This configuration may further involve using a common access protocol for encapsulation of lower-link data packets. Further configuration details are described herein. The CPE-CE may be implemented using a virtual edge, as will be described herein.

In one aspect of the embodiments described herein, the server/concentrator is implemented at an access or point-of-entry point to an MPLS network or other network, with access to the network backbone provided by an MPLS networking solution so as to provide a high-quality, end-to-end, secured network connection. The server/concentrator may provide a bridge between the bonded/aggregated network and the broadband network portion to deliver MPLS to the CPE. The server/concentrator may be configured to operate as a provider edge or point-of-entry (PE) router on the MPLS network. As will be described below, MPLS is protocol independent and supports a bonded/aggregated network supported protocol. This is an example protocol described for illustrative purpose.

The server/concentrator may also support lower-link encapsulation to be compatible with CPE-CE routers that are configured to provide separation and encapsulation of lower-link data traffic.

In addition, the server/concentrator may be implemented as a cloud service, a cluster service or simply a cluster hosted in cloud, or a router server configured based on certain configurations. It may also be referred to as a cluster or a cloud concentrator throughout this application. The clusters or cloud concentrators may serve multiple CPE-CEs. A client site may have multiple CPE-CEs and a cluster can serve multiple client sites. The clusters or cloud concentrators may also communicate with one another on a basis of multiple points-of-presence ("Multi-POP"), as will be described below.

In another embodiment, the server/concentrator (or network server component) may be remotely or closely coupled with one or more CPE-CEs, and comprise of software, or entirely of hardware, or include both software and hardware components. The server/concentrator may be implemented to one or more server computers, or may be implemented as an interconnected network of computer residing at the same or different physical locations, and connected to one or more CPE-CEs and the core network (e.g. MPLS or other protocol) through one or more trusted network connections. The server/concentrator can interoperate with CPE-CEs and/or the other components in the network architecture in order to deliver the functionalities described herein.

Network architectures that involve long-haul bonded/aggregated network communication result in less than optimal performance, thereby minimizing the advantages of the bonding/aggregation technology. In other words, while the bonding/aggregation technology may improve service to Site A associated with for example a CPE (or equivalent to customer premises equipment), based on bonding/aggregation between the CPE and an associated server/concentrator (or equivalent such as a cloud concentrator), overall performance may be less than desired and in fact may be less than what would be available without bonding/aggregation because of the long haul effects of carrying the bonded/aggregated from Site A, to at least Site B. These long haul effects will present wherever Site A and at least Site B are at a substantial distance from one another. The Example in Operation described below illustrates the decrease in performance that results from the long haul effects. In one exemplary embodiment of the invention, the COPE may be implemented with virtualization software such as vmWare, vSphere5, Citrix Xen, and so on.

Referring now to FIG. 1a, which illustrates the problem of long haul aggregation/bonding generally. In a bonded/aggregated network communication shown in FIG. 1a, packets are carried over the Internet through an extension of the bonded/aggregated connection across the Internet 102, rather than a high performing Internet core network such as an MPLS core network. The bonded/aggregated connection, across a distance that is subject to long haul effects, will not perform as well as the Internet, thereby providing less than ideal performance.

Another problem with some bonding/aggregation solutions is that they generally require control or management by a central server. Depending on the location of the central server, this can result in multiplying the long haul effects because traffic between Site A and Site B may need to also be transferred to a Site C that is associated with the central server. This aspect of the prior art technology is illustrated for example in FIG. 1b. Central server 104 manages network communications, and routes network communications between Site A and Site C. To the extent that the distance between central servers 104 is substantial from either of Site A or Site C, long haul effects will present. If central server 104 is at a substantial distance from each of Site A and Site C, then there will be a multiplying of the long haul effects, as network traffic will pass from Site A to the central server 104 to Site C, and from Site C to the central server 104 to Site A.

As illustrated in the Example in Operation described below, long haul effects have a negative impact on speed (slowing traffic) and also on latency. Conversely, embodiments of the present invention may provide significant improvements in regards to both speed and latency.

Embodiments of the present invention provide a network solution, including a network system and architecture and associated networking method that addresses the aforesaid long haul effects that have a negative effect on performance.

FIG. 1c illustrates a prior art MPLS network configuration with IPSEC embedded therein. In the prior art MPLS network shown in FIG. 1c, packets are carried over the Internet through a single connection such as DSL or cable, from Branch Customers A or B (e.g. Sites A or B) to one PE router of MPLS. An IPSEC tunnel may be implemented between the Branch Customers A or B to the MPLS PE router, and terminated immediately before or at the PE router. The PE router therefore fulfills two tasks: IPSEC remote access termination and providing an MPLS PE router. IPSEC in this prior art configuration serves mainly as a secure access method into the MPLS network. The protection of IPSEC secures the data on transport over any untrusted infrastructure, such as public WIFI hot spots or DSL Internet.

As can be seen from FIG. 1c, the network path from Branch Customer A or B to IPSEC Termination may be over a sole connection that can be, for example, a cable or a DSL connection. If the cable connection from Branch Customer A fails for any reason, then that customer would not be able to connect to the MPLS network as there is no alternative Internet connection available. In contrast, embodiments of the present invention provide significant improvements in regards to a number of additional features such as bi-directional communication, failover protection and diversity of carriers.

Though not illustrated here, it is understood that IPSEC tunnel may also be implemented from one PE router to another PE router over the MPLS network core or from Branch Customer A to HQ Customer B (CPE-CE to CPE-CE). Regardless of the particular configuration of IPSEC over MPLS, MPLS networks with embedded IPSEC are very costly to set up, difficult to maintain and reconfigure, and generally leave much to be desired in terms of carrier diversity, failover protection, aggregated bandwidth, bi-directional communication, quality of service (QoS), prevention of dropped calls, application acceleration, and scoring of quality of experience (QoE), to name a few.

Figure 2A:
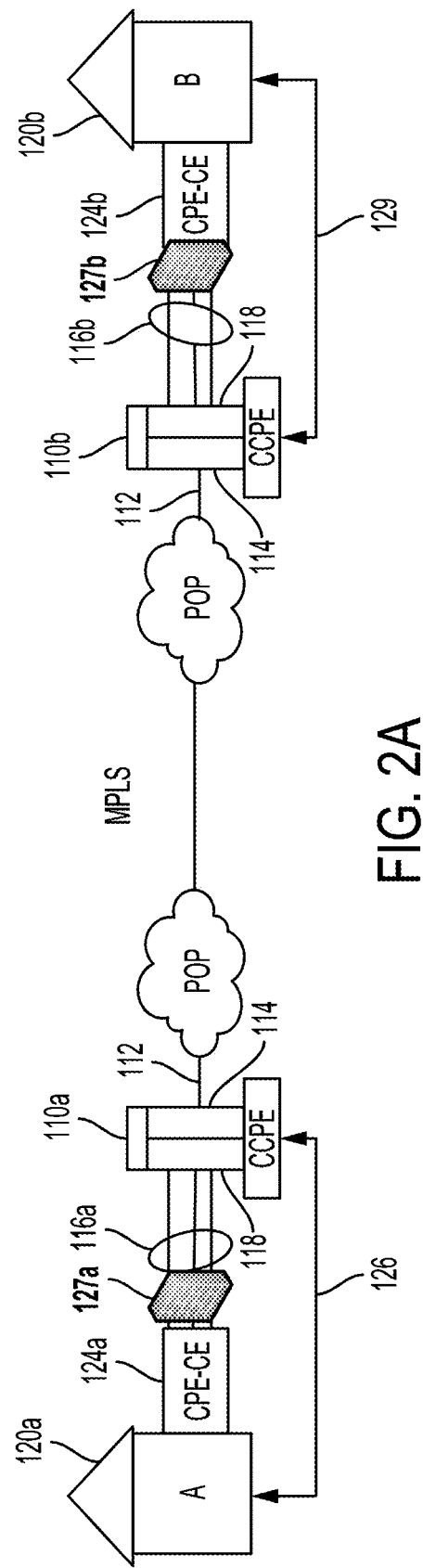
FIG. 2a shows a network solution in accordance with an embodiment of the present invention, with bonding/aggregation and a distributed firewall implemented at both Site A and Site B, while minimizing long haul effects for centralized firewall management based on the technology of the present invention.

As shown in FIG. 2a, in one aspect of embodiments described herein, the server/concentrator (or otherwise known as cloud concentrator) side of a bonding/aggregation network solution for Site A 120a is implemented such that (A) the location of the cloud concentrator 110a is implemented with access to the network core of MPLS 112, and (B) the cloud concentrator 110a includes functionality for (i) receiving packets by means of the bonded/aggregated connection 116a, (ii) interrupting the bonded/aggregated connection 116a using an interrupter (118), and (iii) directing the packets 114 to the MPLS 112 for delivery to a Site B 120b. In the case of (iii) directing the packets 114 to the MPLS 112, the cloud concentrator 110a is also acting as the PE router of MPLS 112. The cloud concentrator (or the server/concentrator) 110a thus is also known as the cloud concentrator provider edge or the cloud concentrator point-of-entry (CCPE) of the MPLS. If Site B also has bonded/aggregated network service, then the packets are delivered to a Site B side cloud concentrator or CCPE 110b. The CCPE 110b can then establish a further bonded/aggregated connection 116b and directs the packets 114 via the bonded/aggregated connection 116b to a CPE-CE (B) 124b at Site B. Further, a CPE-CE (A) at Site A is integrated with a firewall 127a and the CPE-CE (B) at Site B is integrated with a firewall 127b, where each firewall 127 may apply rules and/or security and policy controls to traffic so as to protect one or more nearby assets. A centralized firewall network controller 210 may use the bonded/aggregated connection associated with Site A 116a and/or associated with Site B 116b to publish one or more firewall templates and/or facilitate generation of a firewall associated with Site A 127a and/or a firewall associated with Site B 127b.

In some embodiments, the MPLS network 112 may also be Wide Area Network WAN 112.

Figure 2B:
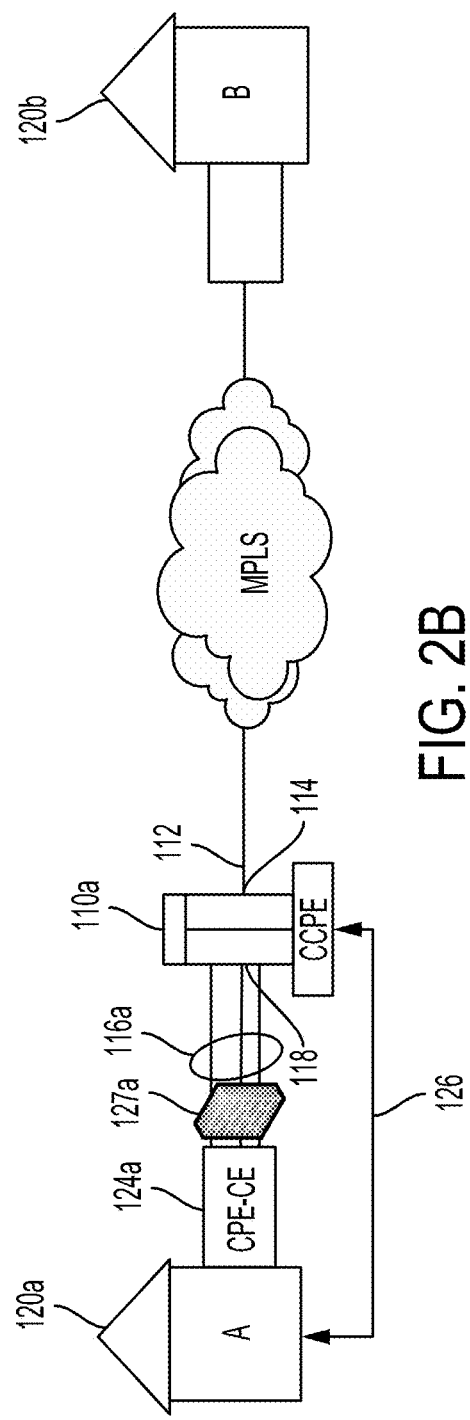
FIG. 2b shows another network solution in accordance with an embodiment of the present invention, in which bonded/aggregated network service and a distributed firewall exists at Site A but not at Site B.

FIG. 2b illustrates a configuration where bonded/aggregated network service as well as a firewall 127a exists at Site A but not at Site B.

Figure 2C:
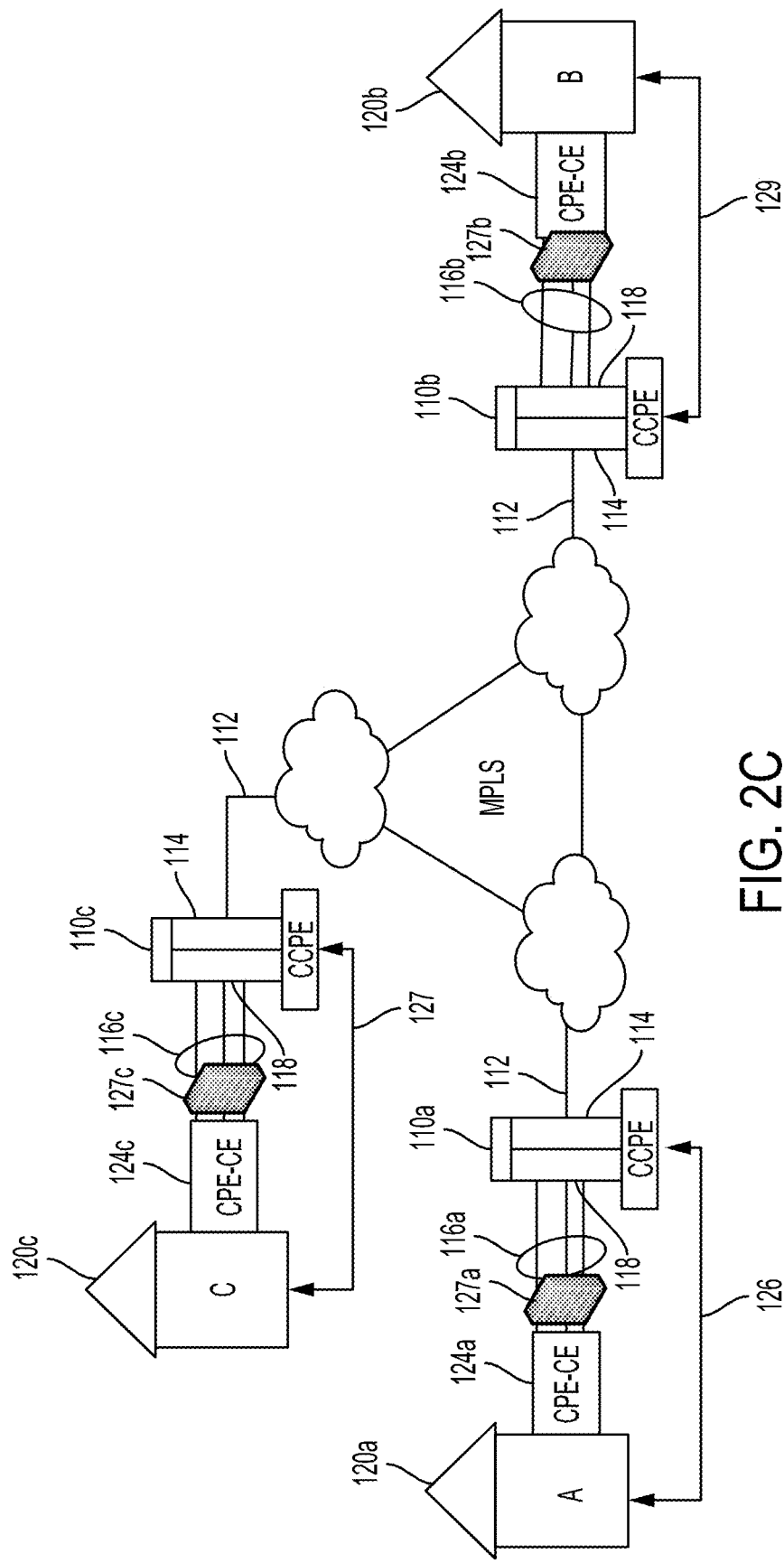
FIG. 2c shows another network solution in accordance with an embodiment of the present invention, in which bonding/aggregation is implemented as between Site A, Site B, and Site C, with a distributed firewall at each.

More than two sites are possible, where the network system of an embodiment improves network performance for network communications between for example Site A, Site B, and Site C where one or more sites will include bonded/aggregated service. In one implementation, as shown in FIG. 2c, bonded/aggregated service as well as firewall 127 is present for each of Site A, Site B and Site C. The distributed firewall can be implemented at sites, CPE-CEs, CCPEs, and so on. The initial implementation will be on the CPE devices and managed from the cloud with templates for the entire enterprise. FIG. 2c illustrates one possible implementation, where the network system is based on a distributed network architecture where CCPEs 110a 110b 110c and corresponding CPE-CEs 124a 124b 124c are configured to provide improved network communications, including interruption of network communications at the network backbone so as to reduce long haul effects, dynamically and on a peer to peer basis without the need for a persistent central manager, for example, to enable a distributed firewall system where rules and/or security and policy controls may be applied to traffic to protect nearby assets. In one implementation, each of the network components of the network system included functionality to operate on a peer-to-peer basis.

A CPE-CE 124 initiates network communications on a bonded/aggregated basis, cooperating with a COPE 110, with packets destined for a remote location. Each COPE 110 receives dynamic updates including a location and identifier associated with other COPE 110. Packets are dynamically sent to a COPE 110 at the remote location, if available, and from the COPE 110 at the remote location to its CPE-CE 124. The CPE-CEs 124 and their CCPEs (110) use bi-directional control of network communications to establish a network overlay to provide improved network performance. The network overlay for example provides desirable quality of service despite underlying network conditions that may otherwise result in a decrease in network performance.

In accordance with embodiments described herein, the network system establishes and manages two or more network overlays. Referring for example to FIG. 2a a first network overlay 126 is established between the CPE-CE(A) 124a and COPE 110a; then, communications are transferred over the MPLS 112 without a network overlay; then, a second network overlay 129 is established between COPE 110b and CPE-CE(B) 124b. As a result, IP transport is provided between Site A and Site B where this will provide better performance than the aggregated/bonded network connections. Bonding/aggregation in effect is distributed across the locations, rather than attempting to span the distance between the locations with end to end bonding/aggregation.

Embodiments therefore provide distributed bonding/aggregation. Embodiments also provide a network system that automatically provides distributed bonding/aggregation in a way that bonding/aggregation is proximal, and beyond proximal connections IP transport is used, with proximal bonded/aggregated connections and fast Internet being used as part of end-to-end improved service.

In addition, system elements enabling the monitoring and maintenance of Quality of Experience (QoE) and Quality of Services (QoS) may be optionally included in the COPE and/or CPE-CE configuration. As will described herein, an intelligent packet distribution engine may be supported to implement QoE and QoS functionality. In another example, the QoE and QoS elements may be implemented as part of the underlying link aggregation technology.

Embodiments may offer advantages over the prior art technologies, including, for example:
 1. Suited for voice and data transmission:
 SLA Supported with Quality of Experience (QoE)
 Bi-Directional QoS
 OTT QoS Maintains CoS
 No Dropped Calls on Link Failover
 2. Carrier diversity, including network aggregation and failover protection
 3. Failover: no disconnections on failover scenarios 4. Aggregated bandwidth: more reach options and scale
5. Bi-directional communication
6. Network quality of service (QoS)
7. Application acceleration
8. Quality of Experience These are illustrative non-limiting examples. Combining diverse networks (MPLS, WAN) with the link aggregation/bonding technology in accordance with exemplary embodiments may satisfy end customer needs on the network, including, for example:

Use of multiple low cost broadband circuits (for greater uptime and resiliency).

Support of prioritization and CoS for priority traffic.

Hybrid MPLS or backup network strategy without having to abandon MPLS features.

The cloud concentrator would bridge the MPLS portion of a customer's network to the broadband portion using network aggregation delivering MPLS to the CPE device (MPLS added to link aggregation technology as a supported Protocol).

Figure 2D:
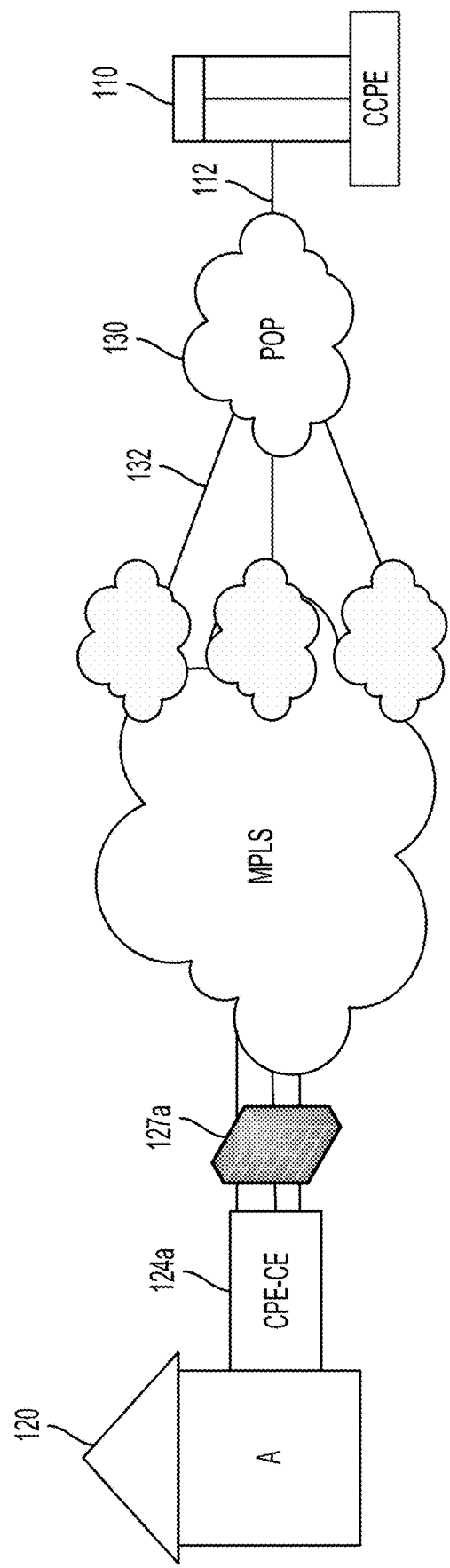
FIG. 2d shows a further implementation of the network architecture of an embodiment of the present invention, in which a plurality of servers/concentrators are implemented as part of a Point-of-Presence.

In another aspect of embodiments, and as shown in FIG. 2d, one or more CCPEs can be implemented at a given physical location, as part of a Point-of Presence (PoP) 130. In one aspect, a PoP 130 can define a relatively high concentration of servers, concentrators, and/or CCPEs within an area. In another aspect, a plurality of PoPs 130 may be available in a given geographic location. A plurality of PoPs 130 may be established based on network topology or service requirements in a given area.

In one aspect, each PoP 130 may have one or more network backbone connections 132, because in some locations different network backbones, such as a wireless Internet, a private data network, or the MPLS network, may be available. The PoP 130 may be implemented so that it dynamically interoperates with surrounding networks. The PoP 130 is a collection of network components, established at the periphery of the network backbone 112, associated with a plurality of networks, and cumulatively providing network communication service to one or more clients in a defined geographic area. In one possible implementation, the server/concentrators or CCPEs 110 located within the PoP 130 functions as a network access server for connecting to the Internet or the MPLS 112. The network access server 110 acts as the access point to the Internet 112 for a plurality of CPE devices 124 that are connected to the PoP 130. The plurality of CPE devices 124 may each be integrated with a firewall 127 that applies rules and/or security and policy controls to traffic so as to protect one or more nearby assets. The servers/concentrators or CCPEs 110 may be configured to communicate with one another to share information regarding network conditions. Servers/concentrators and CCPEs 110 provide connectivity to CPEs and CPE-CEs 124 and may also run a networking protocol such as BGP to route servers and other network backbone connections 112.

In one aspect, servers/concentrators and CCPEs 110 are configured to detect changes in their network environment.

The CPE-CE 124 may be configured to collect information from network components in its vicinity including from one or more available PoPs 130 and their CCPEs 110. The CPE-CE 124 for example connects to a closest available COPE 124, implemented as part of a PoP 130, and thereby having access to a connection to the MPLS network core 112. Whether the connection to the network core 112 is direct or indirect, the network connections are established so as to minimize long haul effects. The CPE-CE 124a also may be integrated with a firewall 127a that applies rules and/or security and policy controls to traffic so as to protect one or more nearby assets.

In one implementation, each CPE-CE 124 establishes a connection by dynamically advertising its IP address, and receiving replies from associated COPE 110 along with their current network performance information. The CPE-CE 124 initiates a bonded/aggregated connection with a COPE 110 that is proximal (to minimize long haul effects between the CPE-CE 124 to the MPLS network core 112, and also performing well based on network conditions relevant to the particular COPE.

In one implementation, a network device is deployed that bonds or aggregates multiple, diverse links. The network device may be WAN aggregator or a link aggregator.

Once the network overlay is established, various other network optimization and quality of services ("QoS") techniques may be applied.

One or more CPE-CEs and one or more CCPEs can create various different network configurations that may improve network performance in relation to network communications there between. In one embodiment of the invention, the CPE-CEs and CCPEs are designed to be self-configuring and self-healing, and to interoperate with one another to manage traffic in a more effective way.

"Proximal" means a distance such that based on relevant network conditions; long haul network communication and associated effects are avoided. The distance between the CPE-CE and the COPE may be proximal.

In order to take advantage of the network architecture of embodiments described, the COPE 110 can be located at an access point to the MPLS network core 112 or in some other way to minimize the long haul effect, for example, by the COPE being located proximal to an access point so as to further avoid long haul network communication.

In another aspect of embodiments described herein, the bonded/aggregated connection at Site A and the bonded/aggregated connection at Site B may be different. In particular, each may include different types of network connections and that may be associated with different carriers. In one aspect of embodiments described herein, the network overlay provided operates notwithstanding such diversity.

Typically, the more sites that have the CPE-CEs/CCPEs associated with them the better network performance between them. Representative performance details are included herein.

The network backbone 112 could be any high performance network including for example a private WAN, the Internet, or an MPLS network.

Network Overlay

In one aspect of the embodiments described herein, one or more network overlays are established, thereby in one aspect providing a multi-POP network that exploits multiple points of presence so as to provide a persistent, configurable/reconfigurable network configuration that provides substantial network performance improvements over prior art methods. In one aspect of embodiments described herein, the CPE-CEs/CCPEs may monitor network performance, including in the areas proximate to their position, and may reconfigure the network overlay dynamically, across multiple locations (including multiple PoPs) based on changes in MPLS network performance while providing continuity of service. The network overlay may be made up of multiple virtual connections, such as virtual edge and virtual core connections, as described herein.

In one aspect, the network components of embodiments described herein are intelligent, and iteratively collect network performance information. Significantly, in one aspect each CPE-CE is able to direct associated concentrator(s)/COPE and any CPE-CE to in aggregate re-configure the network overlay.

Significantly, in the network overlay created by the embodiments described herein management of the network may be centralized or decentralized, depending on the configuration that provides the best overall performance. This is in contrast to prior art solutions that generally require central management for example of termination of connection which results in traffic being carrier over bonded/aggregated connection that involve long haul transmission that fail to take advantage of network paths that may provide inherently better performance than the bonded/aggregated connection paths.

In one aspect, decentralized managed is made possible by peer-to-peer functionality implemented to the network components of the embodiments described herein.

In another aspect, a plurality of CCPEs may be established in multiple locations covering a plurality of different access points. Each COPE may be used for multiple clients associated with different CPE-CEs to improve network performance for such multiple clients by providing termination of their bonded/aggregated connection, routing of communications, and encapsulation of packets to the MPLS network core. The network solution therefore may include multiple Points-of-Presence, distributed geographically including for example in areas requiring network service, and through the network architecture bridging geographically disparate areas with improved network communication.

Additional Implementation Detail

As previously stated, the present invention may be implemented in connection with any technology for bonding or aggregating links, and thereby reduce long haul effects. The present invention may also be implemented with any kind of MPLS network, thereby providing a high-performance, secure, end-to-end network connection between various client or customer sites.

In one aspect of embodiments described herein, the system, method and network architecture may be implemented such that the aggregated/bonded network connections described are implemented using the link aggregation technology described in U.S. Pat. No. 8,155,158. In another aspect of embodiments described herein, the system, method and network architecture may be implemented using one or more Points-of-Presences as described in patent application Ser. No. 13/958,009. What follows is additional detail regarding link aggregation/bonding in combination with an MPLS network, emphasizing the creation and management of the bonded/aggregated connections between them, and the encapsulation at CCPEs, which in the network configuration of the present invention may form a part of the overall network overlay that incorporates the one or more portions that are carried over the network backbone.

Diverse network connections may be aggregated into virtual (logical) connections that provide higher throughput as well as independence of the network characteristics of the constituent (physical) network. Aggregation may be performed at a given CPE-CE.

For instance, in one example implementation, a Metro Ethernet 10 Mbps (E10) link and a T1 (DS1) link are aggregated in accordance with embodiments described herein, in order to provide higher fault tolerance and improved access speeds. The aggregation of diverse carriers may extend to any broadband network connection including Digital Subscriber Line (DSL) communications links, Data over Cable Service Interface Specification (DOCSIS), Integrated Services Digital Network, Multi-protocol Label Switching, Asynchronous Transfer Mode (ATM), and Ethernet, etc. The network connections may also include a WAN.

According to one aspect of embodiments described herein, an apparatus is provided for managing transfer of communication traffic over diverse network connections aggregated into a single autonomous connection, independent of the various underlying network connections. The apparatus may include a network aggregation device and an aggregation engine. The network aggregation device may be adapted to configure a plurality of network connections, and transfer communication traffic between a further network connection and the plurality of network connections, as an aggregated group for providing a transfer rate on the further communication link, and to allocate to the aggregate group a rate of transfer equal to the total available transfer rate of the underlying networks. The aggregation engine may be adapted to manage the distribution of communication traffic received both to and from a plurality of network connections, establishing newly formed aggregated network connections. The aggregation engine may be implemented in software for execution by a processor, or in hardware.

In accordance with this aspect of embodiments described herein, a plurality of diverse network connections may be aggregated to create an aggregated network connection. The diversity of the network connections may be a result of diversity in provider networks due to the usage of different equipment vendors, network architectures/topologies, internal routing protocols, transmission media and even routing policies. These diversities may lead to different network connections with different latencies and/or jitter on the network connection. Also, variation within transmission paths in a single provider network may lead to latency and/or jitter variations within a network connection.

Latency and jitter typically affect all data communication across the network connection. Latency is the round-trip time for a transmission occurring end-to-end on a network connection. Jitter is the variance in latency on a network connection for the same data flow. High latency and jitter typically have a direct and significant impact on application performance and bandwidth. Applications such as VOIP, and video delivery are typically highly sensitive to jitter and latency increases and can degrade as they increase.

Transparent aggregation of a plurality of network connections in an aggregated network connection requires the management of data transmitted over the aggregated connection by the aggregation engine and received from the aggregation traffic termination engine. In one aspect, transparent aggregation does not require any configuration by a network provider. The aggregation engine and the aggregation traffic termination engine may manage data transmission such that the variable path speeds and latencies on the plurality of network connections do not affect the application data transmitted over the aggregated network connection. The network aggregation engine and the aggregation traffic termination engine may handle sequencing and segmentation of the data transmitted through the aggregated connection to transparently deliver application data through the aggregated connection with minimal possible delay while ensuring the ordered delivery of application data.

In one aspect of embodiments described herein, the network aggregation engine provides a newly aggregated network connection with a capacity equal to the sum of the configured maximum throughput of the network connections.

The aggregation engine and an aggregation traffic termination engine (further explained below) handle the segmentation of packets as required in confirmation with architectural specifications such as Maximum Segment Size (MSS) and Maximum Transmission Unit of the underlying network connections. The network aggregation device is operable to handle assignment of sequence identifiers to packets transmitted through the aggregated network connection for the purpose of maintaining the ordering of transmitted data units over the aggregated network connection.

In a further aspect of embodiments described herein, the network connection device includes or is linked to a connection termination device, and a plurality of fixed or hot swappable transceivers for transmitting communication traffic on respective sets of network connections, for the purpose of configuring a plurality of network connections as an aggregated connection or the management of multiple aggregated network connections and providing access to the aggregated network connection for any network communications traversing the device.

In the present disclosure, routing protocols or route selection mechanisms described are intended only to provide an example but not to limit the scope of the invention in any manner.

Figure 2E:
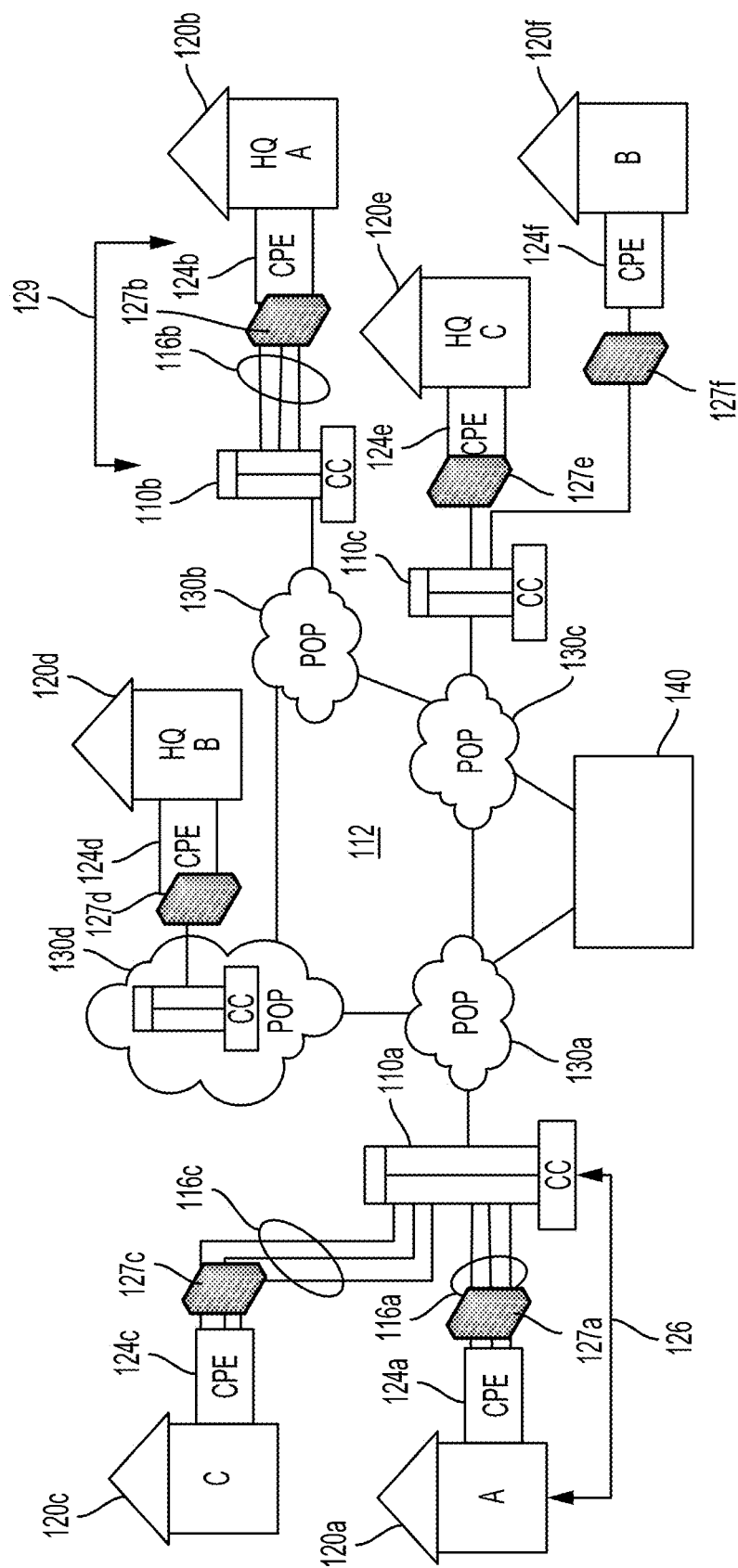
FIG. 2e shows a network solution with bonding/aggregation implemented at both Site A, Headquarter (HQ) A and Site C to connect to a network connecting to Headquarter (HQ) B, Headquarter (HQ) C, and Site B, with a distributed firewall integrated at each.

FIG. 2e shows an exemplary embodiment of a network solution with bonding/aggregation implemented at both Site A, Headquarter (HQ) A and Site C to connect to an MPLS network connecting to Headquarter (HQ) B, Headquarter (HQ) C, and Site B.

As shown in FIG. 2e, a number of customer sites 120a, 120b, 120c, 120d, 120e, and 120f are connected to each other via a core network 112, which may provide a secured VPN network solution to multiple users. As an illustrative example, the core network 112 may be an MPLS network. The network backbone is typically provided by one carrier but multiple networks provided by multiple carriers may also be connected via multiple Points-of-Presence (POPs) to form a super network. As can be seen from the exemplary embodiment, each of Site A 120a and Site C 120c has a CPE-CE (124a and 124c, respectively), which is then connected to a COPE 110a with some form of link aggregation/bonding technology as described elsewhere in this disclosure. The COPE 110a can be also connected to other CCPEs (not shown) within a Point-of-Presence 130a located closest to Site A 120a and Site C 120c. As mentioned earlier in this disclosure, COPE 110 also acts as a PE router to a core network 112 in that it takes incoming or inbound traffic or packets, examines each packet and then encapsulates the packet with an appropriate label (e.g. MPLS label) based on a variety of factors. As MPLS can be layer 2 independent, it can work with any layer 2 protocol including but not limited to ATM, frame relay, Ethernet MAC layer, or PPP. Depending on the content of the incoming (un-labeled) packet, COPE is operable to inspect/examine the destination IP address and other information in the packet header, insert a label into the packet and forward the labeled packet to the output port. Once the labeled packet exits COPE 110 and enters the MPLS network core 112, another router commonly known as a Label Switch Router (LSR), receives the labeled packet. It examines the label and performs a table loop-up at the forwarding table to find the new label and the output port. The LSR then swaps the old label with the new label and routes the newly labeled packet to the next output port. Other LSRs within the MPLS network will perform the same tasks. Eventually the labeled packet will reach another provider edge router. The provider edge router can then examine the label and perform a table look-up at the forwarding table to find that the packet is to be sent to, for example, COPE 110c connected to HQ C 120e and Site B 120f. It then removes the label and sends an unlabeled packet to COPE 110c. COPE 110c will receive the unlabeled packet and examine the IP header information to determine the final destination e.g. HQ C 120e, Site B 120f, or another destination, such as, e.g., HQ A 120b.

In another exemplary embodiment, COPE can also act as the provider edge router for data packets exiting (e.g. "outbound data packets") the MPLS network core 112. For example, labeled packets traveling through the MPLS network core 112 can be routed to and reach a COPE on the edge of the MPLS network. The COPE can then examine the label of the outbound data packet and perform a table look-up at the forwarding table to determine that the packet is to be sent to a CPE-CE ("destination CPE-CE") connected to the COPE. The COPE can further remove the label from the outbound data packet and send it to the destination CPE-CE over ANA link aggregation connections. In some instances the COPE may determine that the destination CPE-CE may be associated or connected with another COPE over a POP 130 or the MPLS network core 112, in which case the COPE may re-encapsulate the data packet if necessary and send it back to the POP and/or MPLS network for further transmission to its final destination. As will be described below, each COPE may comprise a Network Aggregation Device 23 including a Network Aggregation Engine 11 and an MPLS Data Store 40.

In one aspect of embodiments described herein, encapsulation of data packets by a COPE 110 can be done as an on-stack protocol implementation by a network aggregation engine 11 (further described below) based on information supplied by an MPLS data store 40 within or connected to the COPE 110. This way, network data can be transparently sent and received over link aggregation/bonding network 116 by COPE and CPE-CE. Optionally, the CPE-CE can also implement full MPLS network data encapsulation capabilities.

It is shown that some CCPEs may not be associated with a POP, such as COPE 110c or 110b. Whether a COPE is part of a POP may change over time, as COPE dynamically receives and analyzes real-time data regarding various network characteristics. For example, COPE 110b may receive information indicating that a commonly used network path has failed due to power outage, it then may decide to seek alternative connection to the MPLS core via the closest POP 130d. Cloud provisioning services 140 may also configure/reconfigure the CCPEs in real time based on a plurality of network characteristics.

It is further shown that some sites such as HQ B 120d, HQ C 120e, and Site B 120f do not have link aggregation/bonding technologies. That is, an MPLS network as described herein and its associated CCPEs may take both link aggregation/bonding connections or typical broadband connections without said link aggregation technology. Depending on what connection it is, a COPE may adjust accordingly and encapsulates the incoming packets with appropriate labels before forwarding the packets to the MPLS network core 112. A COPE may also de-label data packets before forwarding the packets to the final destination CPE-CEs for outbound data packets exiting the MPLS network core 112. For greater clarity, a COPE may act as a provider edge router and provide, in a simultaneous manner, encapsulation and de-labeling functionalities for inbound and outbound data packets respectively.

As an overarching cloud service, some form of cloud provisioning (or zero touch provisioning ZTP) 140 may also be provided to dynamically configure and reconfigure some or all of the CCPEs and all the CPE-CEs.

In some embodiments, each CPE-CE 124 may be integrated with rules and/or security and policy controls to provide a distributed firewall system where assets are secured by a nearby firewall 127.

Benefits of the exemplary embodiments described in this disclosure include: i) the proprietary link aggregation/bonding technology described herein can utilize any kind of network connection, private or public, layer 2 or layer 3; and ii) the CPE-CEs and CCPEs can encapsulate the data packets for transparent interconnectivity across diverse carriers, with the lower-links aggregated. In other words, even though an MPLS network is typically sold as a private offering utilizing diverse physical local loops to the end customer using the same carrier, embodiments described herein can encapsulate over any carrier using any local physical loop, some times without the need to participate at layer 1 network. Further, "trombone" effects may be reduced or avoided as firewall rules and/or security and policy controls may be applied at a distributed firewall closer to any, some, or all assets each firewall protects instead of at a centralized firewall or at a firewall requiring long haul network communication to reach.

The architecture of embodiments can be understood as a centralized architecture for aggregating network connections, broadband or otherwise. Diverse network connections are aggregated into a virtual (logical) connection that provides higher throughput as well as independence of the network characteristics of the constituent (physical) network. The virtual connection can then be connected to an MPLS network in manners as described herein. Aggregation may be performed to a given CPE-CE terminal.

For instance, in one example of the implementation of the present invention a Metro Ethernet 10 Mbps (E10) link and a T1 (DS1) link can be aggregated in accordance with the invention as described below, in order to provide higher fault tolerance and improved access speeds. The aggregation of diverse carriers in accordance with the present invention extends to any broadband network connection including Digital Subscriber Line (DSL) communications links, Data over Cable Service Interface Specification (DOCSIS), Integrated Services Digital Network, Multi-protocol Label Switching, Asynchronous Transfer Mode (ATM), and Ethernet, etc.

The links to be aggregated can be any private or public Internet services such as cable, ADSL, T1, Fibre, xOE (over Ethernet types), wireless, as well as other MPLS connections so long as the network path reaches a CCPE for lower-link processing from a CPE-CE terminal.

Furthermore, the various network configurations shown in FIGS. 2a to 2f allow the use of low cost Internet links on the client side and where appropriate, between a first MPLS network and a second MPLS network, in order to provide connectivity on the client side and manage connectivity to the one or more MPLS network(s). In effect, this network architecture allows one or more MPLS networks to be brought to normal broadband users. Security is provided through the link aggregation/bonding technologies described elsewhere in this disclosure. The various network configurations can further allow various intelligent network performance features to be deployed.

Figure 2F:
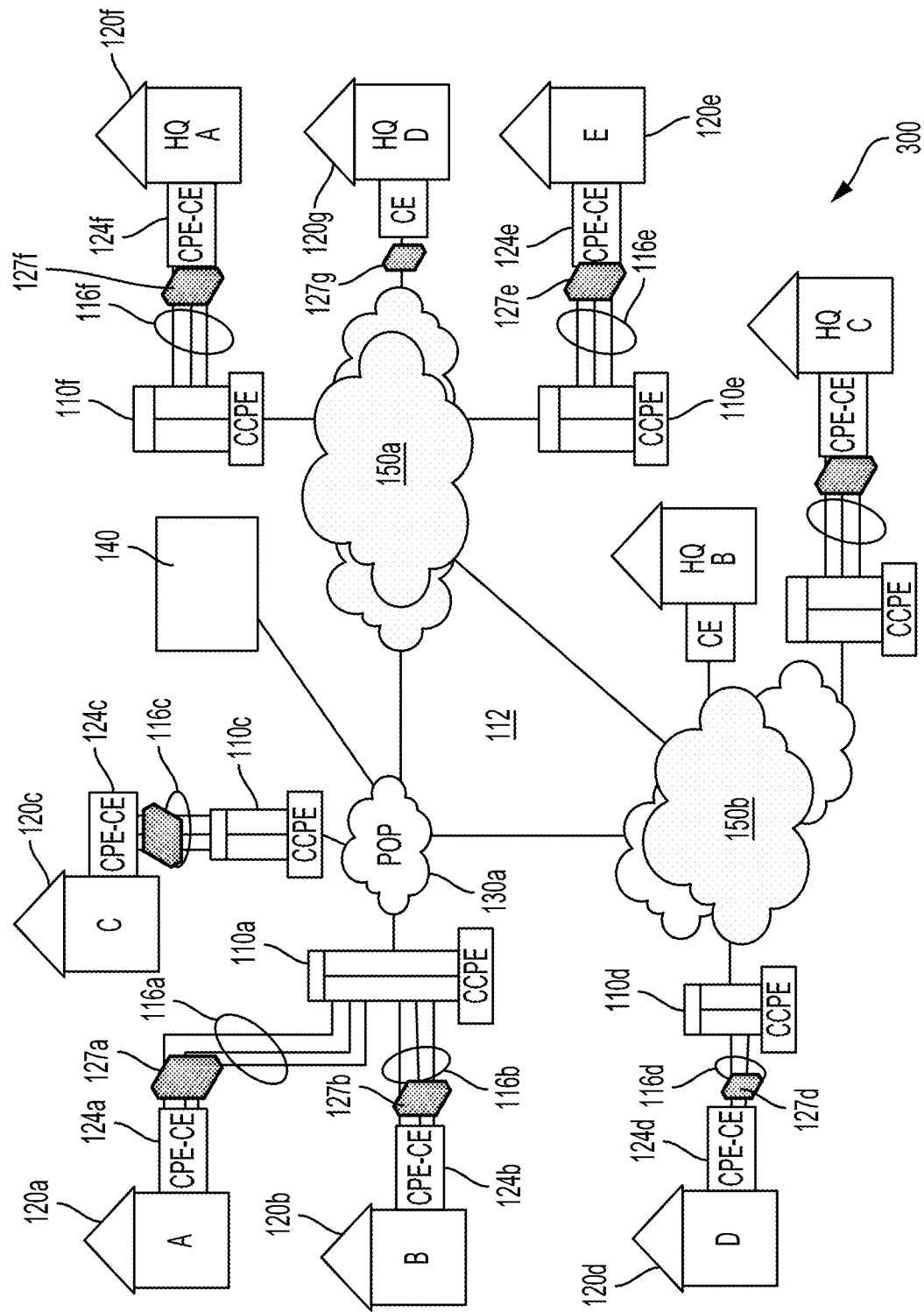
FIG. 2f shows a network solution with bonding/aggregation implemented at Site A, Site B, Site C, Site D, HQ A, HQ C and Site E to connect to a first MPLS network from a first provider connecting and a second MPLS network from a second provider, with a distributed firewall integrated at each.

Turning now to FIG. 2f, which shows a network solution with bonding/aggregation implemented at Site A, Site B, Site C, Site D, HQ A, HQ C and Site E to connect to a first MPLS network from a first provider connecting and a second MPLS network from a second provider, where each Site may be associated with a firewall 127 that may apply rules and/or security and policy controls to protect assets or devices without using or by minimizing long haul network communication. A centralized firewall network controller 210 may use a bonded/aggregated connection 116 to publish one or more firewall templates and/or facilitate generation of a firewall associated with a Site 120 or CPE-CE 124. In a firewall system 200, a firewall 127 may be integrated or associated with a site not having a bonded/aggregated connection, for example, as firewall 127g at HQ D, while other firewalls 127 may be integrated or associated with sites having bonded/aggregated connections. A centralized firewall network controller 210 may use the connections, whether bonded/aggregated or not, to publish one or more firewall templates and/or facilitate generation of one or more firewalls each associated with one or more CPE-CEs 124 or Sites 120.

As can be seen from FIG. 2f, with the unique advantages of multiple POPs, a plurality of MPLS networks from different MPLS providers can be connected to provide a secure, fast network between different end users. A first MPLS network 150a provided by a first MPLS provider is connected to HQ A 120f, HQ D 120g, and Site E 120e. HQ A 120f and Site E 120e each has link aggregation (116f and 116e) facilitated by CCPEs 124f and 124e, respectively. Similarly, a second MPLS network 150b provided by a second MPLS provider is connected to Site D, HQ B and HQ C. Each of the MPLS networks 150a and 160b can act as part of a POP in the overall network architecture 300. Even though only two MPLS networks are illustrated here, there can be a plurality of MPLS networks not limited to two or any particular total of networks. This way, one can extend an MPLS network to use other MPLS or non-MPLS connections to reach the end customer, whether using static or dynamic IP addressing, and without the participation of carriers.

Specifically, a COPE 110a can be connected to more than one CPE-CE devices 124a, 124b and 124c, supporting a multi-tenant service for multiple customers. That is, a COPE 110a can treat each CPE-CE 124a, 124b or 124c connected to the COPE independently, with link aggregation 116a, 116b and 116c between each CPE-CE and COPE.

In another example (not explicitly illustrated), a COPE can facilitate many CPE-CE's to one COPE implementation, supporting a multi-tenant service for multiple customers on their own MPLS network. This can be serviced by a single COPE treating each CPE-CE independently on a tenant instance or MPLS network.

Figure 3:
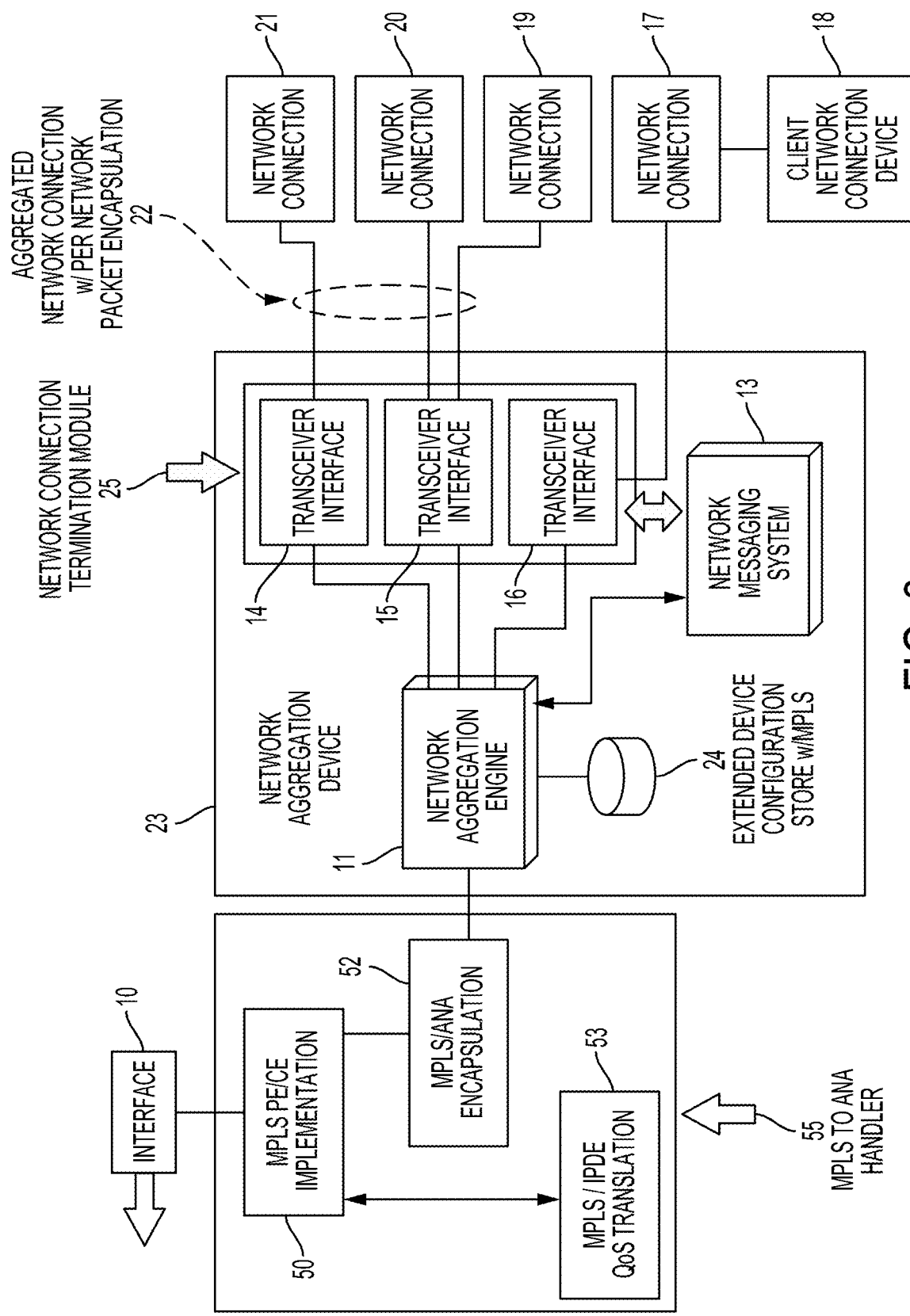
FIG. 3 is a block diagram of a communication device incorporating a particular embodiment of the invention, demonstrating the device as an aggregation means on the client/CPE-CE side of a network connection.

FIG. 3 is a block diagram of a communication device incorporating a particular embodiment of the invention, demonstrating the device acting as a client or CPE-CE.

As shown in FIG. 3, the network element/network aggregation device (also referred to in this disclosure simply as the "device" or the "network aggregation device") 23 includes (in this particular embodiment shown for illustration) a network connection termination module 25 that includes representative transceiver interfaces 14, 15 and 16. Each transceiver interface 14, 15 and 16 represents an interface to a physical communication medium through which communications may be established to network connections.

A possible implementation of the network aggregation device may use a single or multiple chassis with slots for multiple network connection termination modules and multiple network aggregation engine modules. The multiple network connection termination modules may be grouped by protocol specific or medium specific transceiver/interfaces.

The network aggregation engine 11 may handle the configuration of the network aggregation device and all related interactions with external inputs. An extended device configuration store with MPLS capacity 24 may provide persistent data storage for device configuration information such as a network aggregation policy and MPLS related configuration information and policies. MPLS related configuration information may include label lookup table, forwarding table, routing table, labeling and mapping policies, and/or MPLS provider information.

The network aggregation engine 11 may handle queries from external sources, such as configuration parameters a network management protocol such as Simple Network Management Protocol, for example. The interface 10 may be a protocol agent and may provide for communication with a Network Management System (NMS) or operator system for configuration of the aggregation engine by the definition of an aggregation policy. Control and management information may be transferred between the network aggregation device 23 and the NMS or operator system through the interface 10 via any available or specifically designated network connection 19, 20, 21 and 17 through any transceiver interface 14, 15 and 16.

In one exemplary embodiment, the described system can transport MPLS packets back and forth between MPLS core network and ANA link aggregation connection(s) so as to enable extending communication of MPLS packets beyond the edge of the MPLS core network, using ANA link aggregation technology. The system can include specific mechanisms for enabling the transport of the MPLS packets (e.g., data packets leaving MPLS core network and entering ANA) using transcoding/translating and then encapsulation for ANA link aggregation connection(s), in a way that maintains the integrity of the MPLS packet, including processing instructions such as those related to QoS. In the reverse transport flow, MPLS packets (e.g. data packets leaving ANA and entering MPLS core network) can be de-encapsulated to remove ANA protocol and where appropriate, transcoding/translation in order to obtain the original data packet without affecting integrity, and in such a way that can enable further, if any, MPLS processing to happen automatically.

For example, encapsulation, as will be described further herein, can be handled either by MPLS-to-ANA Handler 55. The MPLS-to-ANA Handler 55 can be implemented either as the ANA client, the ANA server and/or the ANA protocol itself.

In accordance with an aspect, multiple network connections may be combined to form an aggregated network connection 22, as disclosed in further detail herein. Each individual network connection may be configured with a maximum communication traffic rate, which could be expressed as a bit rate in bits per second.

The network aggregation engine 11 may be implemented in software for execution by a processor in the network aggregation device 23, or in hardware such as by means of a Field Programmable Gate Array (FPGA) or other integrated circuit, or some combination thereof. The network aggregation engine 11 may be implemented in a distributed manner by distributing aggregation engine intelligence to the network connection termination module 25, in a manner that is known.

The network aggregation engine 11 may receive traffic from client network connection device 18 through a network connection 17 provided through a transceiver interface 16. The client network connection device 18 may be any device including, without limitation, a router, switch, or media converter that is capable of providing termination for a single or multiple client nodes, where nodes are any devices capable of connecting to a network irrespective of protocol or interface specificity. In various embodiments, traffic may be received over multiple network connections through a single or multiple transceiver interfaces. The network aggregation engine 11 may accept all traffic from the client network connection, may provide encapsulation and segmentation services for the traffic for transmission through the aggregated network connection 22, and may transmit it over any of the network connections 19, 20 and 21 through any of the transceiver interfaces 14, 15 and 16. The network aggregation engine 11 may handle segmentation in a manner that avoids the fragmentation of aggregated communication traffic received through the client network connection device 18, when transmission occurs over the aggregated network connection 22 through any of the network connections 19, 20 and 21, by ensuring that the length of a packet/frame transmitted over any of the network connections 19, 20 and 21 is less than or equal to the configured or detected frame length for the respective connections in the aggregated network connection 22.

In the embodiment as shown in FIG. 3, the network aggregation engine 11 may be connected to an MPLS to ANA Handler 55. The engine 55 may comprise an MPLS PE/CE implementation module 50, an MPLS/ANA encapsulation module 52 and an MPLS to IPDE QoS Translation module 53. During operation of transmitting data packets from client site CPE-CE to MPLS core, network aggregation engine 11 may send the packet to the MPLS to ANA Handler 55. The data packet may be encapsulated via MPLS/ANA Encapsulation 52 based on specific MPLS configuration data in the extended device configuration store 24. The encapsulated data packet can then be sent to MPLS PE/CE implementation module 50, which may further provide segmentation in a manner that avoids the fragmentation of aggregated communication traffic received through the client network connection device 18, when transmission occurs over the aggregated network connection 22 through any of the network connections 19, 20 and 21, by ensuring that the length of a packet/frame transmitted over any of the network connections 19, 20 and 21 is less than or equal to the configured or detected frame length for the respective connections in the aggregated network connection 22.

In addition, MPLS to link aggregation (or ANA) transcoding can be performed between the MPLS core and the Customer LAN via the MPLS to ANA Handler 55. In a direction from MPLS core to the edge, as an example, the CCPE MPLS protocol implementation can communicate with the MPLS core recognizing packets that are destined for the customer LAN located over the link aggregation session serviced by the a CCPE implementation. At this point, the data packets with MPLS protocol can be transcoded and transmitted over the link aggregation session to the customer's CPE-CE device with labels intact. When the packets reach the ANA CPE-CE device, the CPE-CE device can transcode from link aggregation ANA to MPLS again and deliver the packets on to the customer LAN.

In one embodiment, the virtual (logical) link aggregated from a variety of diverse or dissimilar network connections through a single or multiple transceiver interfaces may be implemented over one physical link to encompass a single link aggregation for MPLS Edge with a bi-directional IP Quality of Service (QoS) achieved.

In one exemplary embodiment, data packets with MPLS protocol may be transmitted across the MPLS core and arrive at the CPE-CE side of a network connection with MPLS label(s). The MPLS labels can be retrieved and/or parsed by the CPE-CE device 124 (e.g. by an MPLS to ANA Handler 55) in order to determine further processing of the packet. In the system described herein, (1) the MPLS labels can be acquired from the data packet with MPLS protocol (or also known as "MPLS packet"); (2) a table (such as a distribution table) maintained within or connected to the CPE-CE device 124 can cause the destination associated with the data packet and/or the MPLS label to be determined and accessed, and to retrieve corresponding rules (from e.g. Extended Device Configuration Store 24) to determine how to distribute the data packet over aggregated network connections; (3) if corresponding MPLS processing rules are found these may be used for distribution of the data packet over aggregated network connection(s); and if (4) no corresponding MPLS processing rules are found the data packet is not handled. In the case of (4) the system may default to IP processing rules.

The MPLS packet can include a header that can be used for sub-processing. The sub-processing can include IPDE to QoS transcoding or translation by MPLS/IPDE QoS Translation module 53. This involves transcoding or translating the QoS request associated with a packet, as opposed to the packet itself. This now enables the link aggregation ANA system to handle the MPLS packet based on the associated QoS requests, and also ensure that those QoS requests remain intact for handling by MPLS PE/CE at the destination. The packet's integrity is maintained, including its MPLS label.

Once transcoding/translation is done, ANA encapsulation may occur. An encapsulation technique used can be MPLS network compatible or MPLS aware. This can be accomplished by using MPLS protocol as part of ANA encapsulation by MPLS/ANA Encapsulation module 52.

Extended Device Configuration Store 24 can allow ANA system to process MPLS packets. It may contain some of the same information that is used to perform the MPLS to IPDE QoS translation.

The system can continue to apply the QoS requests and therefore handling of MPLS packets continues to happen within ANA in a way that is consistent with transport of MPLS packets on an MPLS network. The packets are not necessarily modified, rather, handling of the MPLS packet can occur based in part on ANA rules that are made to adhere dynamically to MPLS handling rules.

In another embodiment, a similar process may operate in a reverse direction: MPLS packets may come out of ANA link aggregation connection first by de-encapsulating, and then translating/transcoding so as to provide the MPLS data packets.

In one embodiment, the network aggregation engine 11 may poll the state of network connections 19, 20 and 21, for example, as per configured intervals stored in the device configuration store 24, to ensure that all network connections configured in an aggregated group are within configured acceptable tolerances. If a network connection 19, 20, and 21 exceeds acceptable tolerance values for any of the polled parameters, the network aggregation engine 11 may remove the network connection 19, 20, and 21 from within the aggregated network connection 22 without removing it from the polled network connections list. By leaving the removed network connection 19, 20, and 21 in the polled network connection list, the network aggregation engine 11 may aggregate the network connection into the aggregated network connection 22 once it has come back within acceptable tolerance values. This may ensure that a network connection may change states between residing in an aggregated network connection 22 or not, without the intervention of an external system or input. The network aggregation engine 11 may handle notifications to all end points configured within the device configuration store 24 with internal events such as changes in network connection state, threshold violations on configured thresholds for any number of configurable variables for any object within or connected to the network aggregation device 23. The network aggregation engine 12 may also handle events such as changes in the state of a network connection 19, 20, and 21 included in the aggregated connection, changes in latency of a network connection included in the aggregated network connection 22, scheduling changes, event logging, and other events.

Figure 4:
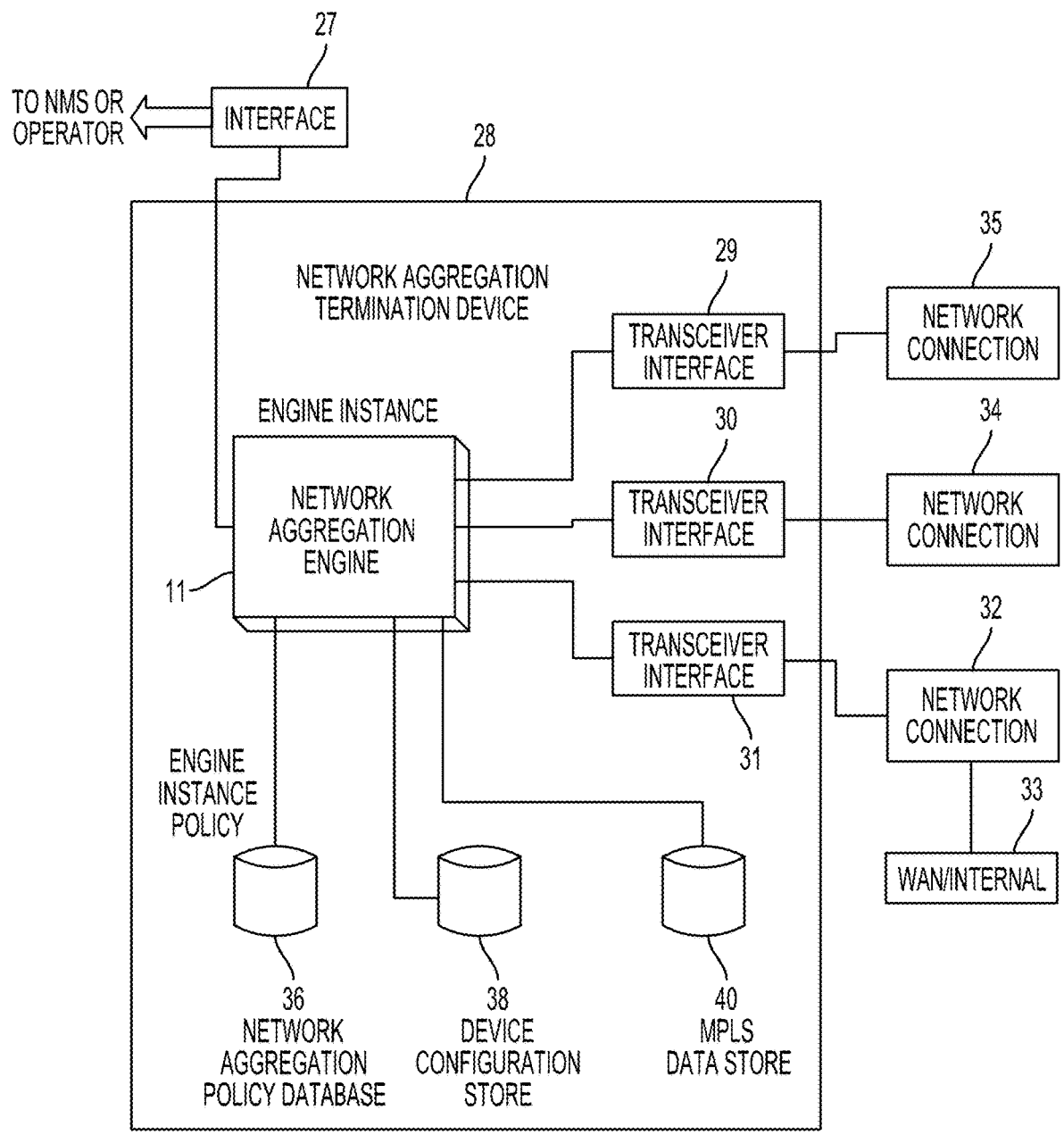
FIG. 4 is a block diagram of a communication device incorporating a particular embodiment of the invention, demonstrating the device as an aggregation means on the server/concentrator side of a network connection and an MPLS data store.

FIG. 4 is a block diagram of a communication device incorporating a particular embodiment, demonstrating the device acting as a server/concentrator or COPE.

The network aggregation engine 11 may provide access to a network aggregation policy database 36 which stores configuration information related to the various aggregated network connections that terminate on the aggregated network connection device 28. The network aggregation termination device 28 may be implemented in such a manner that each aggregated network connection defined in the network aggregation policy database 36 is handled by its own virtual instance, the use of which enables termination of each aggregated network connection from multiple customer premises equipment (CPE-CE). In addition, an MPLS data store 40 may provide persistent data storage for MPLS related configuration information such as label lookup table, forwarding table, routing table, labeling and mapping policies, and/or MPLS provider information. As described above, based on the information in MPLS data store 40, Network Aggregation Engine 11 may be operable to encapsulate incoming or inbound data from CPE-CE for transmission into core MPLS network. In a similar fashion, Network Aggregation Engine 11 may remove MPLS label from outbound data packets exiting an MPLS network and forward the data packets to the appropriate CPE-CE based on a label look-up table or a forwarding table. In cases where multiple CPE-CE devices are handled by one COPE, Network Aggregation Engine 11 is further operable to determine, based on the MPLS data store 40 and/or the MPLS label information on the outbound data packets, the final destination CPE-CE(s) to which each outbound data packet should be delivered.

Figure 5:
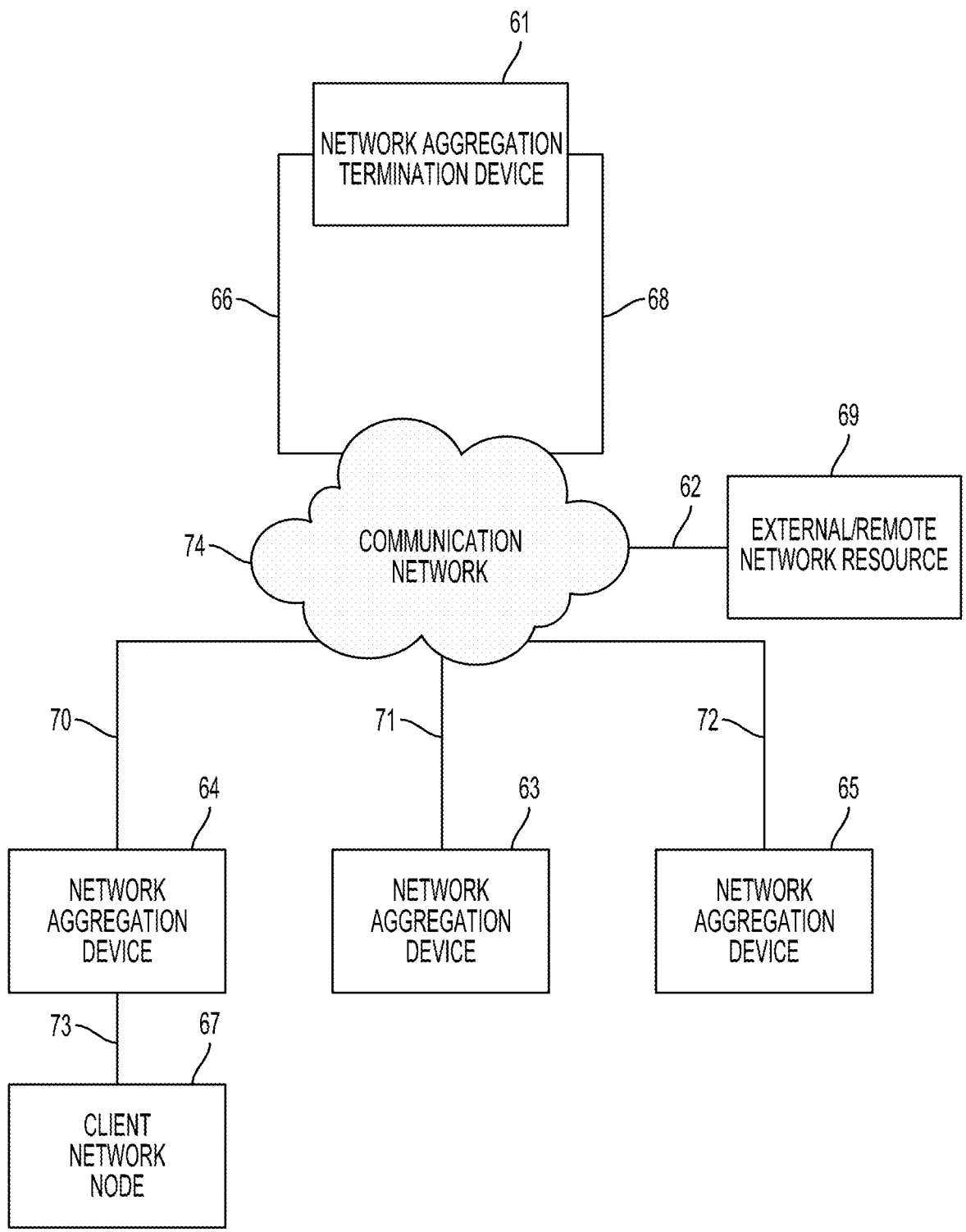
FIG. 5 is a block diagram of a communication network incorporating a particular embodiment of the invention, demonstrating the device as an aggregation means on both the client/CPE-CE side and server/concentrator or COPE side of a network connection.

FIG. 5 is a block diagram of a communication network incorporating a particular embodiment, demonstrating the function of the device acting as a client/CPE-CE and server/concentrator or COPE.

In accordance with a particular embodiment, aggregated network connections 70, 71 and 72 may be built by network aggregation devices 63, 64 and 65, which terminate to a single aggregated network connection termination device 61 through network connections 66 and 68 as their endpoint. The aggregated network connection termination device 61 may access external communications networks through network connections 66 and 68 to access external/remote network resource 69. Access to external communications networks, such as an MPLS network or the Internet, may be provided by the aggregated network connection termination device 61 by using either network connection 66 or 68 through the use of a routing protocol, such as Border Gateway Protocol (BGP), Open Shortest Path (OSPF), or through the use of simpler mechanisms such as load sharing over multiple static routes within the communication network 74 that acts as the valid next-hop for the aggregated network connection termination device 61.

Aggregated network connections 70, 71 and 72 may provide access to client network nodes 67 connected to the network aggregation devices 63, 64 and 65 through the aggregated network connections 70, 71 and 72 to communications networks 74 accessible by the aggregated network connection termination device 61.

A client network node 67 may request data provided by an external/remote network resource 69 accessible through a communication network 74. This request for the external/remote network resource may be routed over the network connection 73 providing access from the client network node 67 over the aggregated network connection 70 to its end-point which is the aggregated network connection termination device 61. This may be done through the communication network 74 through the network connection 66 into the aggregated network connection termination device 61. Any data sent by the external/remote network resource 69 may be routed back through the aggregated network connection termination device.

A particular embodiment may use the Internet as the communication network 74 referenced in FIG. 5, or another WAN network for example. The communication network 74 may alternatively be built by multiple sub-networks created through the use of multiple network aggregation devices 63, 64 and 65 with aggregated network connection termination device 61 end points through multiple network connections 66 and 68. Furthermore, the communication network 74 may also be an MPLS network provided by an MPLS provider or carrier.

Figure 6:
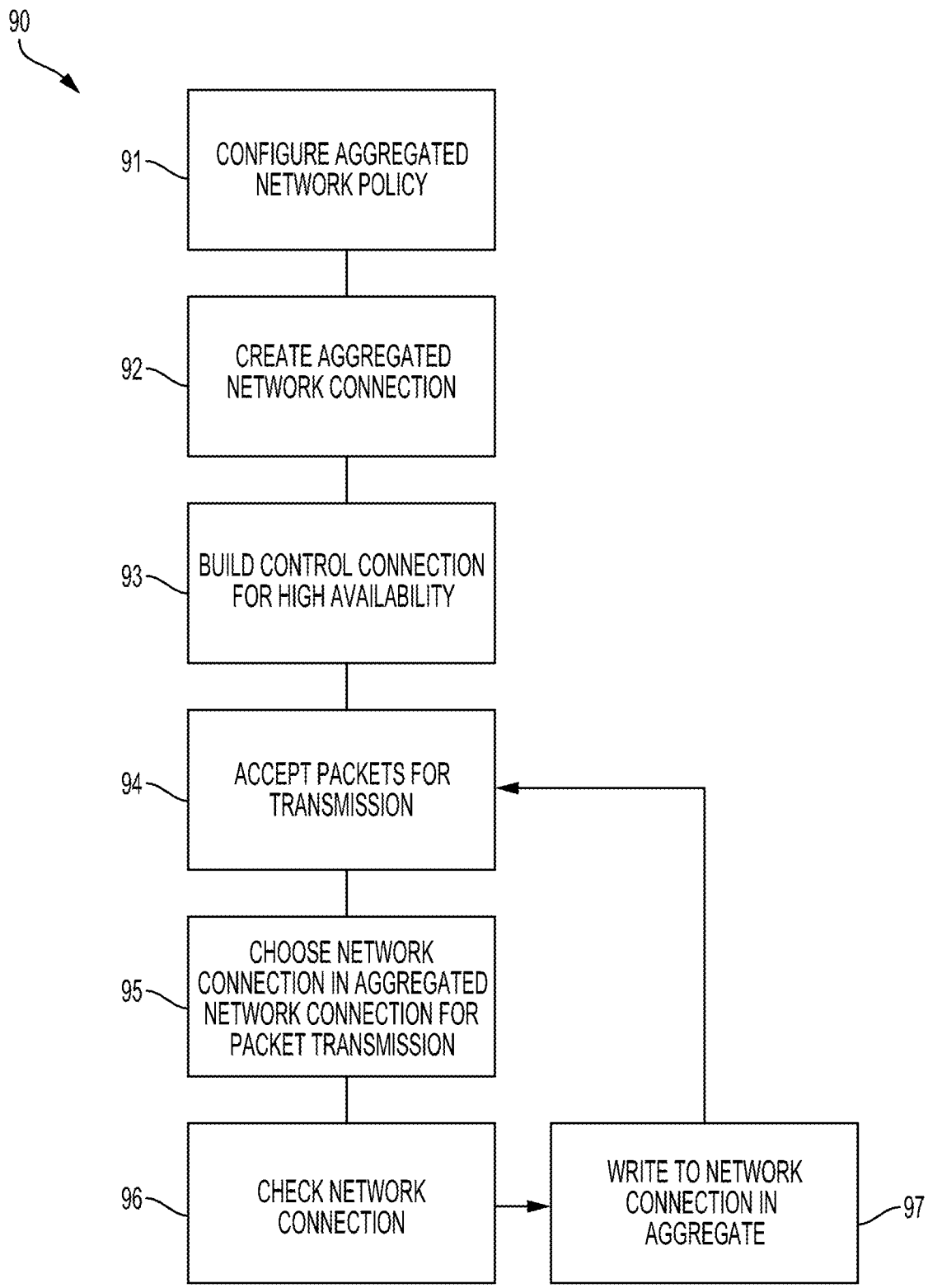
FIG. 6 is a flow diagram of a method of providing redundancy and increased throughput through a plurality of network connections in an aggregated network connection.

A further aspect relates to the provisioning of high availability over the aggregated network connection by the network aggregation engine 11. FIG. 6 illustrates a method of providing redundancy and increased throughput through a plurality of network connections in an aggregated network connection. The method 90 may begin with a step of configuring a plurality of network connections 91 through the creation of a network aggregation policy to form 92 the aggregated network connection. The aggregated network connection may be initialized as per the network aggregation policy. Control connections may be created 93 for the plurality of network connections configured as part of the aggregated connection to allow the aggregation engine 11 to manage the membership of a network connection within the aggregated connection. The network aggregation engine 11 may accept packets for transmission 94 over the aggregated network connection 22. The network aggregation engine 11 may choose a network connection 95 among the group of network connections configured 91 in the aggregate in the stored aggregation policy for transmission of the current packet being transmitted. The choice of network connection for transmission of the current packet may be specified within the aggregation policy and may take into account data provided by the control connection built at 94.

According to one embodiment, a non-responsive network connection may be easily detected when using latency and packet loss as a measure. The mechanism for detecting 96 and adapting to 97 the network connection change within an aggregated network connection may be implemented within the data transmission routine in the aggregation engine 11 or as a separate process in parallel to the transmission routine in the aggregation engine 11 to allow for further flexibility in provisioning redundancy within the aggregated network connection.

Since this may occur on a per packet basis as opposed to on a per stream basis, a single non-responsive network connection may not affect the aggregated network connection and may allow data transmission to continue regardless of the individual states of network connections so long as a single network connection within the aggregated network connection is available for data transmission.

Encryption

Encryption may be provided for the link aggregation connections between a CPE-CE and a CCPE. In one exemplary embodiment, each lower-link connection handled and aggregated by a CCPE or CPE-CE may be encrypted by the Network Aggregation Engine 11 using transparent encryption.

In an embodiment, an overlay of IPSEC may be implemented over the link aggregated connections, sometimes in conjunction with existing IPSEC Edge implementations. For example, IPSEC gateways or clients can be installed on the CPE-CE's connected to the various CCPEs. In turn, the CPE-CEs with the IPSEC clients can terminate the IPSEC sessions on the COPE or an existing carrier's IPSEC gateway on the MPLS network. Alternatively, IPSEC may be implemented at the PE routers or device such as a COPE.

In an embodiment, a virtual edge overlay may provide transparent encryption for the aggregated connection between the CPE-CE and the COPE. An example is IPSEC. The virtual edge may provide lower link transparent encryption as described herein.

Example in Operation

Figure 7A:
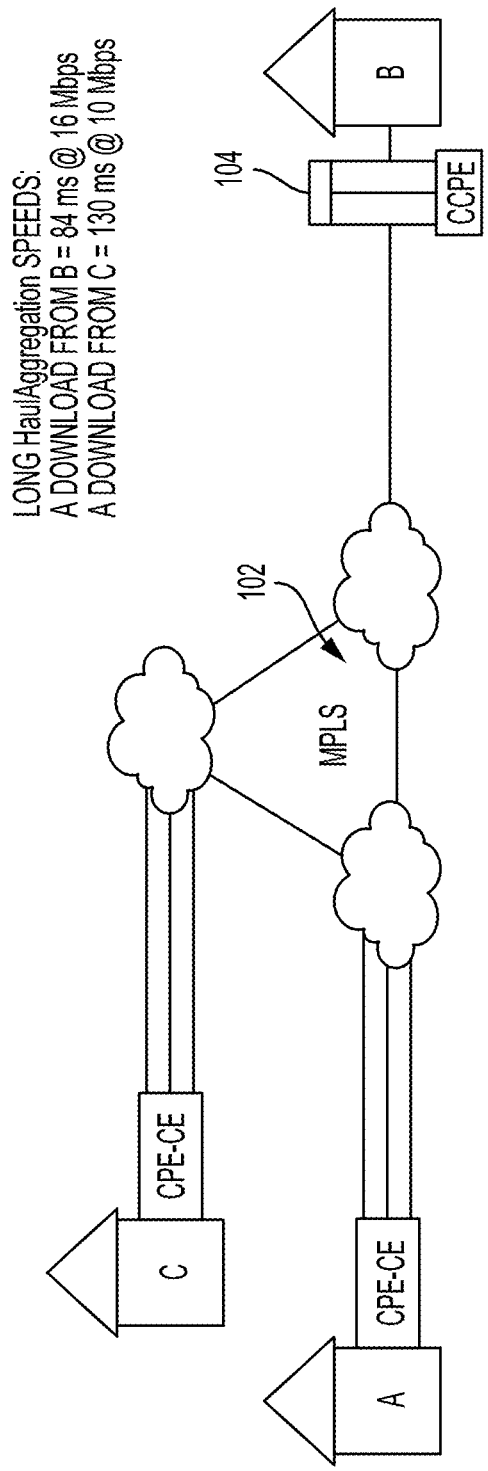
FIG. 7a illustrates a prior art network architecture where long haul effects apply, and presents network performance based on download speed.
Figure 7B:
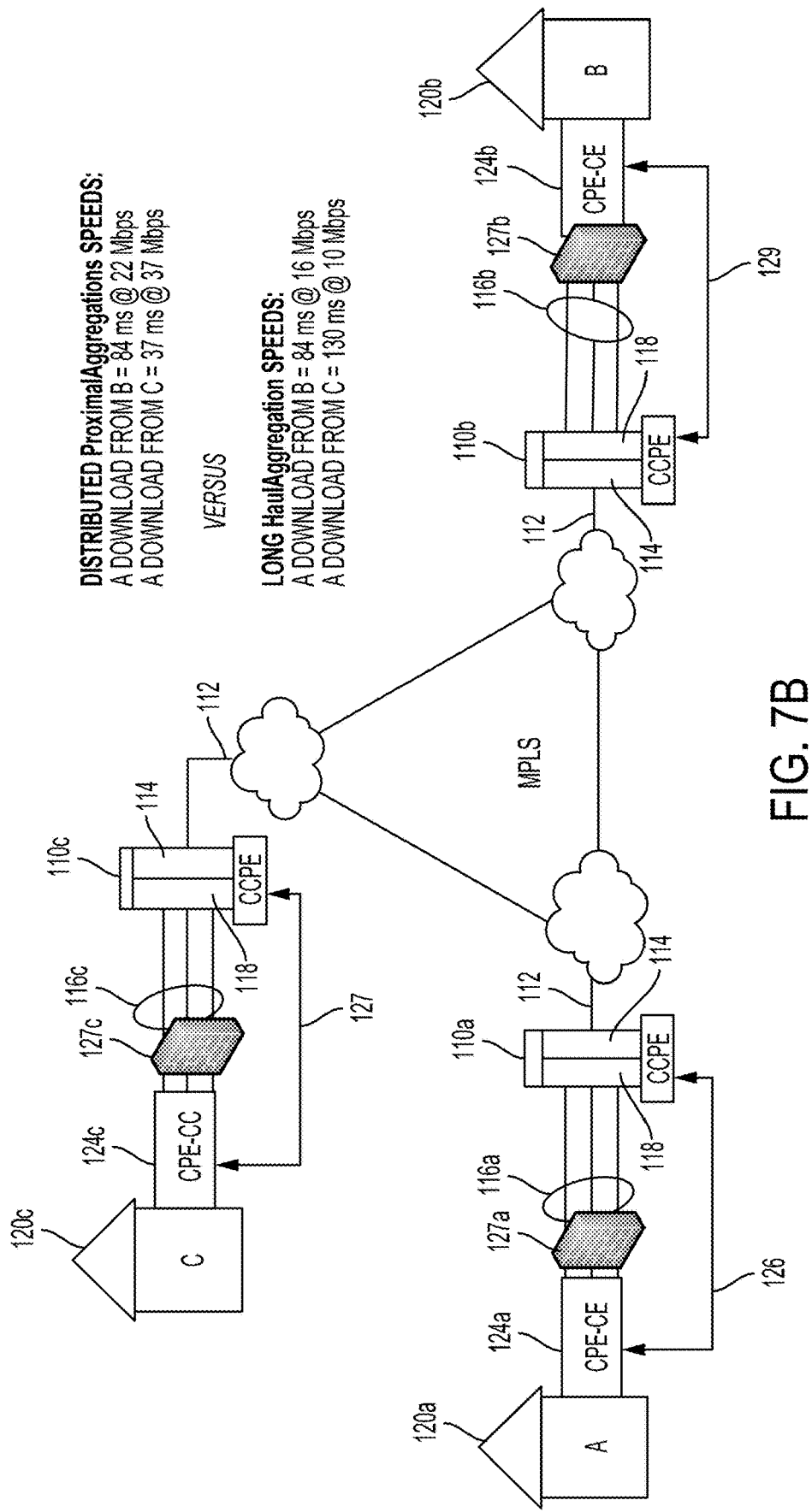
FIG. 7b illustrates, in similar network conditions as in FIG. 7a but implementing the present invention in order to reduce long haul bonding/aggregation in association with a distributed firewall system, improved network performance based on faster download speed.

In one possible implementation, 3 locations are provided namely Site A, Site B, and Site C, and Site D. FIGS. 7a and 7b illustrate network performance as discussed herein. FIG. 7a illustrates performance with long haul effects. FIG. 7b illustrates performance with reduction of long haul effects, based on embodiments in network conditions otherwise similar to those on which FIG. 7a is based.

FIG. 7b shows an improvement in performance over FIG. 7a, based on reduction of long haul effects in relatively long distance network communications are implemented using the network architecture.

Embodiments may provide improved network performance relative to speed. A skilled reader will appreciate that the improvement in performance shown for the above example is significant. Other aspects of network performance, e.g., latency may also be improved.

Virtual Network Overlay and Tunnels

Embodiments may provide a network system for improving network communication performance between client sites at a distance from one another that is such that would usually require long haul network communication.

In some embodiments disclosed herein, there is provided a Virtual Network Overlay for multiple networks, such as for example one or more WAN. The Virtual Network Overly may allow multiple CPE devices to connect with CC devices and create an Over-The-Top Secure Network across Multiple Points-of-Presence between disparate sites. The Virtual Network Overlay service can provide features such as optimized Internet access, secure WAN (or other secure networks), and diverse carrier failover, for example. The Virtual Network Overly may support and integrate Software Controlled Networking SCN, MDPS, and IPDE as described herein.

Figure 8A:
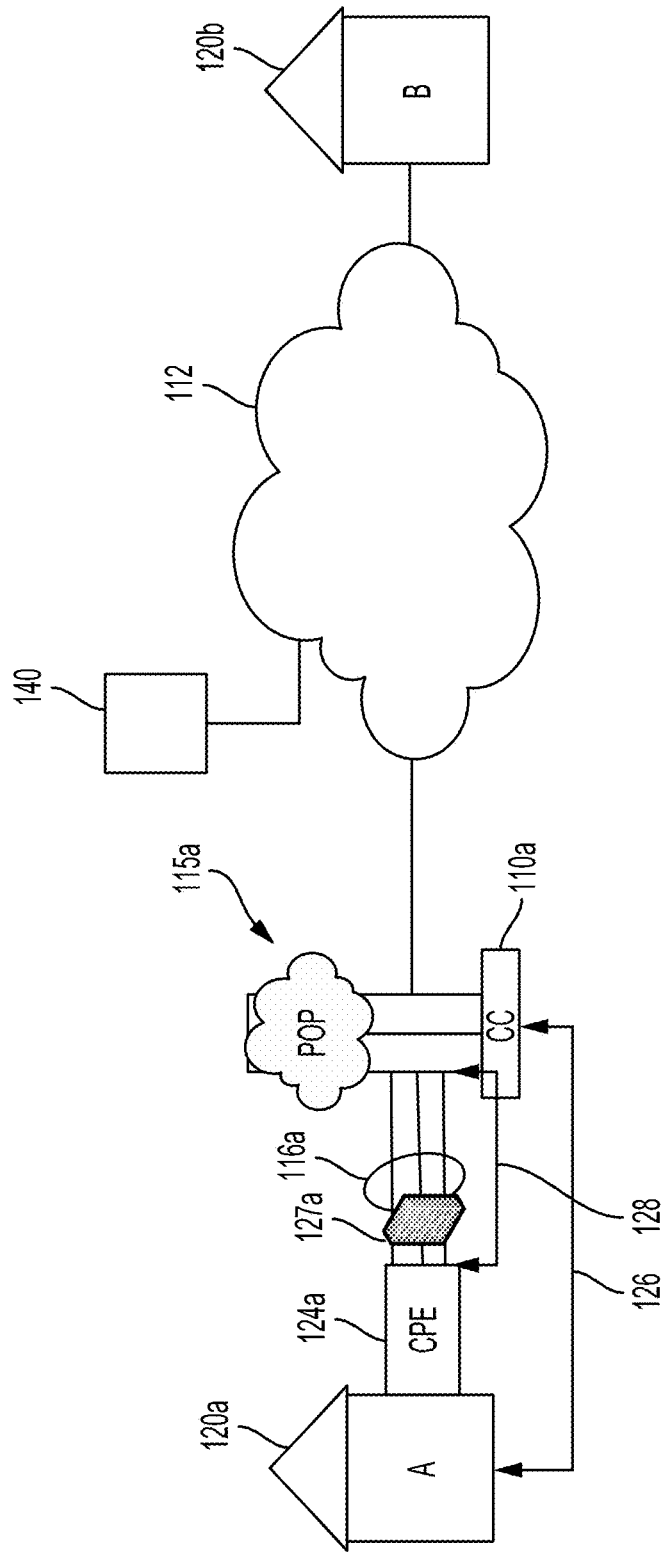
FIG. 8a illustrates a network solution with aggregated/bonded connections with a virtual edge and a distributed firewall in accordance with one embodiment.

As shown in FIG. 8a, there may be at least one client site network component 124a implemented at a client site A 120a for bonding or aggregating one or more diverse network connections so as to configure a bonded/aggregated connection 116a that has increased throughput, for example, to facilitate centralized firewall management by a centralized firewall network controller 210 that may facilitate generation of a distributed firewall system including at a client site network component (124a).

There may be at least one network server component 115a that is configured to connect to the client site network component 124a using the bonded/aggregated connection 116a. The network server component 115a includes at least one concentrator element 110a implemented at a network access point to at least one network 112. As described, the network server component 115a automatically terminates the bonded/aggregated connection and passes the data traffic to an access point to at least one network 112.

A virtual edge 128 connects the network server component 115a and the client site network component 124a. The virtual edge 128 may provide transparent lower-link encryption for the connection between the client site network component 124a and the network server component 115a. The virtual edge 128 may implement a common access protocol for encapsulation of data packets for the data traffic carried over the bonded/aggregated connection 116a. This provides lower-link encapsulation support for protocols such as for example L2TP, PPPoE, PPTP, DHCP, UDP, and so on. By way of example, L2TP is a link-layer tunneling protocol to support VPNs. The virtual edge 128 may provide transparent encryption of the tunneling protocol to provide security and confidentiality The virtual edge 128 component addresses the Transparent Encryption Layer aspect of the SDN to SCN Mapping architecture as per the tables of system and network components herein. The tunneling protocol allows for provision of network services that the underlying network does not provide directly. A tunneling protocol may use a data portion of a data packet (e.g. payload) to carry the packets that provide the desired service. For example, L2TP may use L2TP packets to provide different network services. In computer networking, the link layer is the lowest layer in the IP suite which may be referred to as TCP/IP which it the networking architecture of the Internet. A link may be the physical and logical network component used to interconnect hosts or nodes in the network. Accordingly, the link layer relates to the links the physically connect the nodes of the network including the devices of the client site network component 124a and the network server component 115a. The link layer may be described as a combination of the data link layer and the physical layer in the Open Systems Interconnection model. As another example, Point-to-Point Protocol over Ethernet (PPPoE) is a network protocol for frame encapsulation inside Ethernet frames. As a further example, Point-to-Point Tunneling Protocol (PPTP) may implement VPNs and may use a control channel over TCP and a GRE tunnel operating to encapsulate PPP packets. These are illustrative example protocols that may be used to support encapsulation of data packets using a common access protocol. The virtual edge 128 lower-link tunneling protocol connections address the Site/Branch Infrastructure component of the SDN to SCN mapping for the Lower Plane infrastructure architecture as per the tables of system and network components herein.

A cloud network controller 140 is configured to manage the data traffic so as to provide a managed network overlay 126 that incorporates the at least the bonded/aggregated connection 116a and at least one long haul network path carried over the at least one wide area network 112. The network overlay 126 may include one or more virtual edges 128. The Network Overlay 126 addresses the Virtual Data Plane aspect of the SDN to SCN Mapping as per the tables of system and network components herein.

Figure 8B:
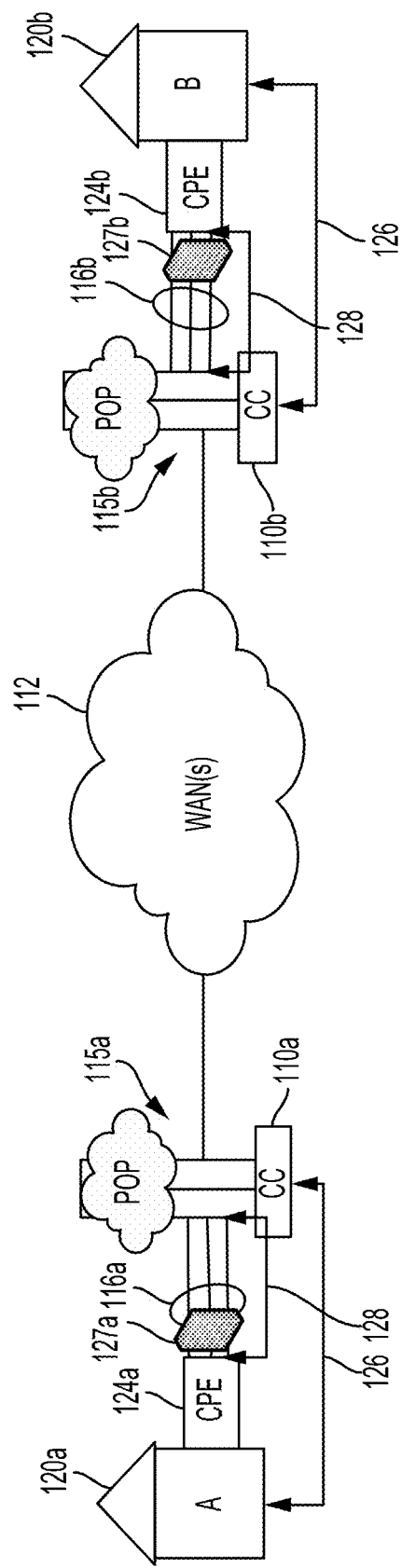
FIG. 8b illustrates another network solution with aggregated/bonded connections with a virtual edge and a distributed firewall in accordance with another embodiment.

As shown in FIG. 8b, there may be at least one other client site network component 124b implemented at a client site B 120b for bonding or aggregating one or more diverse network connections so as to configure a bonded/aggregated connection 116b that has increased throughput. Network server components 115a, 115b connect through a WAN network 112. There may also be a virtual edge 128 with transparent encryption and a managed network overlay 126 between the client site network component 124a, 124b and the corresponding network server component 115a, 115b. The client site A 120a and client site B 120b may be at a distance from each other such that at least one long haul network path is required to transmit data there between. The managed network overlays 126 may integrate to provide a single managed network overlay between disparate client sites and may include both virtual edges 128. Each managed network overlay 126 may facilitate centralized firewall management by a centralized firewall network controller 210 that may use a managed network overlay to publish one or more firewall templates and/or facilitate generation of a firewall associated with Site A 127a and/or a firewall associated with Site B 127b.

Figure 9A:
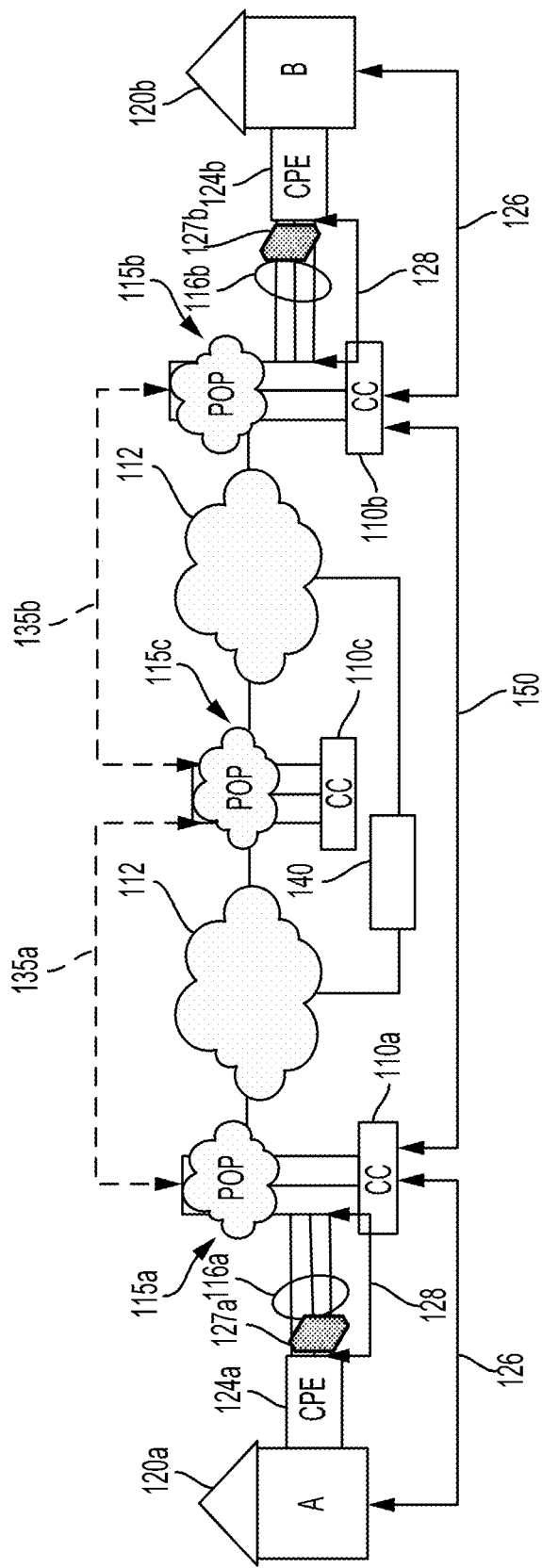
FIG. 9a illustrates a network solution with aggregated/bonded connections with a virtual edge and two virtual core connections, each associated with a distributed firewall, in accordance with one embodiment.
Figure 9B:
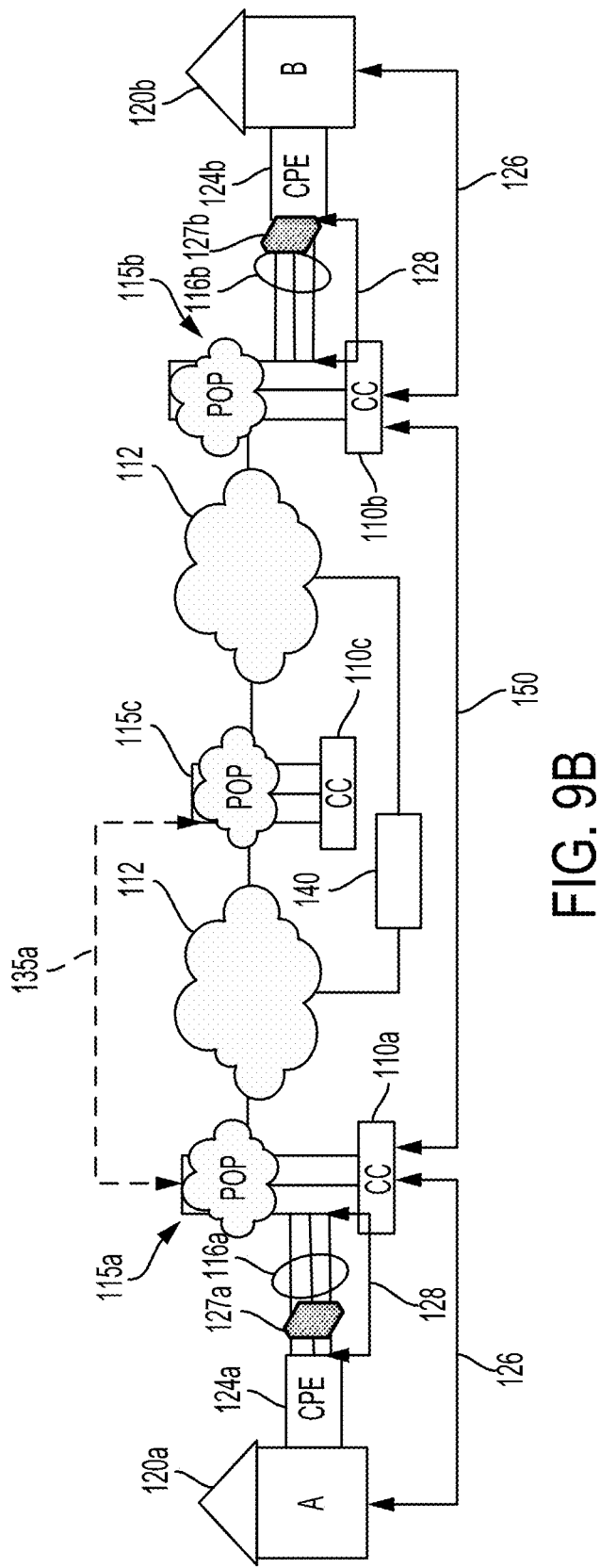
FIG. 9b illustrates a network solution with aggregated/bonded connections with a virtual edge and one virtual core connection associated with a distributed firewall in accordance with one embodiment. The connection not using a virtual core connection is also associated with a distributed firewall in accordance with one embodiment.

In some examples, as shown in FIGS. 9a and 9b there may be multiple networks 112 connected by concentrator elements 110a, 110b, 110c. For example, there may be a first concentrator element 110a implemented at the access point to the at least one WAN 112. There may be a second concentrator element 110c implemented at another access point to at least one other WAN 112. There may be a third concentrator element 110b connected to an access point to a WAN 112. The first concentrator element 110a and the second concentrator element 110c are configured to interoperate to provide a virtual core (VC) connection 135a between the access points. The VC connection 135 may be a virtual Ethernet tunnel in some example embodiments. The third concentrator element 110b and the second concentrator element 110c are configured to interoperate to provide another VC connection 135b between the access points. The VC connection 135a, 135b provides transparent encryption. The VC connection 135a, 135b may also support a common access protocol for encapsulation of data packets. The VC connection 135a, 135b may provide both transparent encryption and support of the common access protocol in some embodiments. The Virtual Core connection 135 addresses the Virtual Control Plane aspect of the SDN to SCN Mapping as per the tables of system and network components herein.

The cloud network controller 140 is configured to manage the data traffic so as to provide a managed network overlay 150 that incorporates at least one long haul network path carried over the WANs 112. The managed network overlay 150 may be referred to herein as the Virtual Network Overlay 150. As shown in FIG. 9a, the Virtual Network Overlay 150 may involve the VC connections 135a, 135b to provide a virtual connection between the concentrator elements 110a, 110b. The VC connection 135a, 135b may provide a bonded/aggregated connection. The Virtual Network Overlay 150 and/or one or more of the VC connections 135 may facilitate centralized firewall management by a centralized firewall network controller 210 that may use same to publish one or more firewall templates and/or facilitate generation of a firewall associated with Site A 127a and/or a firewall associated with Site B 127b. As shown in FIG. 9b, the Virtual Network Overlay 150 may involve a VC connection 135a to provide a virtual connection between the concentrator elements 110a, 110c. A single managed virtual network overlay may integrate multiple Network Overlays 126, 150, multiple virtual edge connections 128, and multiple VC connections 135a, 135b. The singled managed virtual network overlay may provide an end-to-end overlay connecting disparate client sites (e.g. site A 120a, site B 120b). The Cloud Network Controller 140 addresses the Orchestration aspect of the SDN to SCN Mapping as per the tables of system and network components herein. Each Network Overlay 126 may facilitate centralized firewall management by a centralized firewall network controller 210 that may use a Network Overlay 126 to publish one or more firewall templates and/or facilitate generation of a firewall associated with Site A 127a and/or a firewall associated with Site B 127b.

In some embodiments, the connection not using a virtual core connection is also associated with a distributed firewall in accordance with one embodiment. In some embodiments, the firewall can be with the Virtual Network Overlay solution with and without virtual cores, and outside the Virtual Network Overlay solution managing third party routers.

Figure 9C:
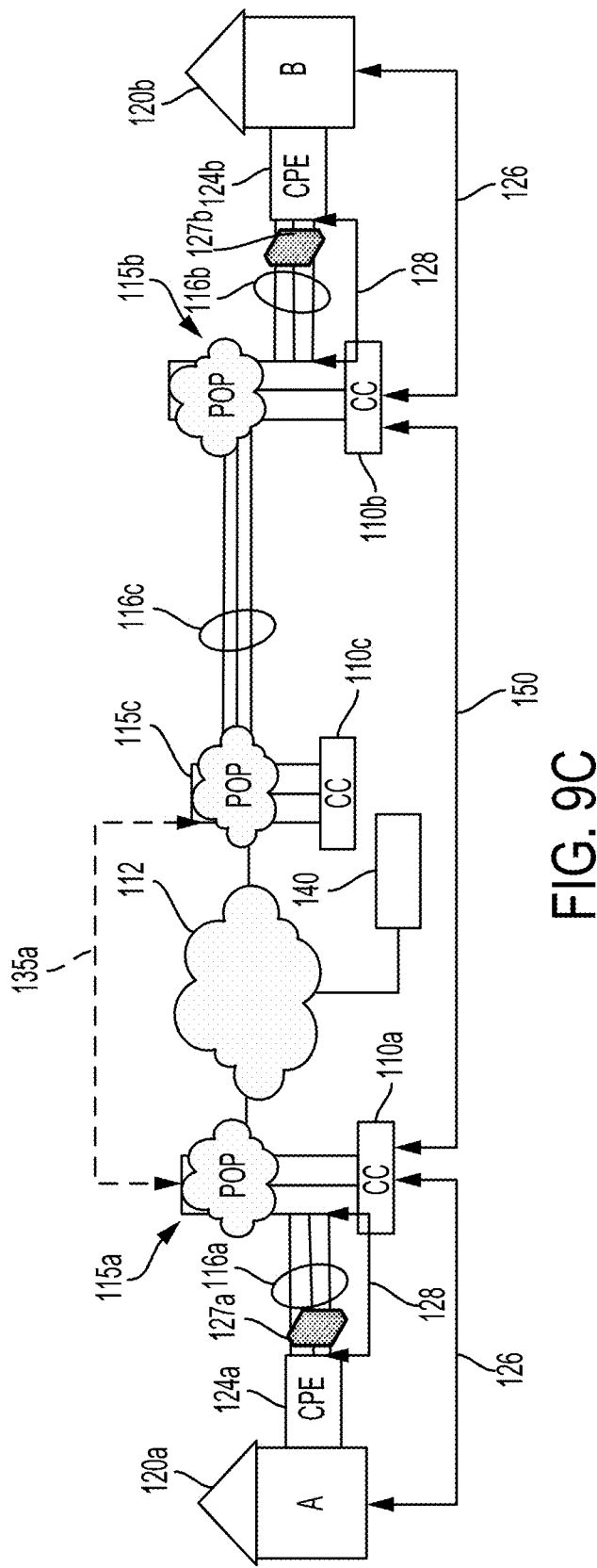
FIG. 9c illustrates another network solution with aggregated/bonded connections with a virtual edge and a virtual core connection associated with a distributed firewall in accordance with another embodiment.

As shown in FIG. 9c, there may be an bonded/aggregated connection 116c between a concentrator element 110c in a network server component 115c and at least one other concentrator element 110b in another network server component 115b connecting to the other client site network component 124b implemented at the client site B 120b. There may be a virtual edge 128 with transparent encryption. A cloud network controller 140 may be configured to manage the data traffic so as to provide the managed network overlay 150 that incorporates the other bonded/aggregated connection 116c. The managed network overlay 150 and/or a Network Overlay 126 may facilitate centralized firewall management by a centralized firewall network controller 210 that may use the managed network overlay 150 and/or a Network Overlay 126 to publish one or more firewall templates and/or facilitate generation of a firewall associated with Site A 127a and/or a firewall associated with Site B 127b.

Embodiments described herein may implement a cloud network controller 140 to implement Software Controlled Networking (SCN) to deliver bonded/aggregated connection and WAN virtualization between existing PoPs with concentrator elements. The solution may provide the ability to offer WAN-as-a-Service (WaaS) through a distributed PoP network.

Extending Bonded/Aggregated Connections from Edge to Core

Embodiments described herein may implement SCN-edge into a core network to provide end-to-end Virtualized Networking and deliver next generation WAN solutions using a Virtual Network Overlay 150. Examples are shown in FIGS. 8a, 8b, 9a, 9b, 9c. For example, the VC connections may extend a bonded/aggregated connection to a core network 112. This may facilitate centralized firewall management by a centralized firewall network controller that may use the VC connections to publish one or more firewall templates and/or facilitate generation of a firewall associated with Site A 127a, for example, at CPE (124a).

PoP-to-CPE Transparent Lower-Link Encryption for Aggregated/Bonded Connection

Embodiments described herein may provide a virtual edge for aggregated/bonded connections with transparent lower-link encryption. FIG. 8a shows an example virtual edge 128.

Proximal Aggregation & Distributed CPE Encryption

In one embodiment, implementation of proximal aggregation connects multi-site customer CPE 124 devices to the nearest point-of-presence (POP) 130, thereby establishing an overlay network session with aggregated connections using the aggregated/bonded connection technology described herein. CPE 124 devices belonging to multi-site customers may use the larger non-aggregated Internet or backbone upstream connections to establish Internet access and build IPVPN connections for inter-office communications. This may eliminate the need to perform long-haul aggregation between sites which may degrade and/or negate the aggregated network performance when communicating at a distance.

Complexity of CPE Encryption for Multiple Tenants

CPE encryption for multi-tenant implementations add complexity to the practice of encrypted VPN when observed on a per customer basis and having to manage overlapping CPE LAN IP Subnets from various customers. Furthermore, this multi-tenant management of per customer IPVPN connections carries additional complexity when considering the distributed nature of these diverse VPN implementations and overlapping CPE LAN subnets.

Simplifying PoP-to-CPE Encryption

To help ease the complexity and limitations of standard encrypted IPVPN implementations while addressing the nuances of overlapping CPE LAN IP Subnets; a transparent Lower-Link protocol encryption technology or process may be deployed for the virtual edge that does not concern itself with the CPE LAN IP Subnet. This technology or process can encrypt the Lower-Link encapsulated traffic and moves the responsibility of the CPE LAN IP Subnet management up into the ANA and IP transport layers, where it can be addressed adequately without the complications of encryption management and complex encryption policy definitions in a multi-tenant deployment.

The below tables demonstrate example functions and descriptions for selected components of the Virtual Network Overlay in accordance with one embodiment. The Virtual Network Overlay may be referred to herein as VWAN or virtual WAN as an illustrative example.

System Components

| Item | Function | Description |
|---|---|---|
| 5 | Monitoring & Management | The SCN Portal application may be extended to support the new VWAN monitoring and management requirements and provide a single sign-on unified Portal for VWAN customers. |
| 4 | Cloud Orchestration/ Provisioning | The SCN Portal application may be modified to support the new VWAN requirements as an extension to the aggregated connection CPE device provisioning. |
| 3 | Virtual Control Plane VRF w/OSPF | Concentrators may join VWAN CPE sessions with VWAN Core Routing to create secluded customer Route Domains managed dynamically using OSPF, a dynamic routing protocol. This may avoid a network trombone impact and may to support a split Internet & WAN access from the PoP for the Virtual Data Plane. |
| 2 | Virtual Data Plane Network Access & CPE Authentication | Concentrators perform Network Access Server (NAS) type functions that connect and aggregate CPE devices on the edge of the Core Network. New RADIUS (Remote Authentication Dial In User Service) attribute capability may be added to support VWAN. |

-continued

| Item | Function | Description |
|---|---|---|
| 1 | Security with IPSec & Firewall | Concentrators and CPE devices may handle both Edge and Core encryption and Firewall to secure the network end-to-end. The firewall can be available on the local CPE device at the branch. IPSec part is for securing the data in a VWAN versus securing the assets at the branch. |

Network Overlay Core Layers

| Layer | Function | Description |
|---|---|---|
| 5 | Virtual Control Plane VRF w/OSPF | FIB for VRF Backbone Mapping Customer VWAN Trunk to aggregated connection Sessions (Core to Edge) |
| 4 | Star or Mesh Topology | VWAN Core Tunnels between PoPs/CCs in a Star or Mesh Topology |
| 3 | Virtual Data Plane w/ Dynamic Routing | OSPF for Dynamic VWAN Routing Between PoPs/CCs |
| 2 | Encryption for VWAN Core: | Encryption for VWAN Trunks w/IPSec for lower layer traffic fully meshed between all CC's at all PoPs. |
| 1 | Firewall | Allowing VWAN Trunk encryption while protecting foreign encryption attempts. The firewall can contain rules that only allows ANA and VxLAN underlay encapsulation to attempt encryption. |

Network Overlay Edge Layers

| Layer | Function | Description |
|---|---|---|
| 4 | Virtual Control Plane VRF w/OSPF | FIB for VRF Edge Mapping Customer ANA Sessions to VWAN Trunks (Edge to Core) |
|  | Virtual Data Plane w/Dynamic Routing | OSPF for Dynamic VWAN Routing Between PoPs/CCs |
| 3 | Virtual Data Plane for ANA w/Proximal Aggregation using Distributed PoPs | Uses Proximal Aggregation connecting multi-site customer CPE devices to the nearest PoP establishing an overlay network between sites. The CPE devices establish ANA Sessions with Lower-Links Aggregation, Pre-emptive Lossless Failover, and Bi-Directional IPQoS. Split Internet & WAN access from the PoP. |
| 2 | Encryption for ANA Lower-Links | Encryption for Lower-Links w/IPSec of aggregated connection encapsulated transport. Supports both VWAN and non VWAN CPE implementations. |
| 1 | Firewall | Allowing CPE Lower-Link encryption while protecting foreign encryption attempts. |

SDN to SCN Mapping

| SD WAN (SDN) | IP Networking | SCN | SCN and VWAN (Virtual Network Overlay) |
|---|---|---|---|
|  | SDN TO SCN Mapping | | |
| Orchestration | Management Plane | SCN Portal | Multi-System Integration (OE, Tickets, NMS, CPE API) |
| Control Plane | Forwarding Plane | CC Multi-PoP | Virtual Control Plane (FIB, VE to ViF, OSPF) |
| Data Plane | Route Table | CPE | Virtual Data Plane (Routes, ANA Vif, DG or OSPF) |
| Encryption | IPSec | Security | Transparent Encryption (LL & Core Transport) |

| SD WAN (SDN) | IP Networking | SCN | SCN and VWAN (Virtual Network Overlay) |
|---|---|---|---|
| OTT - Lower Plane Infrastructure (IP Underlayer) | | | |
| Core/Cloud Infrastructure | Internet | Multi-PoP (Multi-Peer, NNI, CNI) | iBGP |
| Site/Branch Infrastructure | Internet or Private Line | Cable, ADSL, etc . . . | IP, MPLS, Ethernet |

The SDN to SCN table provides an illustrative example mapping between IP networking, SDN, SCN and Virtual Network Overlay to highlight example features. The terminology is used as an example illustration and other terminology may be used to reference various functionality. The table summarizes example features to provide an illustrative mapping. The table also lists example features for Over-The-Top (OTT) lower plane infrastructure as further illustrative mappings.

Virtual Network Overlay with SCN

In one embodiment, Virtual WAN or Network Overlay may use cloud network controller 140 with SCN Cloud management and automation to create an Over-The-Top Secure High Performance Network that connects multiple WAN sites across Multiple Points-of-Presence between CPE devices.

The Network Overlay may provide Optimized Internet Access, Secure WAN, Diverse Carrier Failover, and Bi-Directional IPQoS.

Carrier/Partner Features

In another embodiment, the VWAN configuration can support multi-tenant implementations by providing features such as route domain separation for overlapping customer IP Subnets, star and/or mesh WAN topology options with multipath WAN trunking, and dynamic per-VWAN routing updates with OSPF.

In one example, the Virtual Network Overlay (which may be referred to as VWAN) may provide PoP-to-PoP transparent VWAN trunk encryption, which has features such as:

Reduction of complexity by eliminating the need for Customer LAN intelligence in the encryption layer between PoPs;

Transparent customer WAN Core/Trunk encryption between PoPs. VWAN core trunks can be established for each multi-tenant customer as transparent Ethernet over IP tunnels that run on top of a single encryption session between CC's/PoPs;

Distributed PoPs provide a Virtual Point-of-Presence Network, enabling VWAN solutions to reach multi-site customers across North America.

The SCN Portal can be provided for accessing and configuring a cloud network controller 140 for ease of deployment and management of the VWAN. The SCN Portal can provide the following exemplary features:

OE, Install and Configuration, Monitoring & Management

Plugs Into Existing Monitoring System

Centralized Firewall, WiFi, & VWAN Control

Consistent Monitoring, Reporting & Management for all sites regardless of local carrier or connection type PoP-to-PoP Transparent Trunk Encryption VWAN may have a distributed PoP network covering North America for aggregation/bonded network services delivering speed, network efficiency, and reach for multi-site businesses.

A Virtual Point-of-Presence Carrier for the aggregated network system as described herein may provide customers with hot failover providing redundant and fault tolerant communications, supporting distributed points of presence for proximal aggregation throughout North America.

Distributed Proximal Aggregation with ANA & Multi-PoP

In another embodiment, Distributed Proximal Aggregation (DPA) may be implemented. DPA uses redundant Concentrators 110 established in multiple locations covering a multitude of Proximal Aggregation points known as Home-PoPs 130. Each Concentrator 110 supports multi-tenant configurations used for multiple clients associated with different CPEs 124 to improve network performance for such multiple clients by providing termination of their aggregation service and transfer of communications to the network backbone/Internet 112. This network solution may include multiple Points-of-Presence 130, distributed geographically bridging disparate areas with improved network communication with proximal aggregation to each customer CPE device 124.

Complexity of PoP-to-PoP Encryption for Multiple Tenants

PoP-to-PoP encryption for multi-tenant implementations adds complexity and may have limitations for the practice of Encrypted VPN between PoPs when observed on a per customer basis and having to deal with overlapping CPE LAN IP Subnets from various customers. Furthermore, the multi-tenant management of per customer IPVPN connections carries additional complexity when considering the distributed nature of these many diverse VPN implementations and overlapping CPE LAN subnets.

Simplifying PoP-to-PoP Encryption

In one embodiment, to overcome complexity and limitations of standard encrypted IPVPN implementations while addressing challenges of overlapping CPE LAN IP Subnets, extrapolation of the CPE LAN transport over the VWAN core from the encryption layer may be implemented to simplify the PoP-to-PoP encryption management.

In one example, Ethernet over IP tunnel (VE/gif) implementations on a per customer VWAN basis provides transparent encryption of these combined tunnels to simplify customer VWAN encryption requirements between PoPs 130.

This method moves the management of CPE LAN IP Subnets away from the VWAN Trunk encryption layer and up into the IP transport and IP routing layers.

In another embodiment, PoP-to-PoP Transparent VWAN Trunk Encryption may be implemented to eliminate the need for customer LAN intelligence in the encryption layer between PoPs, provide transparent customer WAN Core/trunk encryption between PoPs, and provide single encryption session between CC's/PoP's on top of which transparently create per customer multi-tenant Ethernet over IP tunnels (VE/gif) to facilitate VWAN Core Trunks.

The transparent encryption of the virtual core tunneling protocol connections address the Core/Branch Infrastructure component of the SDN to SCN mapping for the Lower Plane infrastructure architecture as per the tables of system and network components herein.

Virtual Backhaul—Multi-Tenant Support

In another embodiment, an over-the-top or Virtual Network Overlay solution can be implemented for the PoP-to-PoP interconnection of the core network. This solution can support multi-tenant implementations by providing route domain separation for overlapping customer IP Subnets, star and/or mesh WAN topology options with multipath WAN trunking, and dynamic per-VWAN routing updates with OSPF. This addresses the Virtual Control Plane component of the SDN to SCN mapping as per the tables of system and network components herein.

Per Customer Trunking

In order to address the potential overlapping of CPE LAN IP Subnets, the design associates VE PoP-to-PoP tunnels per customer VWAN with a distinct route domain by mapping VE trunks and ANA Vif sessions to unique FIBs/Route tables creating a per customer VWAN Route domain from one CPE to another CPE over the VWAN core.

Ethernet Over IP Tunnels (VE/gif) for Trunking

The VE/gif interface can be a generic tunneling device for IPv4 and IPv6. It can tunnel IPv[46] traffic over IPv[46], thereby supporting four possible configurations. The behavior of gif is mainly based on RFC2893 IPv6-over-IPv4 configured tunnel.

Advantages and Use Case

The embodiments described herein may improve network performance between disparate locations by leveraging network bonding/aggregation technology, but by implementing a system, method and network configuration that provides intervening network components disposed adjacent to access points so as to manage traffic between two or more sites such that bonded/aggregated connections are terminated and traffic is directed to a network backbone, and optionally passed to one or more further bonded/aggregated connections associated with a remote additional site.

The network solutions of the present invention are flexible, responsive, scalable and easy to implement. New sites, optionally having their own CPE-CE and/or COPE can be easily added, and the network solution supports various types of multi-point network communications, and various network performance improvement strategies including various QoS techniques.

The network solution is easily updated with new programming or logic that is automatically distributed on a peer to peer basis based on the interoperation of network components that is inherent to their design, as previously described.

As explained earlier, embodiments of the present invention may offer advantages over the prior art technologies, including, for example:
1. Carrier diversity
2. Failover protection
3. Aggregated bandwidth
4. Bi-directional communication
5. Network quality of service (QoS)
6. No dropped calls
7. Application acceleration
8. Quality of Experience scoring In addition, combining MPLS network with the link aggregation/bonding technology described in the exemplary embodiments is an approach to satisfying end customer needs on an MPLS network, namely:

Use of multiple low cost broadband circuits (for greater uptime and resiliency)
Support of prioritization and CoS for priority traffic
Hybrid MPLS or backup network strategy without having to abandon MPLS features Furthermore, additional advantages provided by embodiments of the present invention may include:

It paves a way for each carrier or network provider to offer an innovative MPLS network over broadband solution that is differentiated from their competitor's offering.
Customers would be able to select the given carrier or provider for Hybrid and/or Backup MPLS solutions via a customized network configuration.
Cloud provisioning, or "Zero Touch Provisioning" can configure/reconfigure all the network elements dynamically.
An ability to aggregate/terminate multiple MPLS providers in a single location.
Interoperability between networks can be handled by the cloud provisioning element.
Network providers or partners can deliver an "any/any/any" experience to their customers—BYOMPLS (Bring Your Own MPLS) ability to the network providers or partners.
Customers would be able to select carriers offering MPLS with link aggregation/bonding over broadband to obtain QoS, Resiliency, and application acceleration not achievable with current offerings on the market.
And many others.

Network performance is significantly improved over prior art solutions as illustrated in the Example In Operation provided above.

The invention claimed is:

1. A system for distributed firewall management for client sites, the system comprising at least one processor and at least one non-transitory memory comprising program code, wherein the at least one non-transitory memory and the program code are configured to, with the at least one processor, cause the system to perform operations configured to:

provide, by each firewall of a plurality of firewalls corresponding to a plurality of client site network components, rules, security controls, or policy controls for the respective client site network component, each firewall is integrated with a client site network component, each client site network component implemented at a respective client site; and manage, by a centralized firewall network controller, the rules, security controls, or policy controls for the plurality of firewalls as a single control pane to provide a managed firewall network that incorporates connections of the plurality of client site network components, the single control pane implementing a template based firewall policy and rule management with asset alias capacity to manage a plurality of assets across the plurality of client site network components, wherein each client site network component is aggregating to one or more diverse network connections to configure an aggregated connection that has increased throughput.

2. The system of claim 1 wherein at least one network server component is configured to connect to at least one of the plurality of client site network components using the bonded/aggregated connection, the network server component including at least one concentrator element implemented at a network access point to at least one network, the network server component automatically terminating the bonded/aggregated connection and passing data traffic to the network access point to the at least one network, the at least one network server component configured to connect to the at least one of the plurality of client site network components at a distance that would usually require long haul network communication.

3. The system of claim 2 further comprising a virtual edge connection providing at least one of transparent lower-link encryption and lower-link encapsulation using a common access protocol for the bonded/aggregated connection between the client site network component and the network server component.

4. The system of claim 2 wherein the network server component comprises:
a first concentrator element implemented at the network access point to the at least one network;
a second concentrator element implemented at another network access point to at least one other network;
wherein the first concentrator element and the second concentrator element are configured to interoperate to provide a virtual core connection between the network access point and the other network access point, the virtual core connection providing another bonded/aggregated connection; and
wherein a cloud network controller is configured to integrate with the centralized firewall network controller to manage the data traffic to provide the managed network overlay that incorporates the virtual edge connection, the virtual core connection and the at least one long haul network path carried over the at least one network and the at least one other network.

5. The system of claim 4 wherein the virtual core connection provides at least one of the transparent lower-link encryption and the lower-link encapsulation using the common access protocol for the other bonded/aggregated connection.

6. The system of claim 4 wherein the cloud network controller is configured to manage the data traffic to provide the managed network overlay that incorporates the bonded/aggregated connection and the other bonded/aggregated connection.

7. The system of claim 2 wherein the network server component comprises at least one other concentrator element, the at least one other concentrator element bonding or aggregating one or more other diverse network connections to configure another bonded/aggregated connection that has increased throughput, the other bonded/aggregated connection connecting the at least one concentrator element and the at least one other concentrator element.

8. The system of claim 2 wherein the client site network component is configured with a route to the at least one network server component to separate the lower-link traffic to prepare the data traffic for the bonded/aggregated connection or the managed network overlay.

9. The system of claim 8 wherein the route is a static route, a dynamic route or a route from a separate or independent virtual routing forwarding table.

10. The system of claim 2 wherein the network server component is configured to connect with an intelligent packet distribution engine that manages data packets transmission over the at least one long haul network path by obtaining data traffic parameters and, based on the data traffic parameters and performance criteria, selectively applies one or more techniques to alter the traffic over the at least one long haul network path to conform to the data traffic parameters.

11. The system of claim 2 wherein the network server component is configured to provide Multi-Directional Pathway Selection (MOPS) for pre-emptive failover using echo packets received from the client site network component.

12. The system of claim 2 wherein network server component is configured to provide an intelligent packet distribution engine (IPDE) for packet distribution with differing speed links using weighted packet distribution and for bi-directional (inbound and outbound) QoS.

13. The system of claim 2 wherein each of the least one network server component is accessible to a plurality of client site network components, each client site network component being associated with a client site location.

14. The system of claim 2 further comprising a network aggregation device that: (A) configures a plurality of dissimilar network connections or network connections provided by a plurality of diverse network carriers ("diverse network connections") as one or more aggregated groups, at least one aggregated group creating the bonded/aggregated connection that is a logical connection of the plurality of diverse connections; and (B) routes and handles bi-directional transmissions over the aggregated network connection; wherein two or more of the diverse network connections have dissimilar network characteristics including variable path bidirectional transfer rates and latencies; wherein the logical connection is utilizable for a transfer of communication traffic bidirectionally on any of the diverse network connections without any configuration for the dissimilar network connections or by the diverse network carriers; and wherein the network aggregation engine includes or is linked to a network aggregation policy database that includes one or more network aggregation policies for configuring the aggregated groups within accepted tolerances to configure and maintain the aggregated network connection so that the logical connection has a total communication traffic throughput that is a sum of available communication traffic throughputs of the aggregated group of diverse network connections.

15. The system of claim 1 wherein the centralized firewall network controller is configured to provide a software defined perimeter defense system.

16. The system of claim 1 wherein the centralized firewall network controller is configured to provide five layers of security comprising administrator, network, trusted, public and untrusted.

17. The system of claim 1 wherein the asset alias capacity assigns a unit alias to each of the plurality of assets across the plurality of client site network components.

18. The system of claim 1 wherein the plurality of firewalls use processing resources of the plurality of client site network components to distributed processing required by the plurality of firewalls across the plurality of client site network components.

19. The system of claim 1 wherein the client site network component is configured to separate lower-link data traffic and encapsulate data packets of the lower-link data traffic using a common access protocol for a bonded/aggregated connection.

20. An apparatus for distributed firewall management for client sites comprising at least one processor and at least one non-transitory memory comprising program code, wherein the at least one non-transitory memory and the program code are configured to, with the at least one processor, cause the apparatus to perform operations configured to:
connect a client site network component to at least one network server component implemented at an access point to at least one wide area network, the client site network component implemented at least a first client site in network communication with a second client site, wherein the first client site and the second client site are at a distance from one another that would usually require long haul network communication, provide, by a firewall integrated with the client site network component, rules, security controls, or policy controls for the respective client site network component, manage, by a centralized firewall network controller, in communication with the firewall, the rules, security controls, or policy controls for the firewall as a single control pane to provide a managed firewall network that incorporates the aggregated connection of the client site network component, the single control pane implementing a template based firewall policy and rule management with asset alias capacity to manage a plurality of assets of the client site network component, wherein each client site network component is aggregating to one or more diverse network connections to configure a aggregated connection that has increased throughput.

\* \* \* \* \*